US012220856B2

(12) United States Patent
Mondini et al.

(10) Patent No.: US 12,220,856 B2
(45) Date of Patent: Feb. 11, 2025

(54) APPARATUS FOR MAKING A CONTAINER

(71) Applicant: G.MONDINI S.P.A., Cologne (IT)

(72) Inventors: Giovanni Mondini, Cologne (IT); Nazzareno Mondini, Cologne (IT)

(73) Assignee: G.MONDINI S.P.A., Cologne (IT)

( * ) Notice: Subject to any disclaimer, the term of this patent is extended or adjusted under 35 U.S.C. 154(b) by 187 days.

(21) Appl. No.: 18/089,686

(22) Filed: Dec. 28, 2022

(65) Prior Publication Data

US 2023/0211542 A1  Jul. 6, 2023

(30) Foreign Application Priority Data

Dec. 30, 2021 (IT) .......................... 102021000033041
Jul. 27, 2022 (IT) .......................... 102022000015891

(51) Int. Cl.
*B29C 51/26* (2006.01)
*B29C 51/02* (2006.01)
(Continued)

(52) U.S. Cl.
CPC ............ *B29C 51/261* (2013.01); *B29C 51/12* (2013.01); *B29C 51/162* (2013.01);
(Continued)

(58) Field of Classification Search
CPC ....... B29C 51/02; B29C 51/22; B29C 51/225; B29C 51/261; B29C 51/46; B29C 2793/0027; B29C 2793/0081
See application file for complete search history.

(56) References Cited

U.S. PATENT DOCUMENTS 3,904,345 A * 9/1975 Lechevallier ......... B29C 51/167
425/510
11,607,836 B1 * 3/2023 Johnston, VII ....... B29C 51/261
(Continued)

FOREIGN PATENT DOCUMENTS

DE         3321575 A1   1/1985
DE    202005014188 U1   2/2006
(Continued)

*Primary Examiner* — Thu Khanh T. Nguyen
(74) *Attorney, Agent, or Firm* — Chrisman Gallo Tochtrop LLC

(57) ABSTRACT

An apparatus for making a container (2) which comprises an outer skeleton (6), which includes at least one first sheet (8) and one second sheet (9), and a layer of thermoplastic material (7) the apparatus (1) comprising a conveying element (15) which defines a housing (22), which is mounted on a supporting structure (11) and which is movable along a movement path (16) which extends from an infeed station (17) to an outfeed station (18), along the movement path (16) the apparatus (1) having a first feeding station (19), a second feeding station (20), and a thermoforming station (21) placed downstream of the feeding stations, the apparatus also comprising a first feeding device (23) at the first feeding station (19) and configured to insert the first sheet (8) into the housing (22), a second feeding device (24) at the second feeding station (20) and configured to insert the second sheet (9) into the housing (22), and a thermoforming device (31) at the thermoforming station (21) and configured to thermoform a thermoplastic material (10) on the first sheet (8) and on the second sheet (9).

42 Claims, 30 Drawing Sheets

(51) Int. Cl.
*B29C 51/12* (2006.01)
*B29C 51/16* (2006.01)
*B29C 51/22* (2006.01)
*B29C 51/42* (2006.01)
*B29C 51/46* (2006.01)
*B29L 31/00* (2006.01)

(52) U.S. Cl.
CPC ............ *B29C 51/264* (2013.01); *B29C 51/42* (2013.01); *B29L 2031/7162* (2013.01)

(56) References Cited

U.S. PATENT DOCUMENTS

| | | | |
|---|---|---|---|
| 2001/0030104 A1* | 10/2001 | Schlimgen | B29C 51/44 198/418.4 |
| 2011/0120282 A1* | 5/2011 | Benker | B29C 51/445 425/135 |
| 2015/0136764 A1 | 5/2015 | Dropsy et al. | |
| 2017/0320256 A1* | 11/2017 | Mondini | B29C 51/18 |
| 2017/0320259 A1* | 11/2017 | Mondini | B29C 51/46 |

FOREIGN PATENT DOCUMENTS

| | | | |
|---|---|---|---|
| FR | 2432927 A1 | 3/1980 | |
| WO | 9967143 A2 | 12/1999 | |

\* cited by examiner

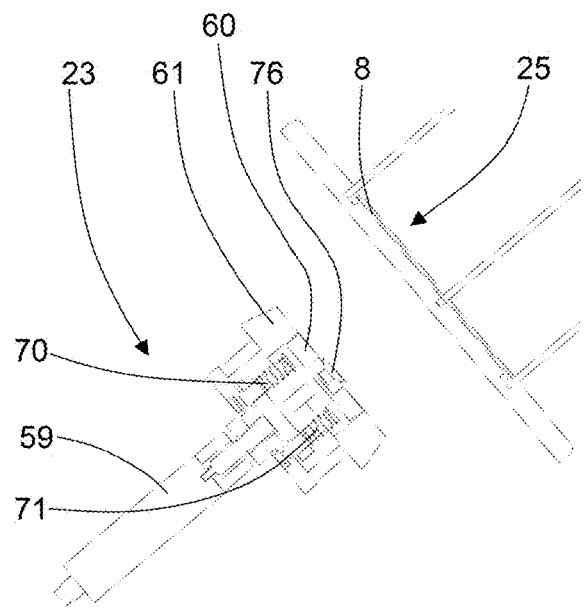
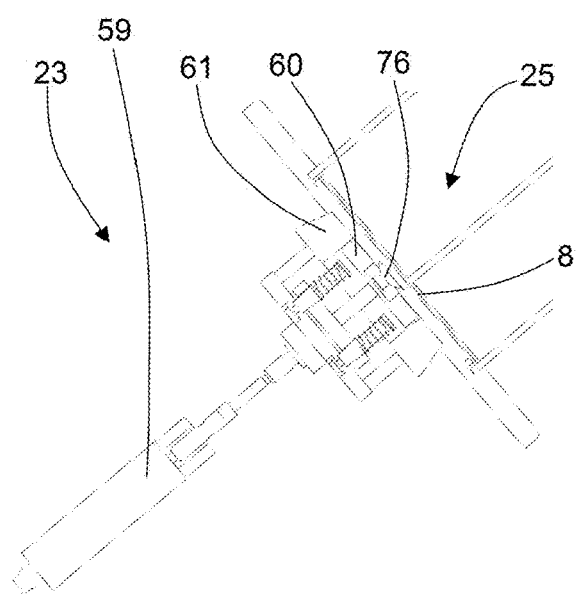
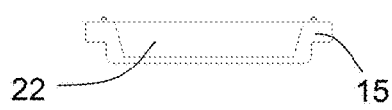
FIG. 13
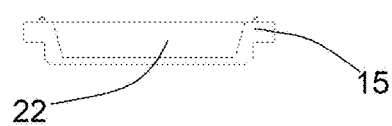
FIG. 14
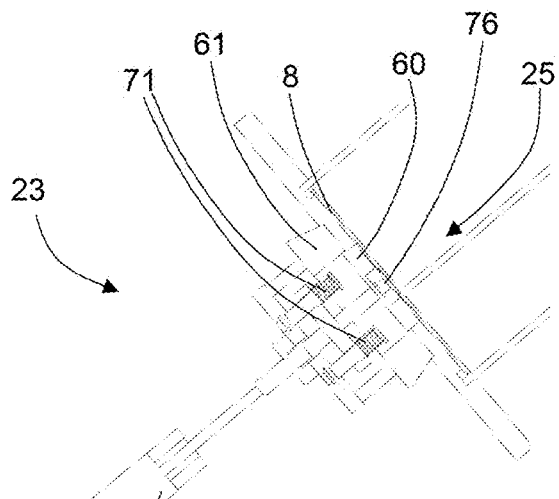
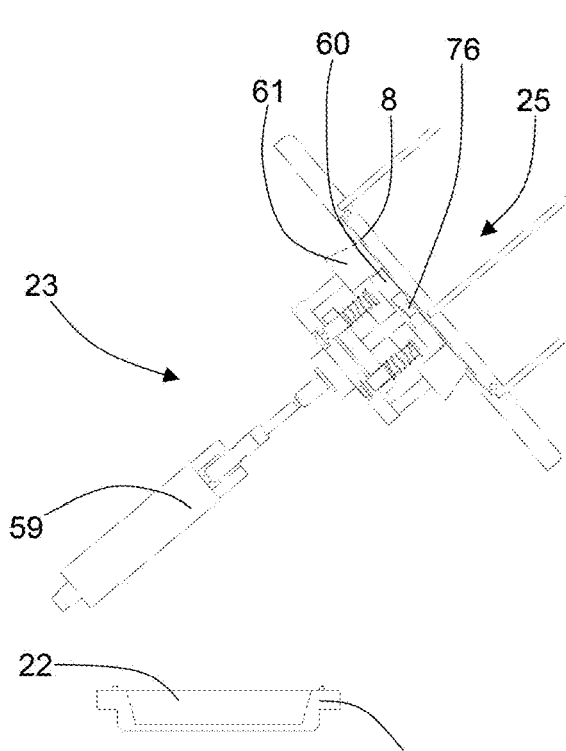
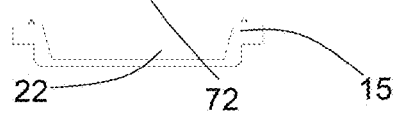
FIG. 15
FIG. 16

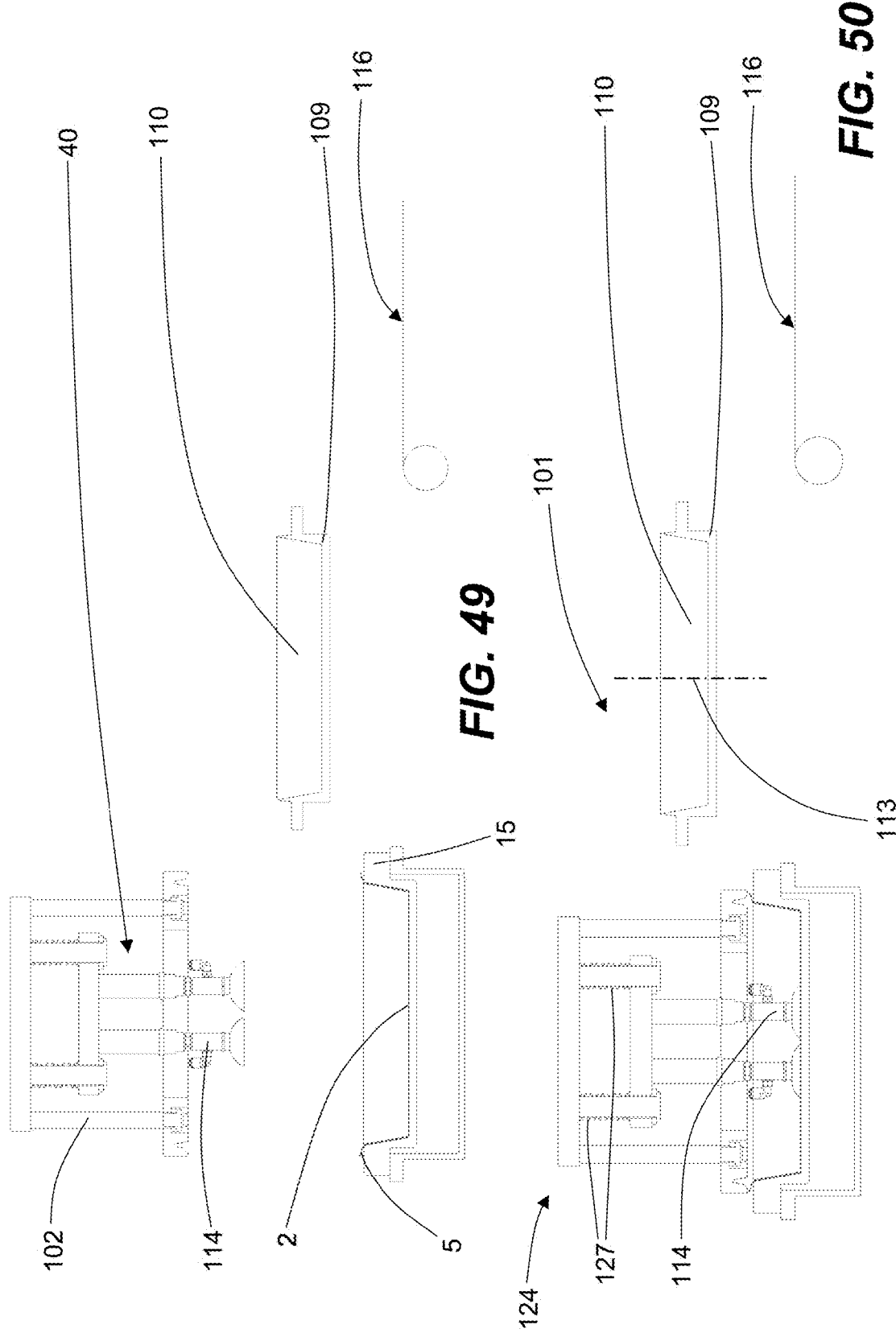

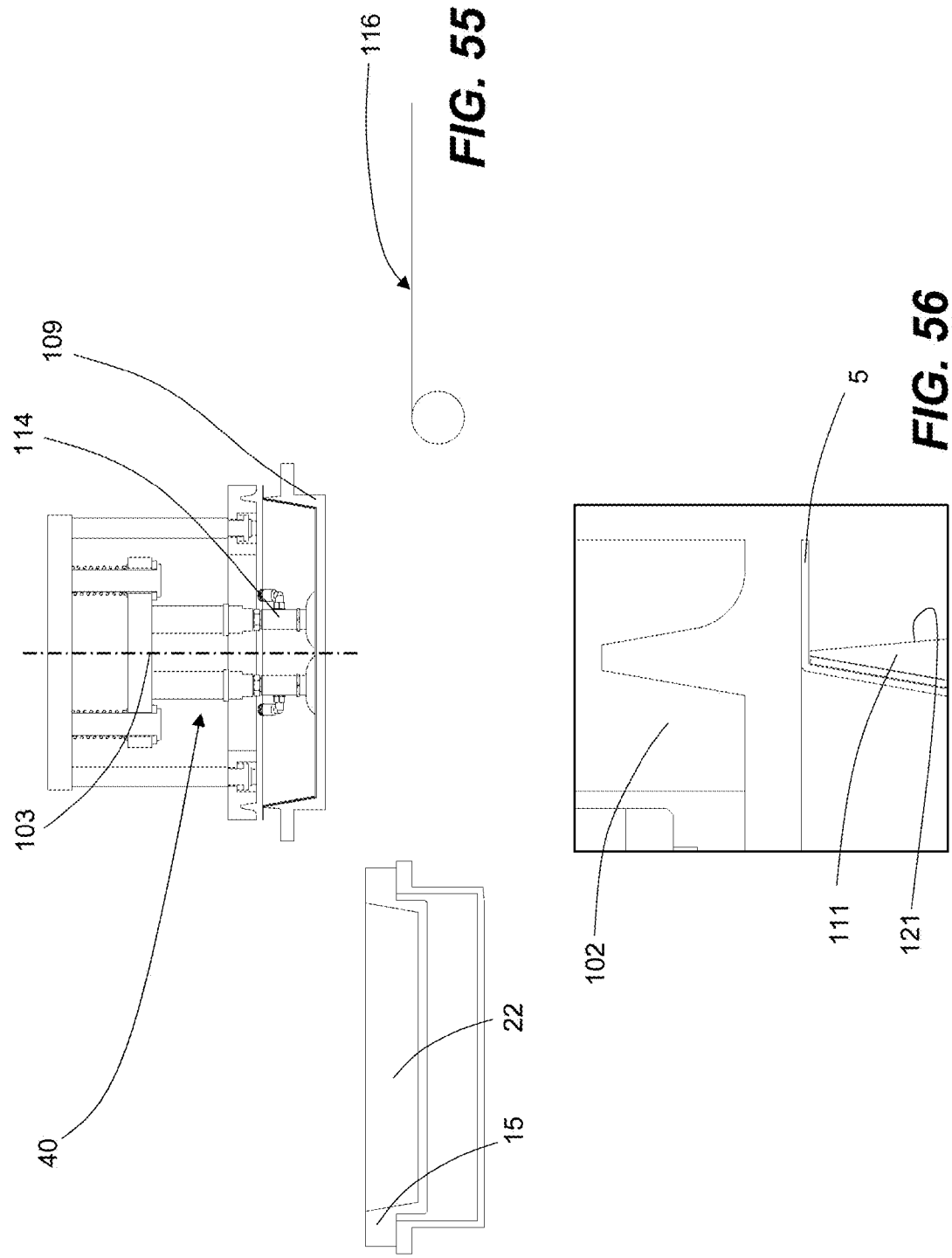

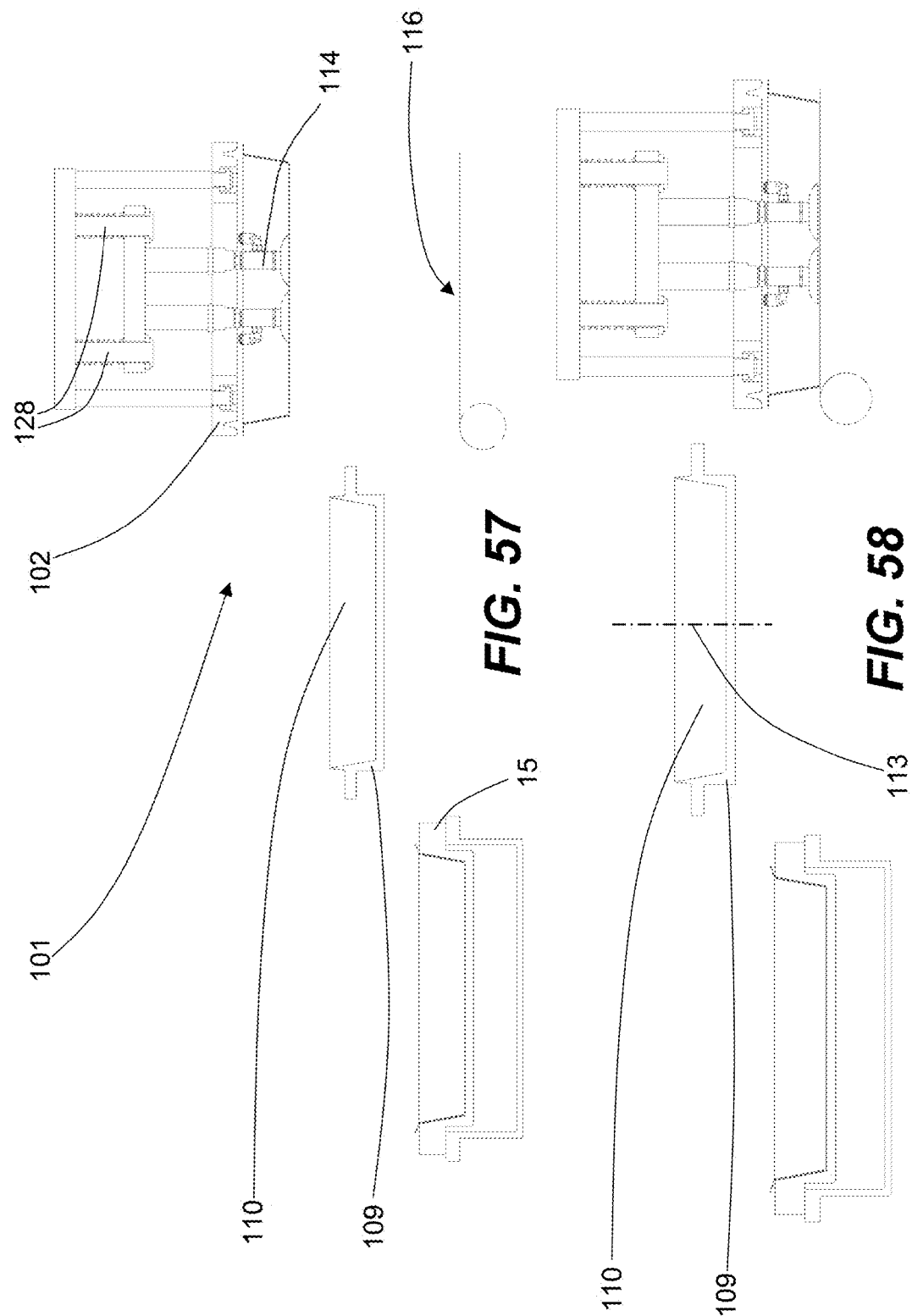

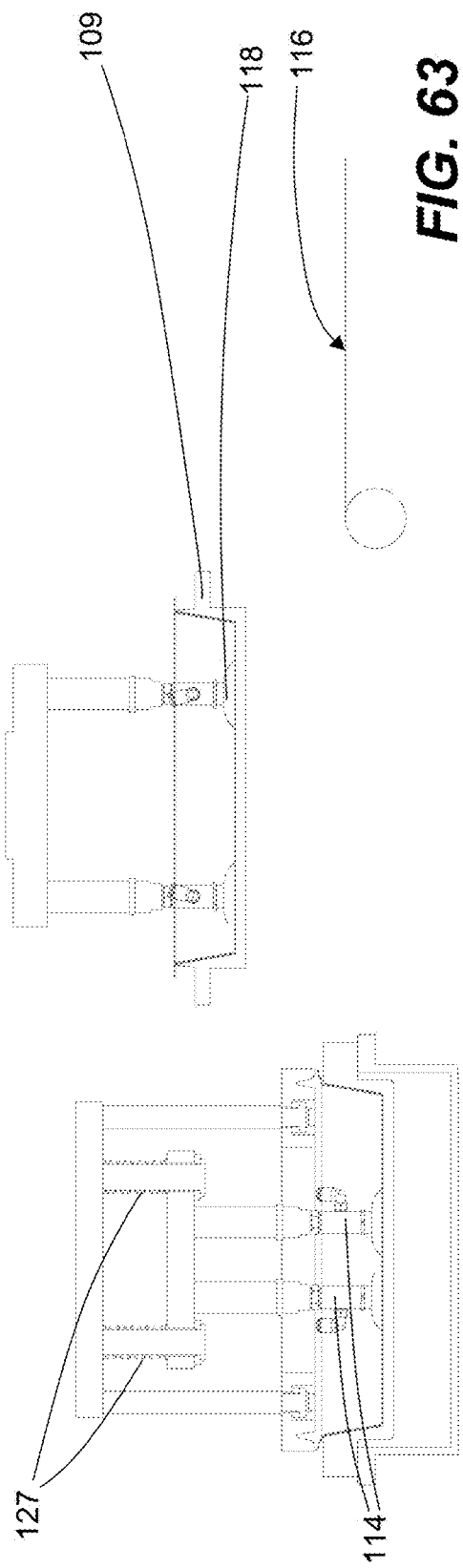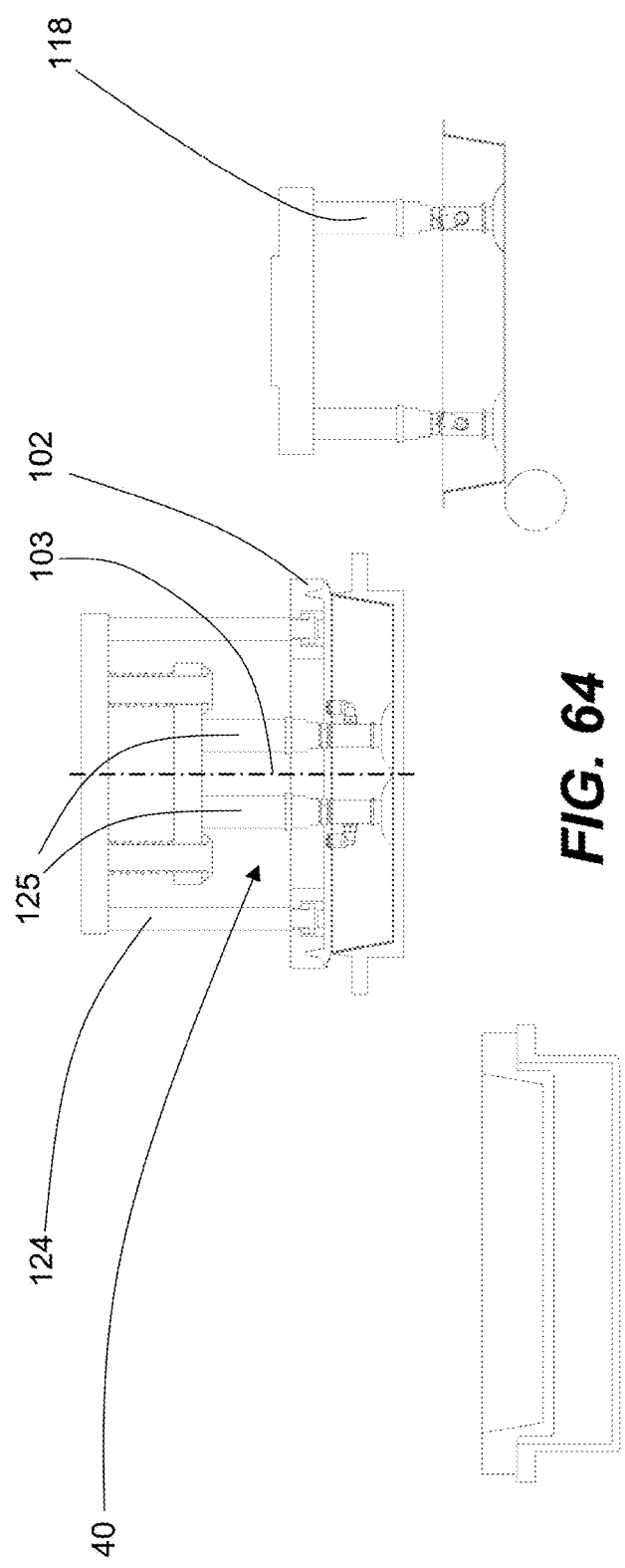
FIG. 63
FIG. 64

APPARATUS FOR MAKING A CONTAINER

This invention relates to an apparatus for making a container. In particular, this invention relates to an apparatus for making a container of the type which comprises an outer skeleton and a layer of thermoplastic material which coats the inside of the outer skeleton. In more detail, this invention relates to an apparatus for making a container of the type in which the outer skeleton comprises a plurality of separate sheets, for example a first sheet which defines its bottom and at least partly defines the lateral walls, and a second sheet which defines its perimetric flange and, preferably, also at least partly defines the lateral walls as described for example in patent application WO 1999/067143 A2. This invention is advantageously applied in the sector of containers intended for use in the food sector, for example for containing fresh and perishable food products, such as meats and cheeses, etc. However, this invention is not limited to use in that sector, but may also advantageously be applied in other sectors for containing products of a different type.

In the prior art there are several apparatuses for making a container comprising an outer skeleton and a layer of thermoplastic material which adheres to the inside of the outer skeleton. These apparatuses comprise a thermoforming device which is configured to thermoform a thermoplastic material on the outer skeleton, in such a way as to make the layer of thermoplastic material.

The prior art apparatuses can be grouped in two main types.

The apparatuses of the first type are configured to use outer skeletons which are already three-dimensionally formed, which only need the layer of thermoplastic material to be applied to them. The already formed outer skeletons can be loaded in the thermoforming device either automatically, or manually.

In contrast, the apparatuses of the second type are configured to three-dimensionally form the outer skeletons directly inside the thermoforming device, at the same time as or immediately before the layer of thermoplastic material is applied. In this case too, the outer skeletons can be loaded in the thermoforming device either automatically, or manually.

The prior art apparatuses of this second type can be used with outer skeletons which are constituted of a single paper and cardboard industry article to be three-dimensionally formed in the machine, in particular starting with a single sheet which is die cut and folded over itself or with a plurality of sheets which are superposed and glued to each other.

If the skeleton comprises two separate sheets which can be fixed to each other only after having been three-dimensionally formed, for example a first sheet which defines its bottom and at least partly defines the lateral walls, and a second sheet which defines its perimetric flange and, preferably, also at least partly defines the lateral walls, in accordance with the prior art the apparatuses which can be used are only those of the first type. Consequently, as described for example in patent application WO 1999/067143 A2, the two sheets must be three-dimensionally formed and constrained to each other, for example by gluing, in advance and only then fed to the apparatus.

In this context the technical purpose which forms the basis of this invention is to make an alternative apparatus for making a container in which the skeleton comprises two separate sheets, which can be constrained to each other only after they have been three-dimensionally formed.

In particular the technical purpose of this invention is to make an apparatus which allows simplification of the operations for making a container whose outer skeleton comprises the two separate sheets indicated above.

The technical purpose specified and the aims indicated are substantially achieved by an apparatus for making a container as described in the independent claim.

Particular embodiments of this invention are defined in the corresponding dependent claims.

Further features and the advantages of this invention will be more apparent in the detailed description, with reference to the accompanying drawings which illustrate several preferred, non-limiting embodiments of an apparatus for making a container, in which:

FIGS. 13 to 21 are schematic vertical sections of the first transferring element in different positions, the first magazine and the conveying element;

FIGS. 49 to 60 are side view vertical sections of a second embodiment of the folding device of FIG. 46 in a plurality of different configurations adopted during operation; and FIGS. 61 to 65 are side view vertical sections of a third embodiment of the folding device of FIGS. 49 to 60, in a plurality of different configurations adopted during operation.

Figure 1:
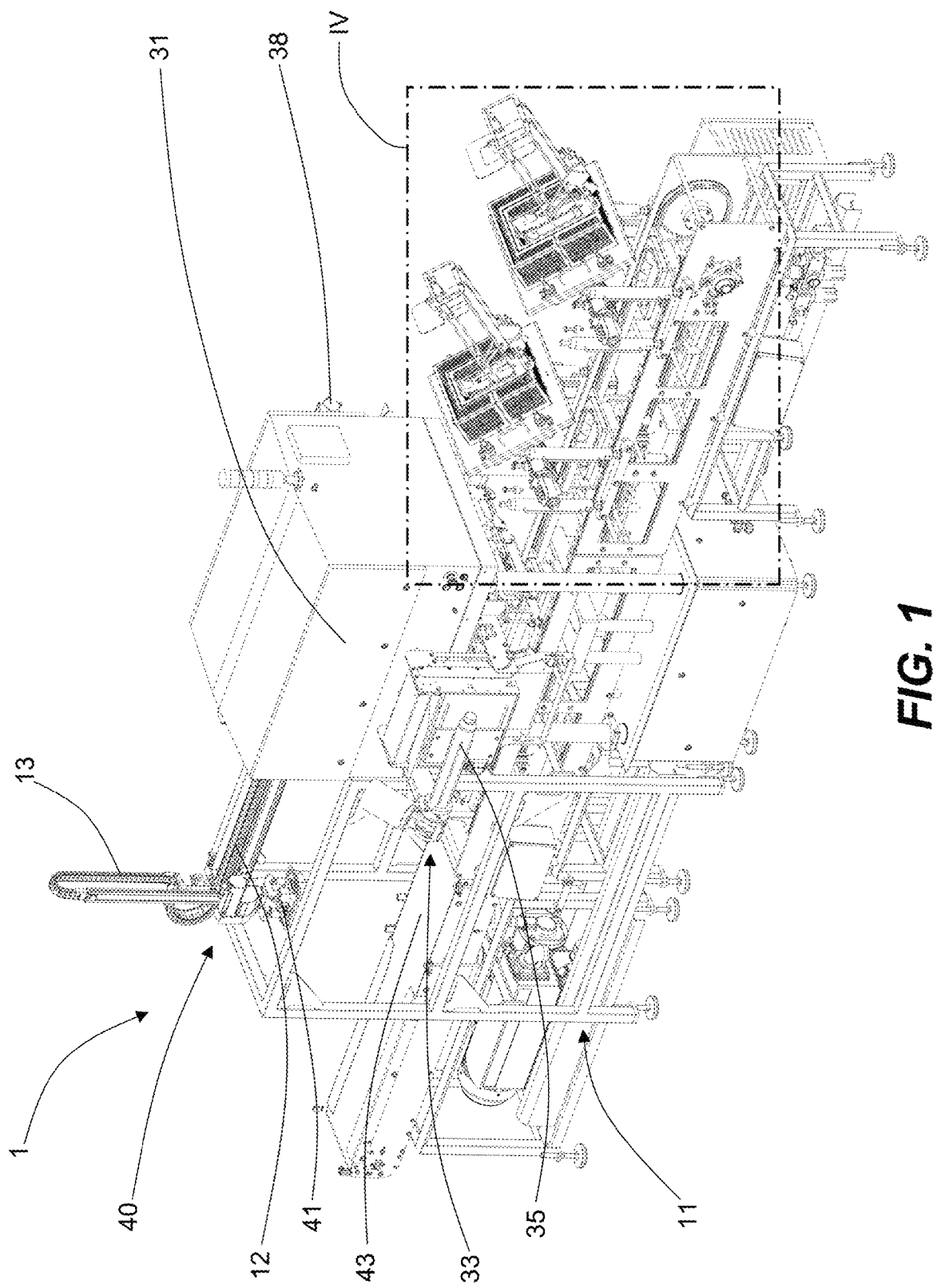
FIG. 1 is an axonometric view of a first embodiment of an apparatus for making a container, according to this invention.
Figure 2:
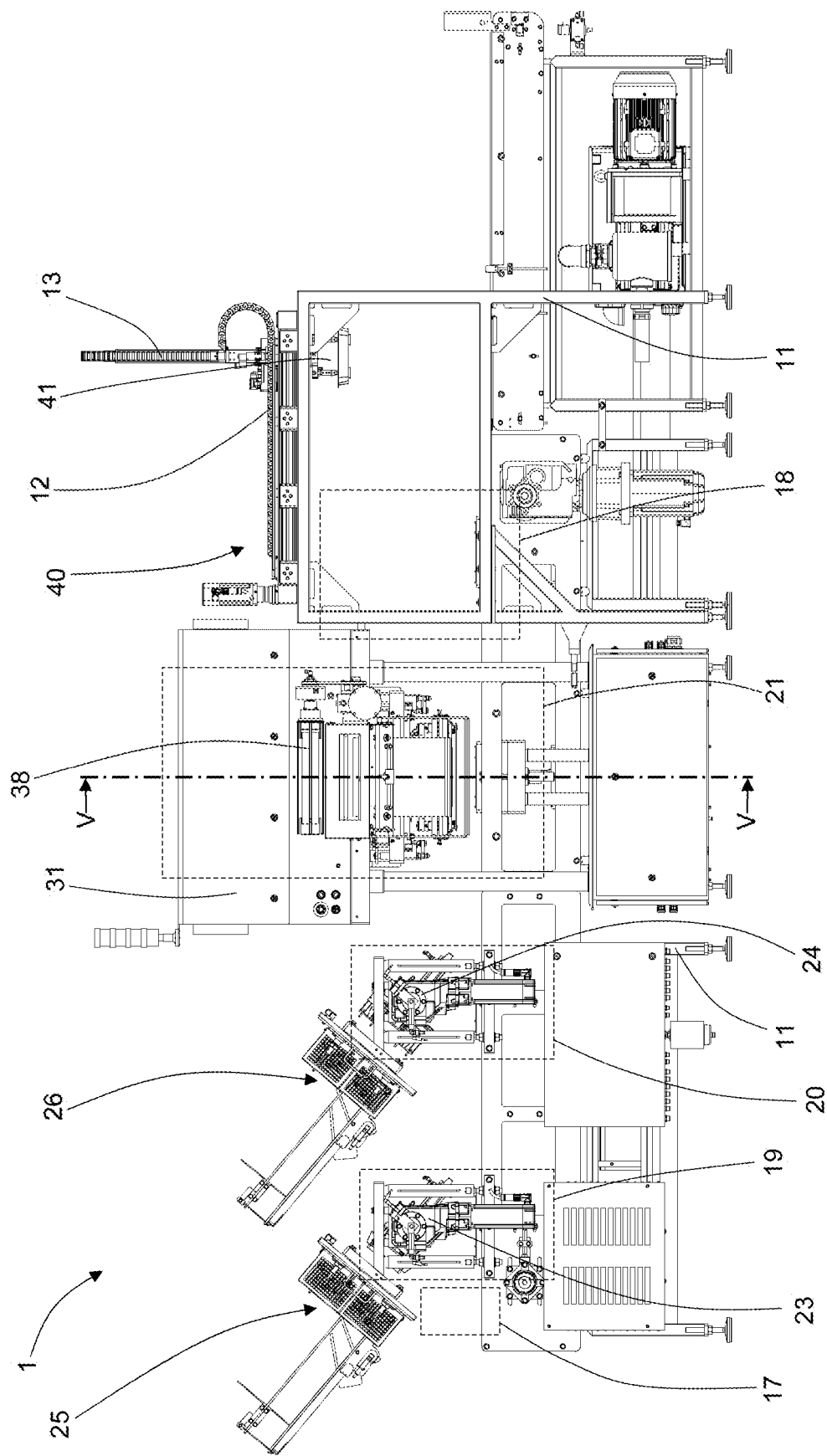
FIG. 2 is a side view of the apparatus of FIG. 1.
Figure 4:
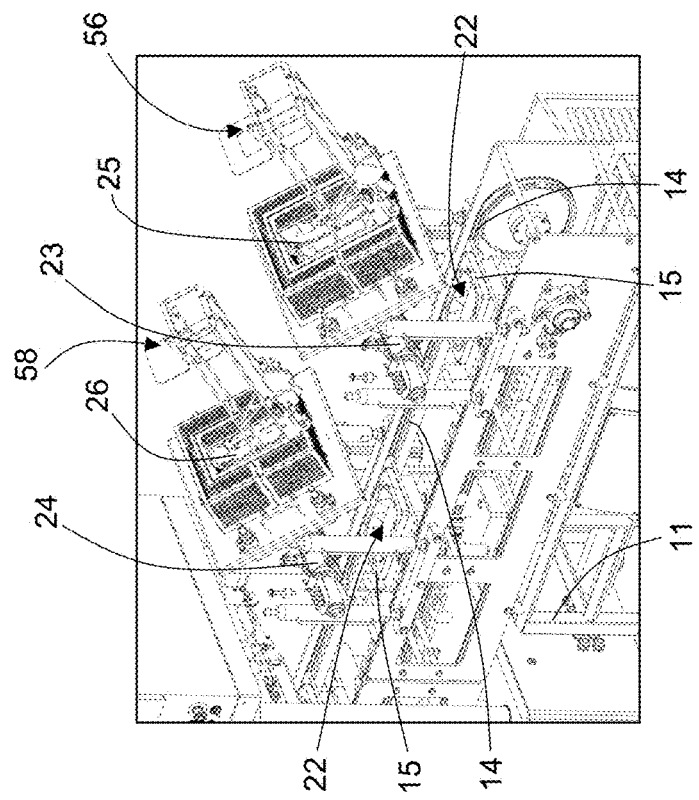
FIG. 4 is an enlarged view of the detail IV of FIG. 1.
Figure 3:
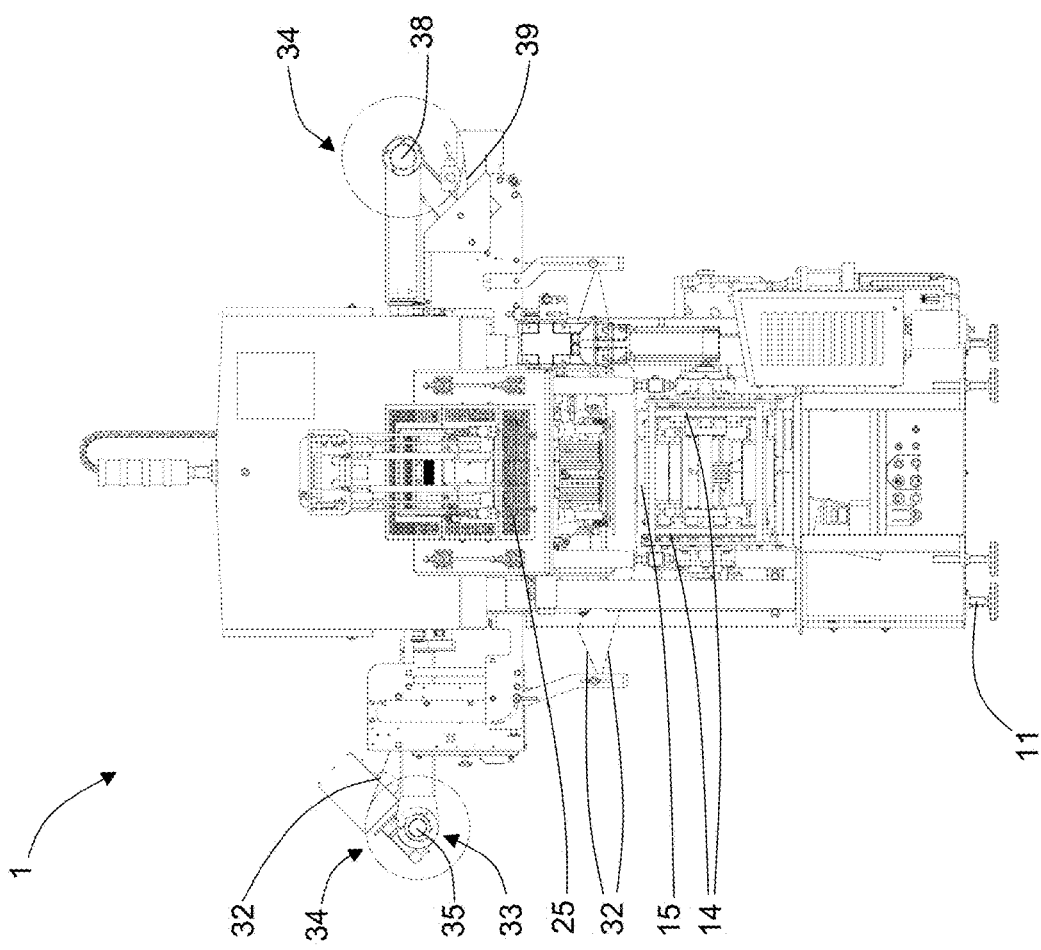
FIG. 3 is a front view of the apparatus of FIG. 1.

In the accompanying figures, an apparatus for making a container according to this invention has been labelled 1 in its entirety.

It should be emphasised that this invention relates to an apparatus 1 for making a container 2 which has a bottom wall 3, a plurality of lateral walls 4 and a perimetric flange 5. Moreover, as already indicated, the container 2 comprises an outer skeleton 6 and a layer of thermoplastic material 7 which adheres to the inside of the outer skeleton 6. In turn, the outer skeleton 6 made with the apparatus 1 according to this invention includes at least one first sheet 8 and one second sheet 9. Both the outer skeleton 6, and the layer of thermoplastic material 7 can be made of any material suitable for the purpose.

In some embodiments, the first sheet 8 and the second sheet 9 extend one at least at the bottom wall 3 and the other at least at the perimetric flange 5. At least one of the two, but preferably both, also extends at the lateral walls 4. The first sheet 8 and the second sheet 9 may or may not be partly superposed (for example, at the lateral walls 4 of the container 2). Both of the sheets may in any case extend at the bottom 3, at the lateral walls 4 and/or at the perimetric flange 5.

More generally, this invention is advantageously applied for making a wide variety of different containers 2. In particular, it is advantageously applied both for making containers 2 in which the outer skeleton 6 is constituted of only two sheets, and for making containers 2 in which the outer skeleton 6 is constituted of more than two sheets.

In the preferred embodiment, there are only two sheets, a first sheet 8, which comprises a central portion 50 intended to constitute the bottom of the outer skeleton 6 and a plurality of first flaps 51 which extend outwards from the edges of the central portion 50 and which are intended to constitute part of the lateral walls 4 of the outer skeleton 6, and a second sheet 9 which comprises an annular perimetric portion 52 intended to constitute the flange of the outer skeleton 6 and a plurality of second flaps 53 which extend inwards from the annular perimetric portion 52 and which are intended to constitute part of the lateral walls 4 of the outer skeleton 6. The first flaps 51 and the second flaps 53 are advantageously configured to be superposed (which are on top and which are underneath depends on which, of the first sheet 8 or the second sheet 9, is placed over the other).

However, in other embodiments there may be many other solutions. For example, it may be the case that:
the first sheet 8 is intended to constitute only the bottom of the outer skeleton 6 and that the lateral walls 4 are intended to be constituted only of the second sheet 9;
the second sheet 9 is intended to constitute only flange of the outer skeleton 6 and that the lateral walls 4 are intended to be constituted only of the first sheet 8;
the outer skeleton 6 is constituted of more than two sheets extending concentrically, which may or may not be superposed;
the outer skeleton 6 is constituted of more than two sheets side by side transversally to one of the main directions of extension of the outer skeleton 6 (length or width), which may or may not be superposed;
the outer skeleton 6 defines protruding portions inside the container 2;
the outer skeleton 6 comprises at least one sheet which has an annular portion intended to constitute the flange of the outer skeleton 6, and a plurality of third flaps which extend outwards starting from the outer edge of the annular portion and which are intended to be folded on the annular portion towards the inside of it and then be three-dimensionally formed to form the lateral walls 4;
the first sheet 8 has a plurality of fourth flaps which extend outwards starting from the outer edge of the first flaps 51 and which are configured to couple with the annular perimetric portion 52 so that with it they define the flange 6. The shape and dimensions of the fourth flaps may be such that they reflect the shape of the annular perimetric portion 52 or such that the fourth flaps project relative to the annular perimetric portion 52, or such that the annular perimetric portion 52 projects below the fourth flaps;
the outer skeleton 6 comprises a second sheet 9 which has a plurality of fifth flaps which extend outwards starting from the outer edge of the annular perimetric portion 52 and which are intended to be folded on the annular portion to increase the thickness of the perimetric flange 5;
the outer skeleton 6 comprises a first sheet 8 which has both the fourth flaps, and a plurality of sixth flaps which extend outwards starting from an outer edge of the fourth flaps and which are intended to be folded on the fourth flaps to increase the thickness of the perimetric flange 5.

Irrespective of the structure of the sheets and of the outer skeleton 6, the apparatus 1 according to this invention in some embodiments allows the container 2 to be made by fixing the sheets to each other exclusively using the layer of thermoplastic material 7 which adheres to both.

Figure 9:
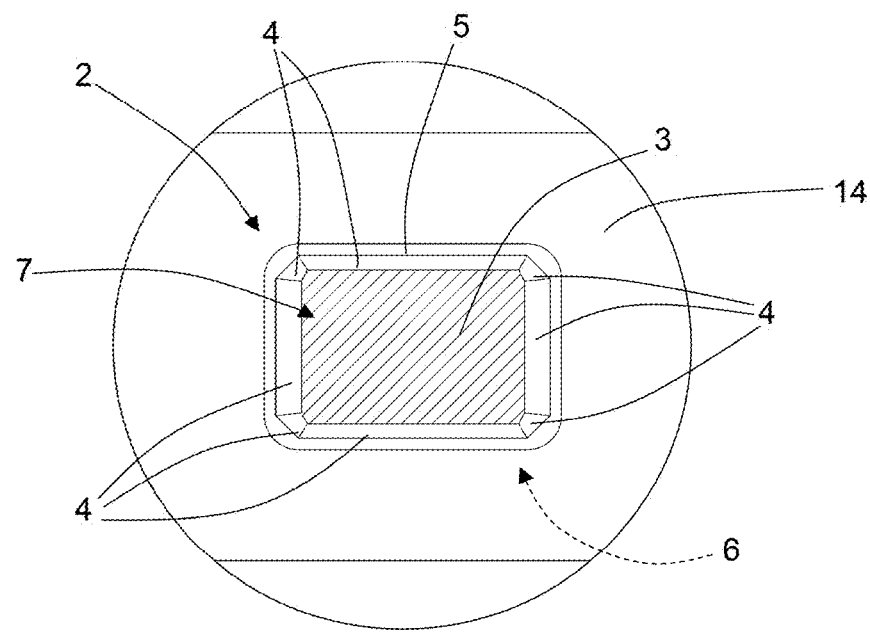
FIG. 9 is an enlarged view of the detail IX of FIG. 8.
Figure 10:
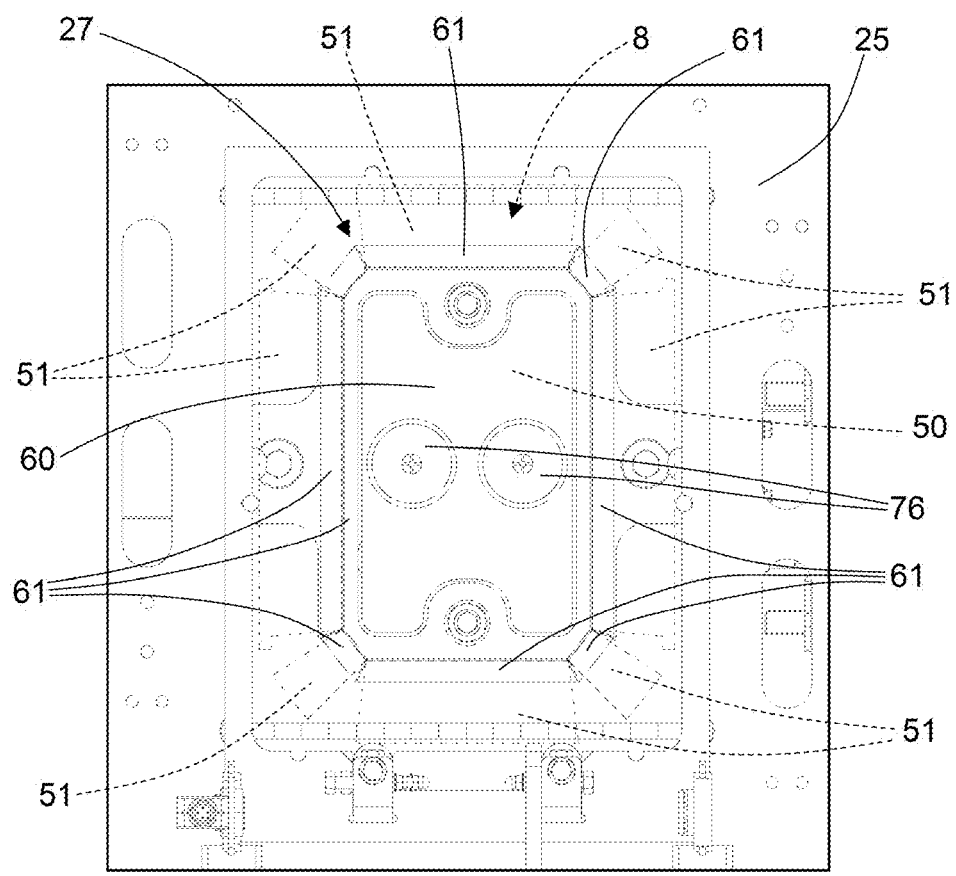
FIGS. 10 and 11 are a front view and a side view of a first transferring element and a portion of a first magazine, which are part of the apparatus of FIG. 1, with some elements removed to better illustrate others.
Figure 11:
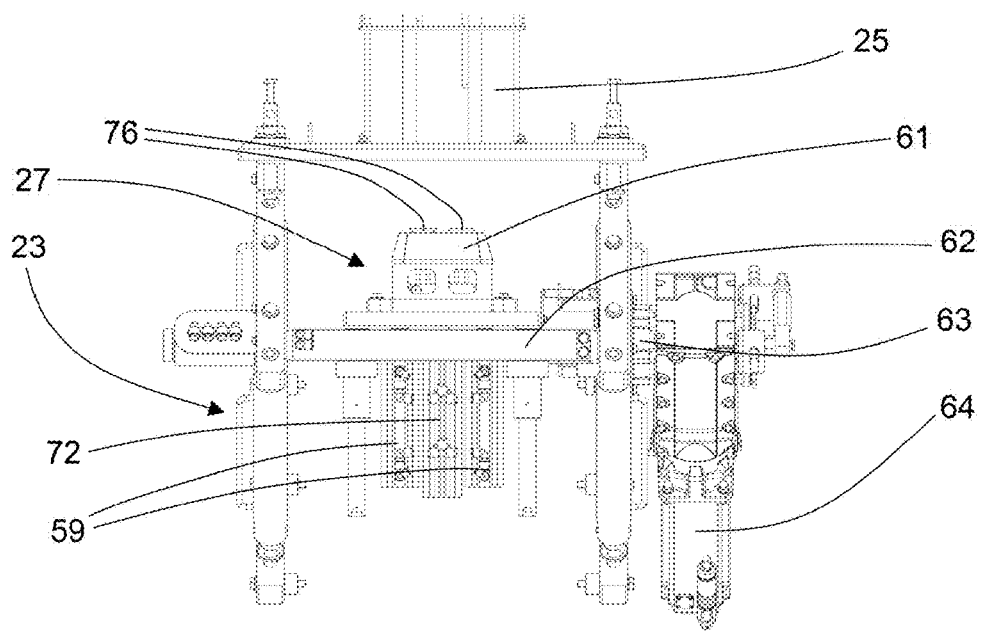

The layer of thermoplastic material 7 is made by thermoforming the thermoplastic material 10, advantageously on the previously three-dimensionally formed sheets, and allows the sheets to be fixed to each other to obtain the container 2 in this way (an example of which is shown in the detail in FIG. 9). This is advantageous since it allows containers 2 to be made without glue starting directly with the sheets in the spread out configuration, without the need to feed to the apparatus 1 the already three-dimensionally formed outer skeleton 6. In contrast, in some embodiments, the apparatus 1 is configured to fix two or more sheets to each other even using glue.

In the example embodiments shown in the accompanying figures, the outer skeleton 6 is of the type in which the first sheet 8 extends at the bottom wall 3 and the lateral walls 4, whilst the second sheet 9 extends at the perimetric flange 5 and the lateral walls 4 and is partly placed over the first sheet 8. Therefore, in the description below, reference will mainly be made to this preferred embodiment, but that shall not be considered limiting.

Figure 39:
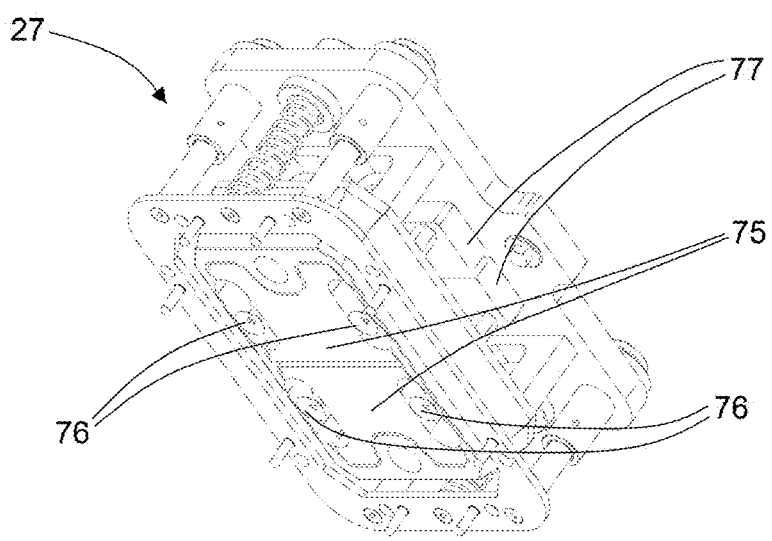

Below is first a description of the apparatus 1 with reference to its single-lane embodiments, such as that illustrated in FIGS. 1 and 39. In contrast, that is followed by a description of multi-lane embodiments of the apparatus 1, such as those illustrated in FIGS. 40 to 45. In the context of this description, the definition single-lane apparatus 1 means an apparatus 1 equipped with a single line for making containers 2, whilst the definition multi-lane apparatus 1 means an apparatus 1 equipped with a plurality of lines for making containers 2 which operate in parallel, side by side.

First, the apparatus 1 comprises a supporting structure 11, which is preferably configured to support the other components of the apparatus 1 which will be described below.

Second, the apparatus 1 comprises at least one conveying element 15 which defines a housing 22, in which during operation the container 2 is made in the ways described below, which is associated with the supporting structure 11 and which is movable relative to the supporting structure 11 along a movement path 16.

The movement path 16 extends from an infeed station 17 to an outfeed station 18, and along it the apparatus 1 has at least one first feeding station 19, one second feeding station 20 and one thermoforming station 21 placed downstream of the second feeding station 20. Whilst the presence of two feeding stations allows containers 2 to be made in which the outer skeleton 6 is constituted of two sheets, if the outer skeleton 6 is constituted of a larger number of sheets, along the movement path 16 the apparatus 1 will also be able to have further feeding stations, advantageously one for each sheet to be used. It is also possible that two or more sheets may be fed in a single feeding station, in particular if the two or more sheets are not superposed in the finished outer skeleton 6.

Returning to the embodiment in which the first feeding station 19 and the second feeding station 20 are present, depending on requirements it is possible either that the first feeding station 19 is upstream of the second feeding station 20 relative to the movement path 16, or that, conversely, the second feeding station 20 is upstream relative to the first feeding station 19.

The choice of one solution or the other will depend on the need to position the first sheet 8, respectively, on the outside or on the inside of the second sheet 9 in the finished outer skeleton 6.

In the embodiments illustrated in the figures the second feeding device 24 is placed downstream of the first feeding device 23.

In the preferred embodiments, the apparatus 1 comprises a movement device 14 which is mounted on the supporting structure 11 and with which the conveying element 15 is associated. Therefore it is the movement device 14 which defines the movement path 16 and moves the conveying element 15.

Figure 8:
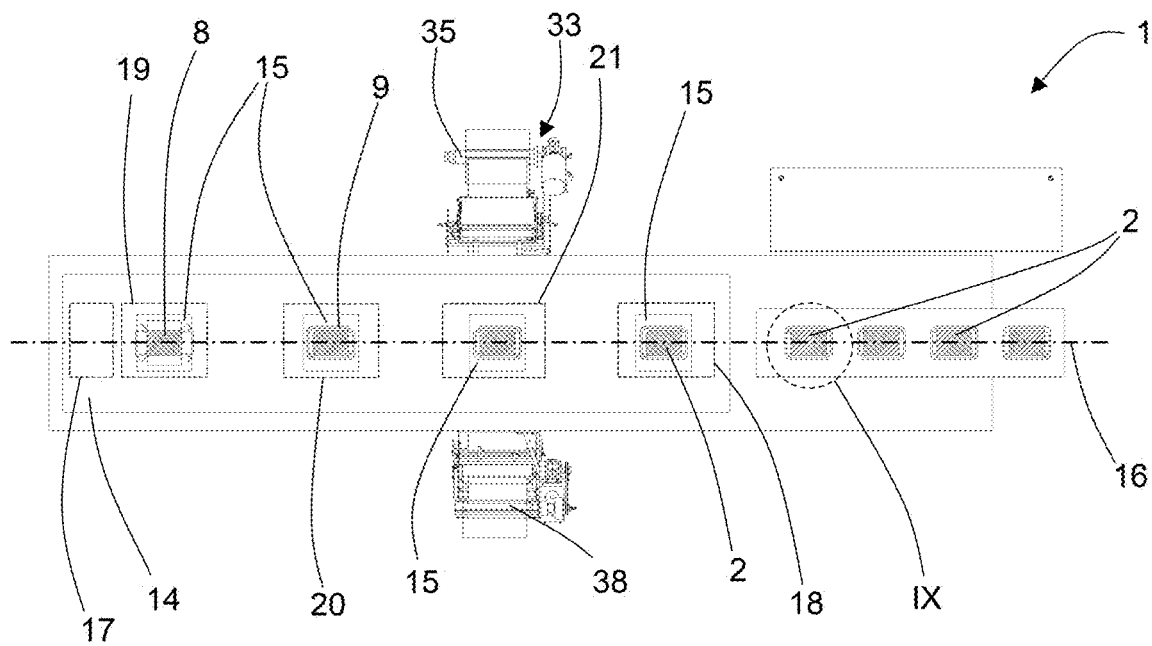

In the preferred embodiments, the movement path 16 is straight, as shown in FIG. 8, but that shall not be understood to be limiting for this invention, since the movement path 16 may extend in a different way, for example, with a curved trajectory.

Therefore, essentially, by following the movement path 16, starting from the infeed station 17 we encounter, in order, the first feeding station 19, the second feeding station 20, the thermoforming station 21 and the outfeed station 18. If further feeding stations are present, they too are placed upstream of the thermoforming station 21.

As regards the conveying element 15, in the preferred embodiments it is movable since it is associated with the movement device 14 which makes it move relative to the supporting structure 11 along the movement path 16 described above. In particular, the conveying element 15 may be movable together with the movement device 14 and may be fixed to the movement device 14. In the embodiment illustrated, for example, the movement device 14 comprises two identical chains, placed parallel to and spaced apart from each other, which move in a synchronised way along a looped path. One stretch of the looped path (the upper part in the accompanying figures) defines the movement path 16 from the infeed station 17 to the outfeed station 18, whilst the remaining stretch constitutes a return path from the outfeed station 18 to the infeed station 17. In these embodiments the conveying element 15 is mounted across the two chains or belts.

However, in other embodiments, the movement of the conveying elements 15 may also be achieved in other ways, for example by means of linear motor or planar motor systems. In particular, it may even be the case that the movement device 14 is a magnetic levitation conveyor and that the conveying element 15 is configured like a magnetic levitation carriage.

Advantageously, the movement of the conveying elements 15 will preferably always be carried out along a looped path constituted of the movement path 16 and of a return path.

Moreover, in the preferred embodiments, the apparatus 1 comprises a plurality of conveying elements 15 which are advantageously positioned one after another along the movement path 16 (or, more in general, along the looped path). That is clearly visible in the schematic illustration in FIG. 7, which uses rectangles to schematically show conveying elements 15 which are spaced apart from each other. However, it is possible that the conveying elements 15 are not spaced apart from each other along the movement path 16, instead being near each other.

The housing 22 is advantageously shaped. In fact, in the preferred embodiments, the shape of the housing 22 substantially corresponds to the shape of the outer surface of the container 2 to be made (which is defined by the outer skeleton 6 of the container 2 since the layer of thermoplastic material 7 adheres on the inside). In some embodiments the housing 22 may even have one or more protuberances 54 at its bottom, to cause the formation of one or more protuberances in the bottom of the container 2. Advantageously, the conveying element 15 comprises a shaped mould which defines the housing 22 and which, at the thermoforming station 21, becomes part of a thermoforming device 31 of the apparatus 1.

Moreover, the apparatus 1 comprises at least one first feeding device 23 and one second feeding device 24. In general the apparatus 1 may comprise a plurality of feeding devices placed at respective feeding stations.

The first feeding device 23 is positioned at the first feeding station 19, and is configured to feed, in use, the first sheet 8 to the conveying element 15. The first feeding device 23 is in fact configured to insert, in use, the first sheet 8 into the housing 22 defined by the conveying element 15, when the conveying element 15 is placed at the first feeding station 19.

In contrast, the second feeding device 24 is positioned at the second feeding station 20 and is configured to feed, in use, the second sheet 9 to the conveying element 15. The second feeding device 24 is in fact configured to insert, in use, the second sheet 9 into the housing 22 defined by the conveying element 15, when the conveying element 15 is placed at the second feeding station 20

In the embodiments illustrated, the second feeding device 24 is positioned at the second feeding station 20, which is placed downstream of the first feeding station 19 in which the first feeding device 23 is positioned. Consequently, during operation, first the first sheet 8 is inserted into the housing 22, by means of the first feeding device 23, and then the second sheet 9 is inserted over the first sheet 8, by means of the second feeding device 24, and the second sheet 9 may or may not be at least partly superposed on the first sheet 8. In contrast, in other embodiments it may be the case that the first sheet 8 is inserted into the housing 22 after the second sheet 9, over it, in that case the first feeding device 23 will be placed downstream of the second feeding device 24.

In the preferred embodiments, the apparatus 1 also comprises a first magazine 25, which is configured to store a plurality of first sheets 8, and a second magazine 26, which is configured to store a plurality of second sheets 9.

The first feeding device 23 is operatively associated with the first magazine 25. In particular, the first feeding device 23 is configured to pick up, in use, one of the first sheets 8 from the first magazine 25 and to feed it to the conveying element 15. In the preferred embodiment, the first feeding device 23 is at least partly a destacking device which picks up the first sheet 8 to be used from the first magazine 25.

The second feeding device 24 is operatively associated with the second magazine 26. In particular, the second feeding device 24 is configured to pick up, in use, one of the second sheets 9 from the second magazine 26 and to feed it to the conveying element 15. In the preferred embodiment, the second feeding device 24 is also at least partly a destacking device which picks up the second sheet 9 to be used from the second magazine 26.

In the embodiments shown in the figures, the first magazine 25 and the second magazine 26 are placed above the movement path 16 and are configured to house respectively the first sheets 8 and the second sheets 9 stacked on top of each other along respective stacking directions.

The first magazine 25 has a first releasing mouth 55, made at the front and transversally to the respective stacking direction, and a first loading mouth 56, made at the side and parallel to the stacking direction. The second magazine 26 has a second releasing mouth 57, made at the front and transversally to the respective stacking direction, and a second loading mouth 58, made at the side and parallel to the stacking direction.

In the preferred embodiments, the first feeding device 23 comprises a first transferring element 27 and the second feeding device 24 comprises a second transferring element 28.

The first transferring element 27 is movable between a first pick-up position and a first unloading position. When the first transferring element 27 is in the first pick-up position, the first transferring element 27 is associated with the first releasing mouth 55 of the first magazine 25 for picking up, in use, one of the first sheets 8 from the first magazine 25, and when the first transferring element 27 is in the first unloading position, the first transferring element 27 is associated with the conveying element 15 placed at the first feeding station 19 for feeding, in use, the first sheet 8 to the conveying element 15.

The second transferring element 28 is movable between a second pick-up position and a second unloading position. When the second transferring element 28 is in the second pick-up position, the second transferring element 28 is associated with the second releasing mouth 57 of the second magazine 26 for picking up, in use, one of the second sheets 9 from the second magazine 26, and when the second transferring element 28 is in the second unloading position, the second transferring element 28 is associated with the conveying element 15 placed at the second feeding station 20 for feeding, in use, the second sheet 9 to the conveying element 15.

Moreover, both the first transferring element 27 and the second transferring element 28 are advantageously configured to retain respectively the first sheet 8 and the second sheet 9 during the movement from the respective pick-up positions to the respective unloading positions. In particular, the first transferring element 27 and the second transferring element 28 are equipped with suction means, not shown in the figures, for retaining, respectively, the first sheet 8 and the second sheet 9.

Advantageously the suction means are placed at a first face of the first retaining element, which is configured to make contact, in use, with the first sheet 8, and at a second face of the second retaining element, which is configured to make contact, in use, with the second sheet 9. In more detail, the suction means may comprise one or more suction cups and may be activated when the transferring elements are in the pick-up position and deactivated when the transferring elements have inserted the respective sheets into the housing 22 of the conveying element 15. It is possible that the suction means comprise a plurality of suction holes.

In the embodiment illustrated, the first transferring element 27 and the second transferring element 28 are movable, respectively, between the first pick-up position and the first unloading position, and between the second pick-up position and the second unloading position, according to a rotary movement around, respectively, a first axis of rotation 29 and a second axis of rotation 30. Preferably, the rotary movement (indicated by the arrow 99 in the schematic FIG. 7) is an oscillating movement and preferably covers the smallest angle necessary to pass from the respective pick-up positions to the respective unloading positions.

Advantageously, the first magazine 25 and the second magazine 26 are positioned in such a way that the respective stacking directions are angled, respectively, relative to the first axis of rotation 29 and to the second axis of rotation 30, as well as relative to the sliding plane of the conveying elements 15 along the movement path 16 (horizontal in the accompanying figures). Moreover, preferably, the stacking directions are not perpendicular to that sliding plane. The first loading mouth 56 and the second loading mouth 58 are at least partly directed upwards. That is particularly advantageous both since it makes loading of the first sheets 8 and of the second sheets 9 respectively inside the first magazine 25 and the second magazine 26 easy (loading which, for example, may be performed manually by a user), and since it reduces the times necessary for feeding both the first sheet 8 to the conveying element 15 and the second sheet 9 to the conveying element 15. However embodiments are possible in which the first magazine 25 and the second magazine 26 are positioned differently, for example in which the first magazine 25 and the second magazine 26 are positioned with the respective stacking directions perpendicular to the sliding plane.

Figure 7:
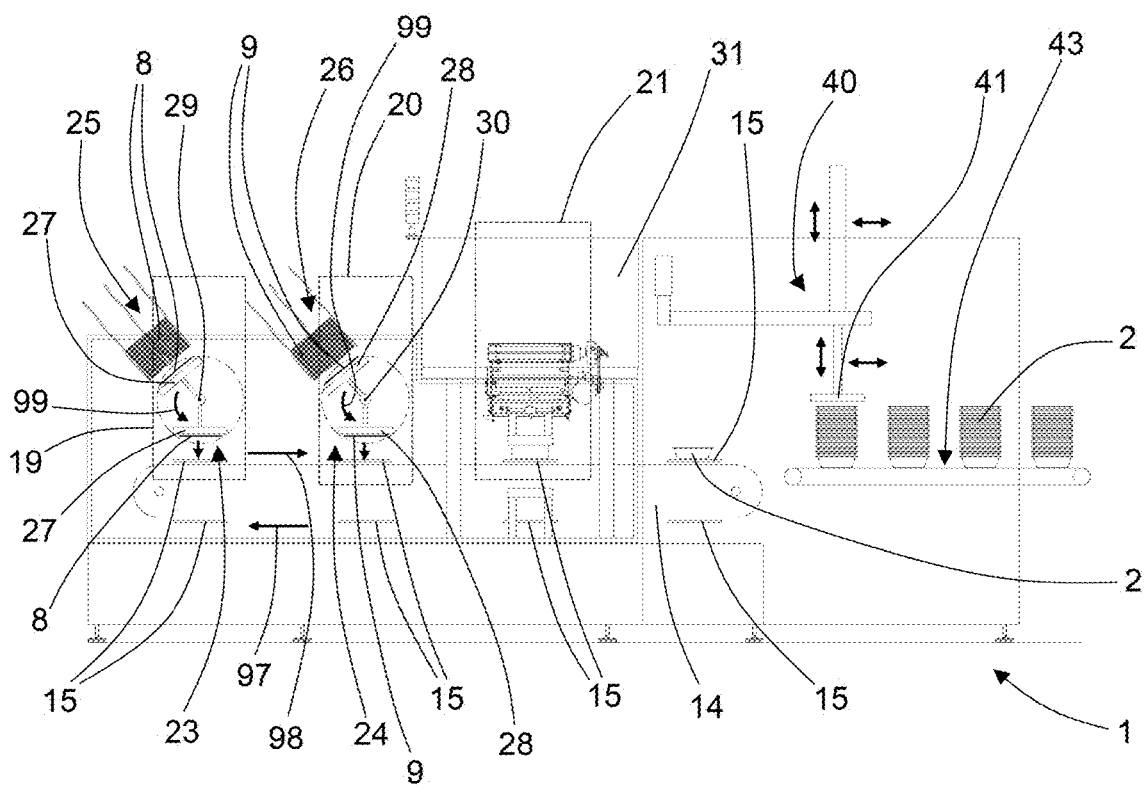
FIGS. 7 and 8 are a schematic side view and a schematic top view of the apparatus of FIG. 1.

It should be emphasised that FIG. 7 is an example figure and shows the first transferring element 27 which is simultaneously both in the first pick-up position in which it retains the first sheet 8, and in the first unloading position still retaining the first sheet 8, and the second transferring element 28 which is simultaneously both in the second pick-up position, in which it retains the second sheet 9, and in the second unloading position still retaining the second sheet 9.

Moreover, advantageously, both the first transferring element 27 and the second transferring element 28 are not movable only according to the rotary movement around the respective axis of rotation. In fact, they are also movable transversally, and preferably perpendicularly, to the respective axis of rotation. The first transferring element 27 is movable between a first retracted position and a first extended position and a further first extended position. The second transferring element 28 is movable between a second retracted position and a second extended position and a further second extended position.

When the first transferring element 27 is in the first pick-up position, in fact, in use it is moved first towards the first magazine 25 (from the first retracted position to the first extended position), for picking up one of the first sheets 8, and then away from the first magazine 25 (from the first extended position to the first retracted position), after having picked up the first sheet 8. In particular, this movement is caused by a first main actuator 59, advantageously linear, which is part of the first feeding device 23 and which is switchable between a first retracted configuration and a first extended configuration. The first main actuator 59 rotates with the first transferring element 27 between the first pick-up position and the first releasing position. In more detail, when the first transferring element 27 is in the first pick-up position, the movement of the first transferring element 27 towards the first magazine 25 is caused by the switching of the first main actuator 59 from the first retracted configuration to the first extended configuration, whilst the movement of the first transferring element 27 away from the first magazine 25 is caused by the opposite switching of the first main actuator 59, from the first extended configuration to the first retracted configuration.

Second, when the first transferring element 27 is in the first unloading position, it is movable first towards the conveying element 15 (from the first retracted position to the further first extended position) for inserting the first sheet 8 into the housing 22 of that conveying element 15, and then away from the conveying element 15 (from the further first extended position to the first retracted position), after having released the first sheet 8 into the housing 22. This movement is again caused by the first main actuator 59 which is switchable between the first retracted configuration and a further first extended configuration similarly to what was described for the first pick-up position (the further first extended configuration may or may not correspond to the first extended configuration adopted in the first pick-up position).

In some embodiments, the first main actuator 59 has a same stroke both when the first main actuator 59 switches between the retracted configuration and the first extended configuration, and when the first main actuator 59 switches between the retracted configuration and the further first extended configuration. However, that shall not be understood as limiting for this invention, since it is possible that the first magazine 25 and the conveying element 15 are positioned differently, in such a way that the two strokes are different.

In the embodiments in which the first sheet 8 must be folded from a flat configuration to a three-dimensional configuration, the first transferring element 27 is at least partly shaped to match the housing 22 defined by the conveying element 15 in such a way as to be insertable inside the housing 22 retaining the first sheet 8. In fact the first transferring element 27 is configured to be inserted into the housing 22 so as to insert the first sheet 8 into it, at the same time causing its three-dimensional forming. In fact, since the first transferring element 27 is at least partly shaped to match the housing 22, in use they act together, respectively as a punch and a die, for deforming the first sheet 8 in such a way that it adopts the shape dictated by the surface of the housing 22 defined by the conveying element 15 (externally) and by the surface of the first transferring element 27 (internally). Therefore, advantageously, the first transferring element 27 is at least partly shaped to match the housing 22, at least in the zones in which, in use, the first sheet 8 must adopt a three-dimensional configuration. In particular, the zones in which that may be required may be the zones which correspond to the bottom wall 3, and/or to the lateral walls 4 and/or to the perimetric flange 5 based on which of these zones are covered by the first sheet 8.

Advantageously, the first transferring element 27 comprises a first gripping portion 60 and a first shaping portion 61, which are movable relative to each other, advantageously according to a translating movement. Preferably, the first gripping portion 60 and the first shaping portion 61 are movable along the direction of action of the first main actuator 59 (both between the first retracted configuration and the first extended configuration, and between the first retracted configuration and the further first extended configuration). In particular, the first gripping portion 60 is configured to pick up, in use, one of the first sheets 8 from the first magazine 25 when the first transferring element 27 is in the first pick-up position and to retain, in use, this first sheet 8 during the movement of the first transferring element 27 from the first pick-up position to the first unloading position, until inside the housing 22. For this reason, the suction means previously mentioned are advantageously associated with the first gripping portion 60 of the first transferring element 27. In turn, the first shaping portion 61 is configured to three-dimensionally form the first sheet 8 inside the housing 22.

In the preferred embodiments, both during the movement of the first transferring element 27 between the first pick-up position and the first unloading position, and during the movement of the first transferring element 27 between the retracted position and the extended positions, the first gripping portion 60 and the first shaping portion 61 move together with each other and together they substantially define the outer surface of the first transferring element 27 (which is facing the first magazine 25, when the first transferring element 27 is in the first pick-up position, and facing the conveying element 15, when the first transferring element 27 is in the first unloading position).

Advantageously, in the embodiment illustrated, when the first transferring element 27 is in the first pick-up position and the first main actuator 59 is in the first extended configuration, the first gripping portion 60 is movable, relative to the first shaping portion 61, further towards the first magazine 25, in such a way that the first gripping portion 60 makes contact with one of the first sheets 8 contained in the first magazine, the one placed at the first releasing mouth 55. Advantageously, in use, the suction means are then activated for picking up the first sheet 8 in this way. After having picked up the first sheet 8, the first gripping portion 60 is moved away from the first magazine 25, retaining the first sheet 8, until it has returned to the starting configuration in which the first gripping portion 60 and the first shaping portion 61 together define the surface described above. However, in other embodiments it may be the case that during the sheet pick-up step, the first gripping portion 60 and the first shaping portion 61 always move together with each other.

Then, retaining the first sheet 8 (and therefore keeping the suction means active), the first transferring element 27 is moved from the first pick-up position to the first unloading position. When the first transferring element 27 is in the first unloading position, the first main actuator 59 is switched from the first retracted configuration to the further first extended configuration. When the first transferring element 27 is in the first unloading position and in the further first extended position, the first transferring element 27 is inserted inside the housing 22 defined by the conveying element 15. Therefore the first sheet 8 was deformed in such a way as to adopt the shape previously described.

Then, advantageously, first the first shaping portion 61 is moved away from the conveying element 15, in contrast keeping the first gripping portion 60 in contact with the first sheet 8. In fact in this way it is possible to avoid the risk of the friction between the first sheet 8 and the first shaping portion 61 being able to cause an unwanted extraction of the first sheet 8 from the housing 22. Only then, after the suction means have been deactivated, the first gripping portion 60 is also moved away from the conveying element 15 until it is re-aligned with the first shaping portion 61. A solution of this type is advantageous since it allows the first transferring element 27 to be extracted from the housing 22 while avoiding also pulling out the first sheet 8.

In the embodiments illustrated, the first shaping portion 61 is ring-shaped and at the centre defines a zone in which the first gripping portion 60 is positioned. Advantageously, in the embodiment illustrated, in which the first sheet 8 is intended to form the bottom wall 3 and part of the lateral walls 4 of the outer skeleton 6, the first shaping portion 61 is externally configured roughly in a frustopyramidal way. In particular, the first shaping portion 61 comprises angled lateral walls 4, which are configured to make contact with the portions of the first sheet 8 which define the lateral walls 4 of the container 2, and an annular front wall, which is configured to make contact with a part of the portion of the first sheet 8 which defines the bottom wall 3 of the container 2. However, as already indicated, the shape of the first transferring element 27 is dictated by the shape of the container 2 to be formed; consequently, depending on the type of container 2 to be formed the shapes of the first shaping portion 61 and of the first gripping portion 60 will also change.

Otherwise, when the first transferring element 27 does not have to three-dimensionally form the first sheet 8 (for example since the first sheet 8 defines only a flat portion of the outer skeleton 6, such as the bottom or the flange) the first transferring element 27 does not need to be shaped to match the housing 22.

In the embodiments illustrated in the accompanying figures, the first feeding device 23 comprises a first shaft 62 rotatably fixed to the supporting structure 11 according to the first axis of rotation 29, with which, by means of a first reduction unit 63, a first motor 64 is associated which causes its oscillation between two limit positions which correspond to the pick-up position and to the releasing position of the first transferring element 27.

Two first guiding bars 65 are slidably associated with the first shaft 62 along a direction perpendicular to the first axis of rotation 29, and support a first base 66 of the first transferring element 27.

Rigidly mounted on the first shaft 62 is the first main actuator 59 which in the embodiments illustrated comprises two first fluid cylinders 67, whose first jackets 68 are fixed to the first shaft 62, and whose first pistons 69 are fixed to the first base 66. The direction of action of the first actuator is parallel to the direction defined by the first guiding bars 65.

The first shaping portion 61 is rigidly constrained to the first base 66 and moves together with it between the first retracted position and the first extended positions.

In contrast, the first gripping portion 60 is slidably associated with a plurality of first supporting pins 70, fixed to the first base 66, and which also extend parallel to the direction defined by the first guiding bars 65. The first gripping portion 60 is therefore movable relative to the first base 66 and to the first shaping portion 61 between a first recessed position, in which it is aligned with the first shaping portion 61, and a first projecting position in which it projects relative to the first shaping portion 61 away from the first base 66. Also associated with the first supporting pins 70 are first springs 71 configured to keep or return the first gripping portion 60 in the first recessed position in the absence of stresses.

Figure 12:
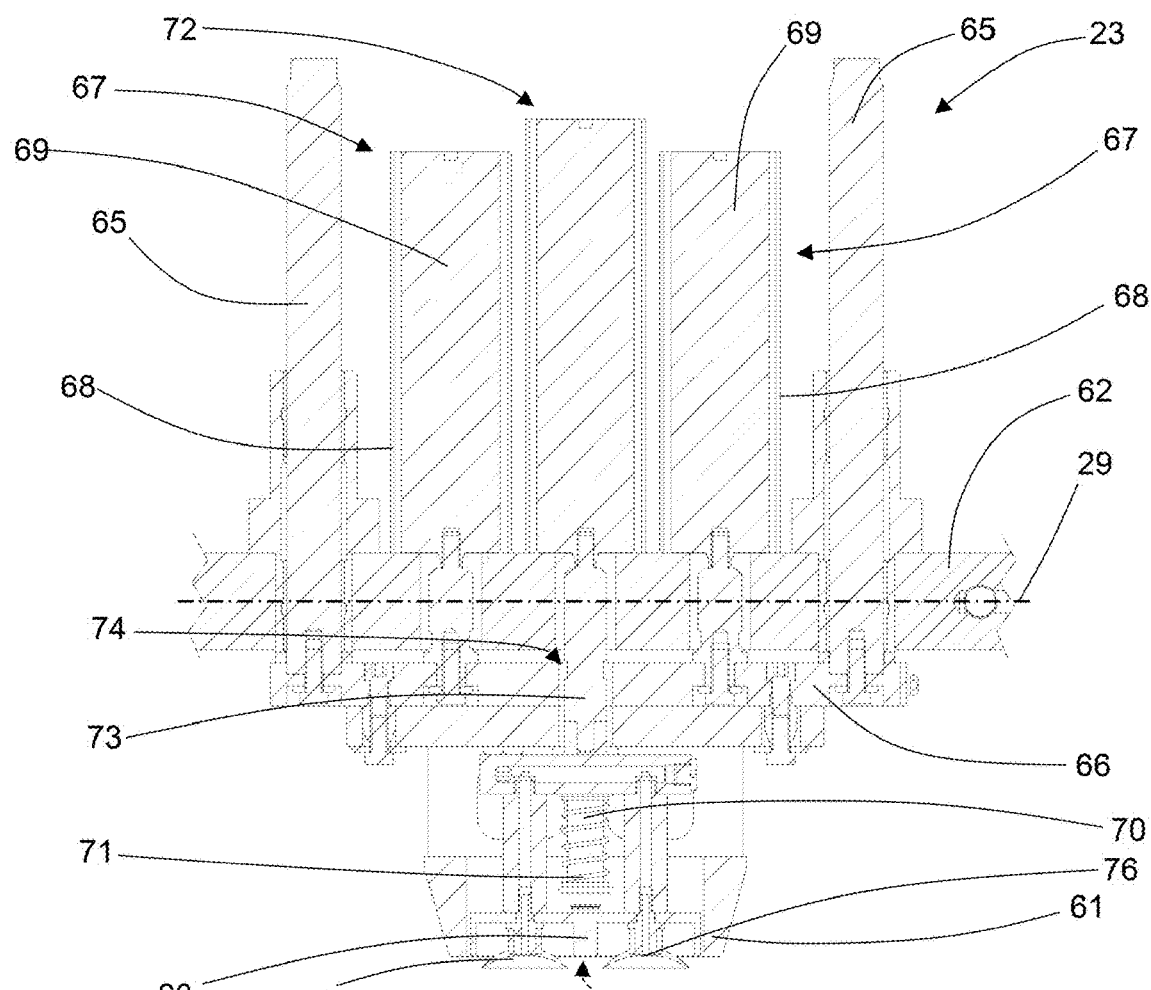
FIG. 12 is a vertical section of the first transferring element of FIG. 11 sectioned according to a plane parallel to the plane of the side view of FIG. 11.
Figure 17:
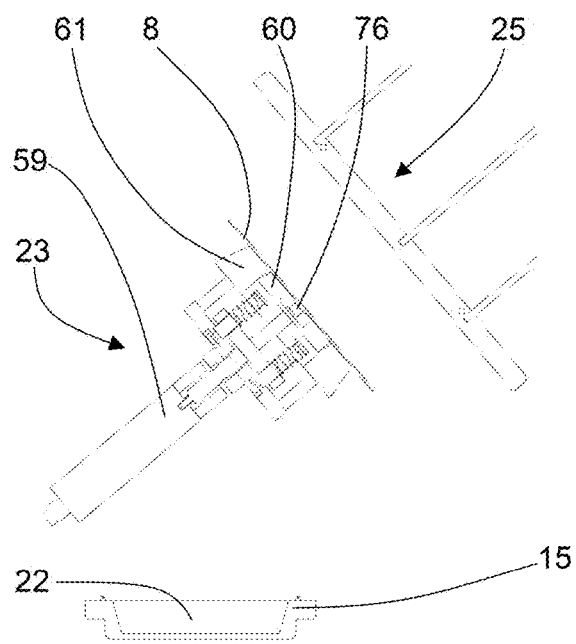
Figure 18:
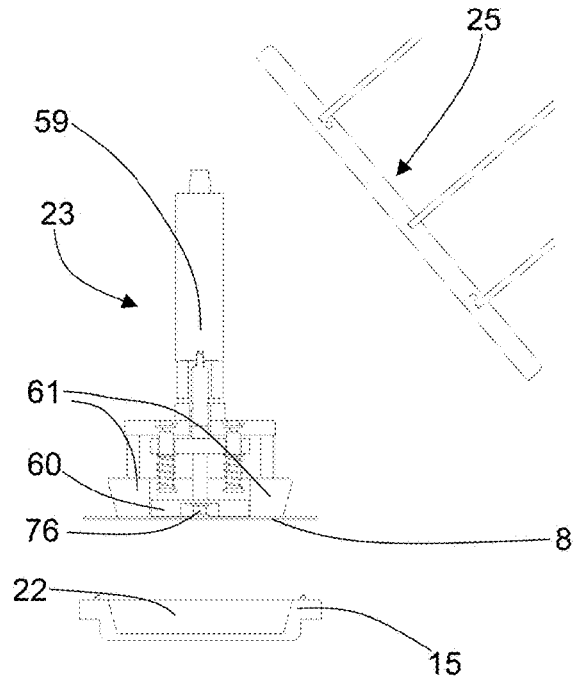
Figure 19:
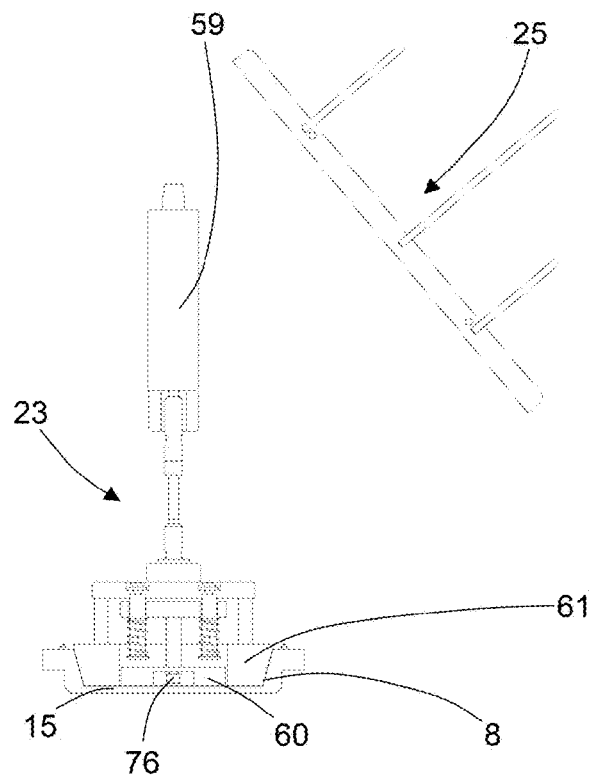
Figure 20:
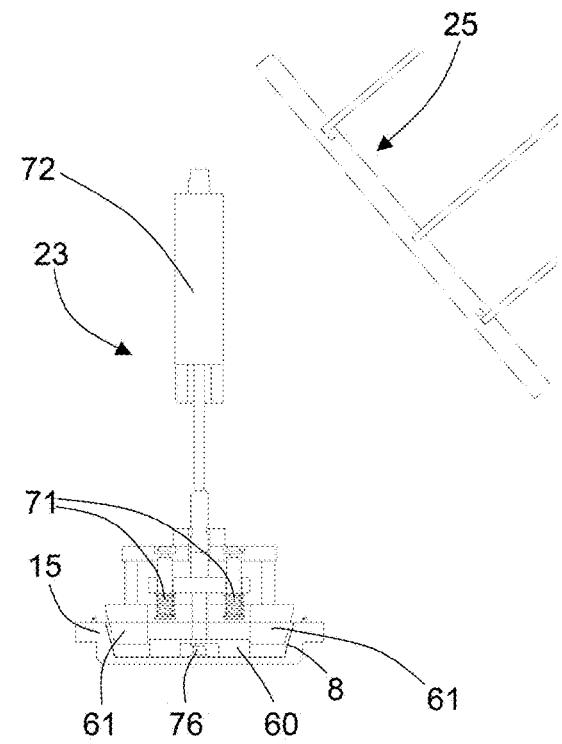
Figure 21:
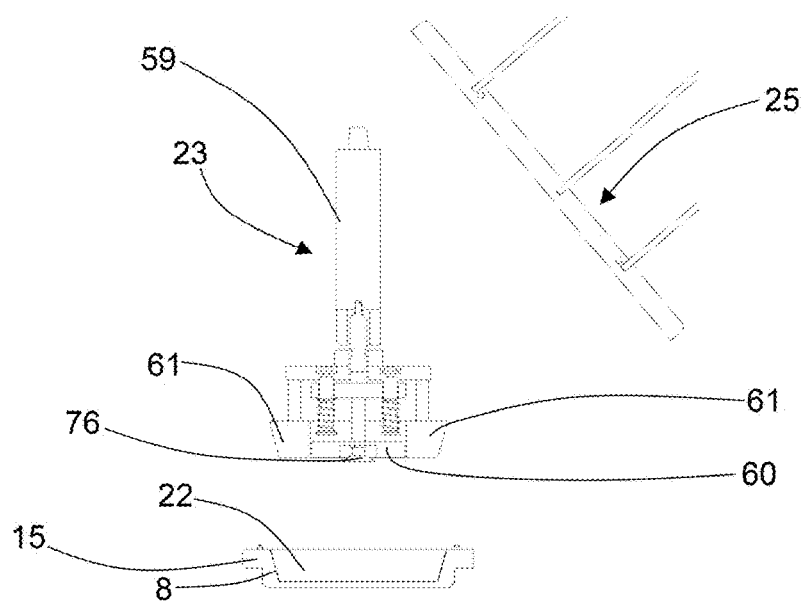
Figure 22:
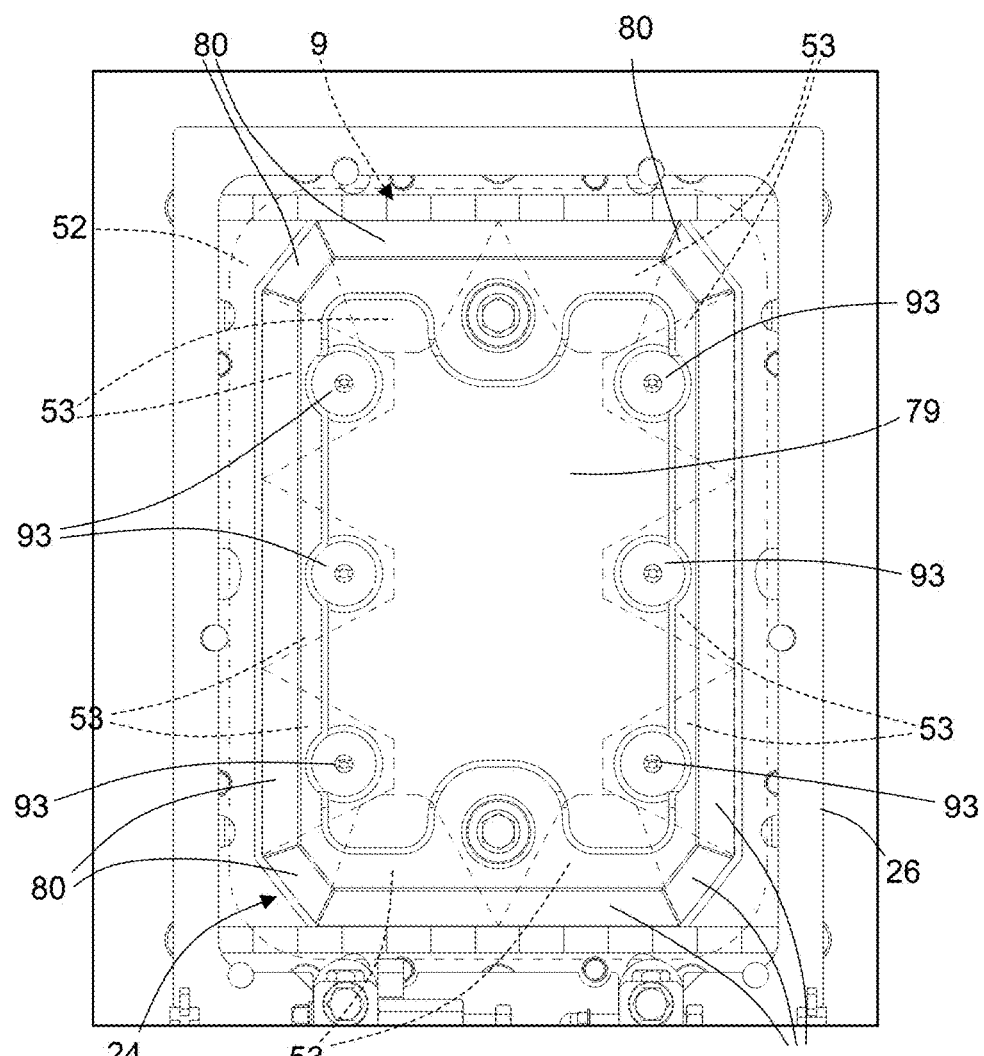
FIGS. 22 and 23 are a front view and a side view of a second transferring element and a portion of a second magazine, which are part of the apparatus of FIG. 1, with some elements removed to better illustrate others.
Figure 23:
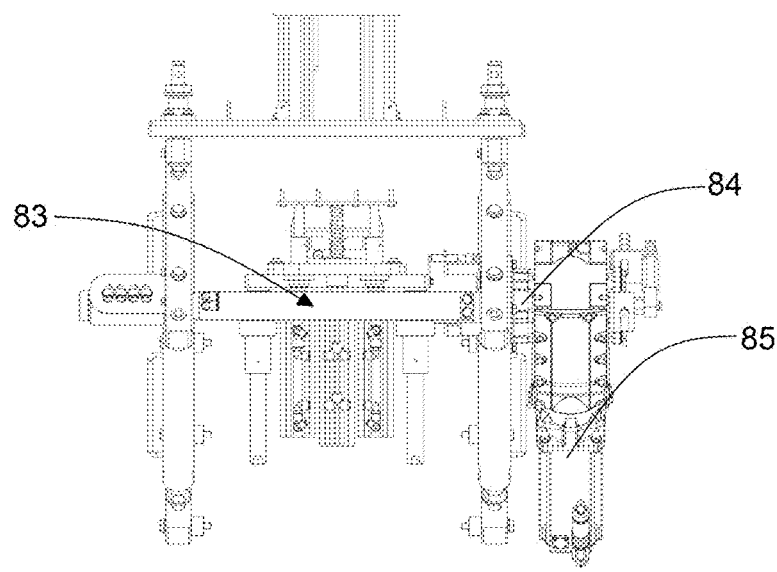
Figure 24:
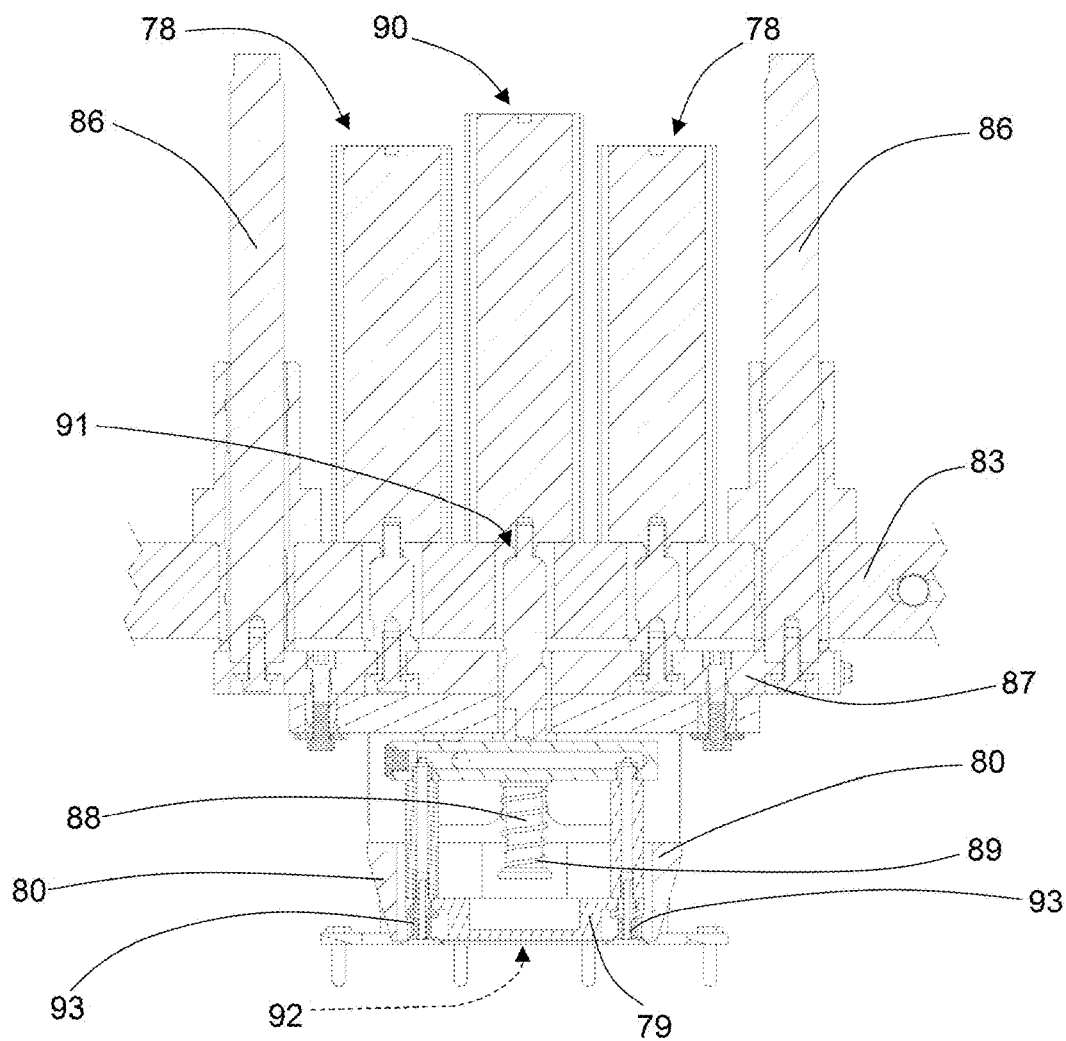
FIG. 24 is a vertical section of the second transferring element of FIG. 23 sectioned according to a plane parallel to the plane of the side view of FIG. 23.
Figures 25, 26:
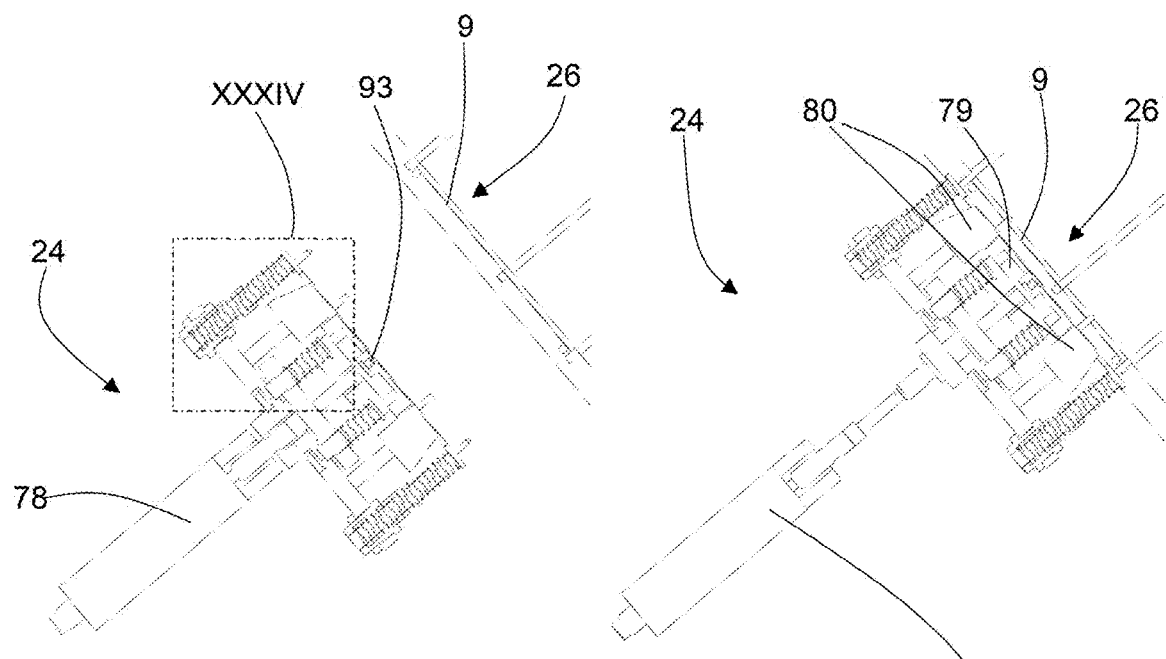
FIGS. 25 to 33 are schematic vertical sections of the second transferring element in different positions, the second magazine and the conveying element.
Figures 27, 28:
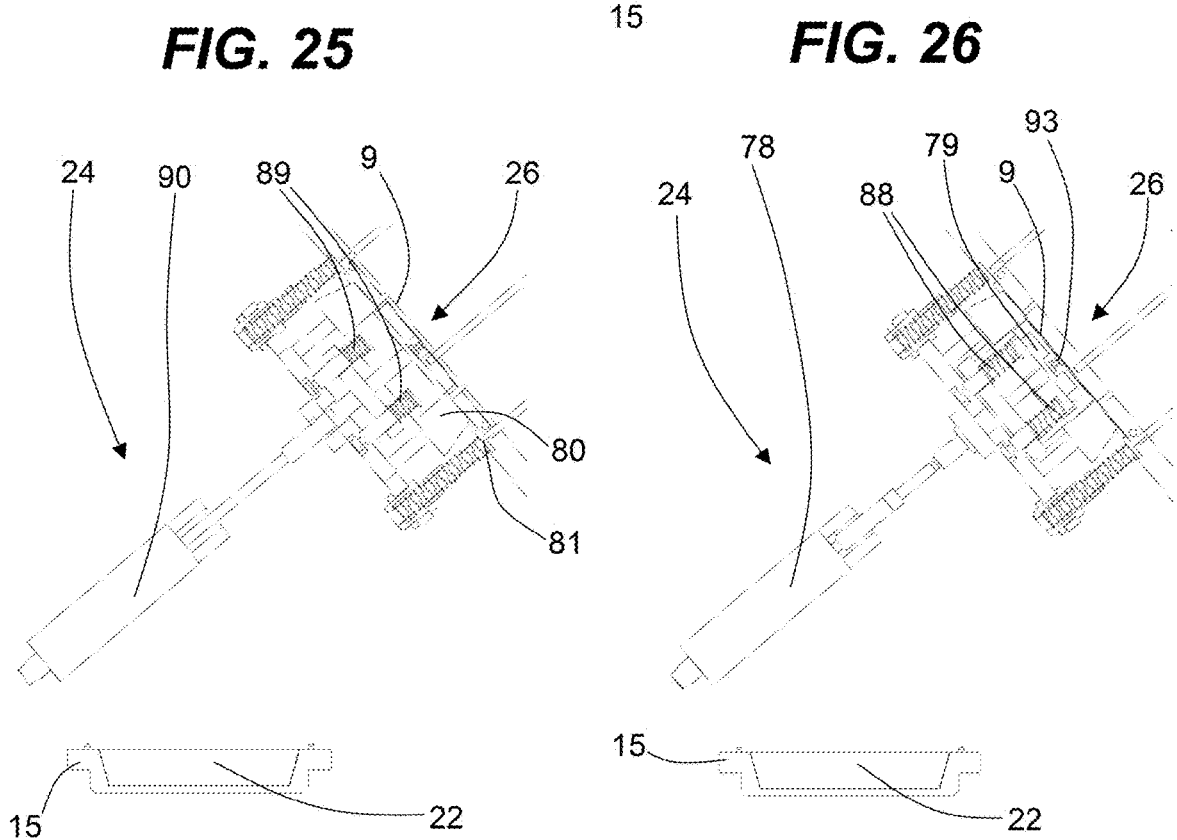
Figure 29:
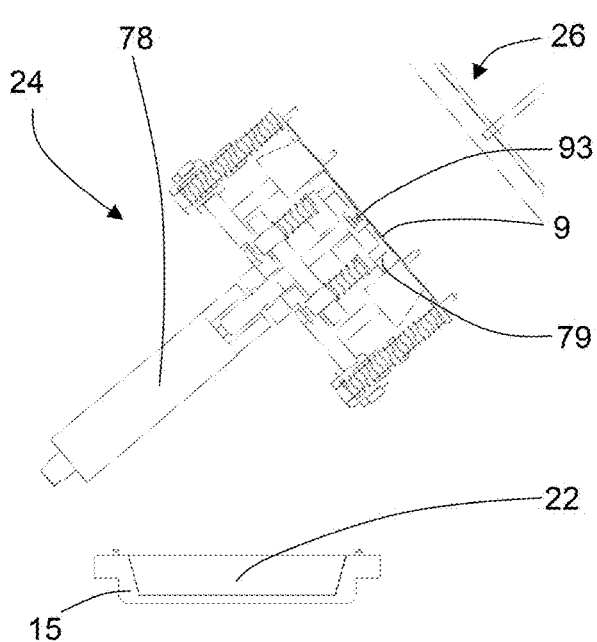
Figure 30:
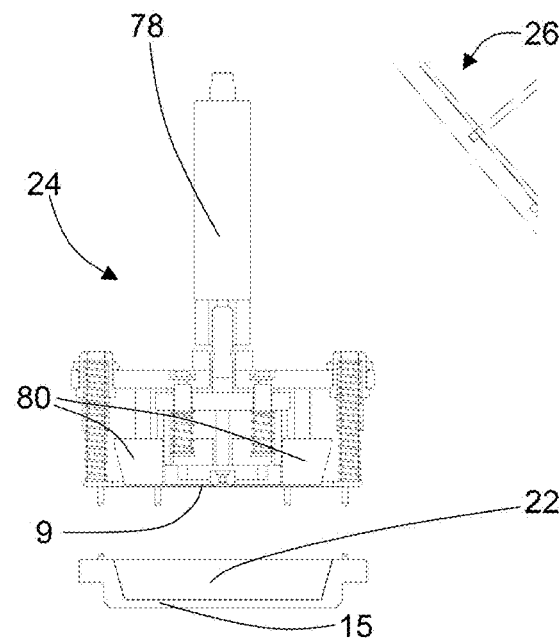
Figure 31:
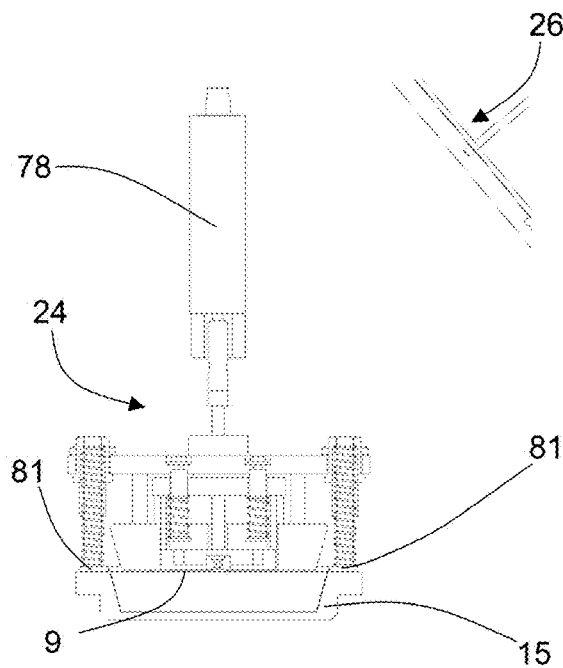
Figure 32:
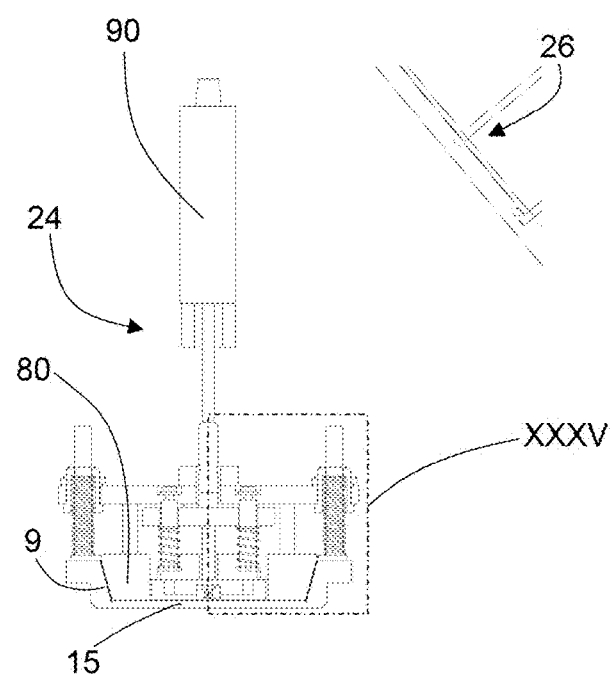
Figure 33:
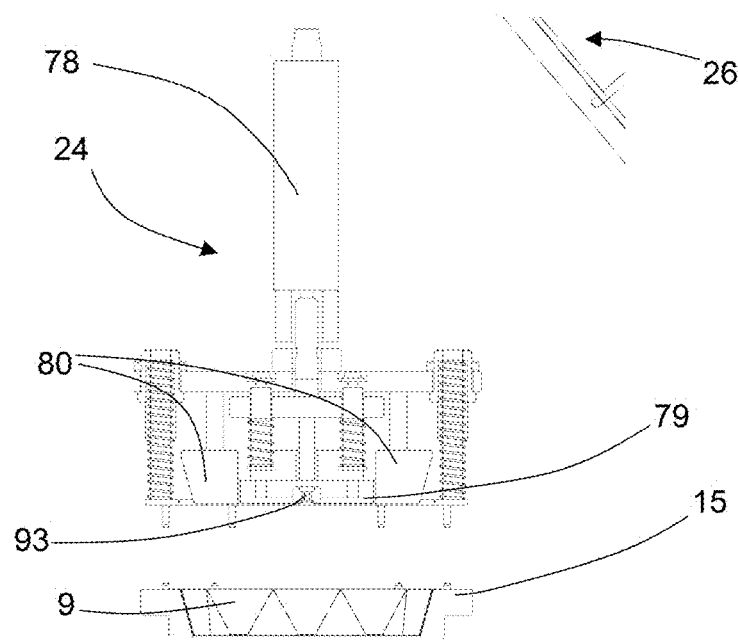
Figure 34:
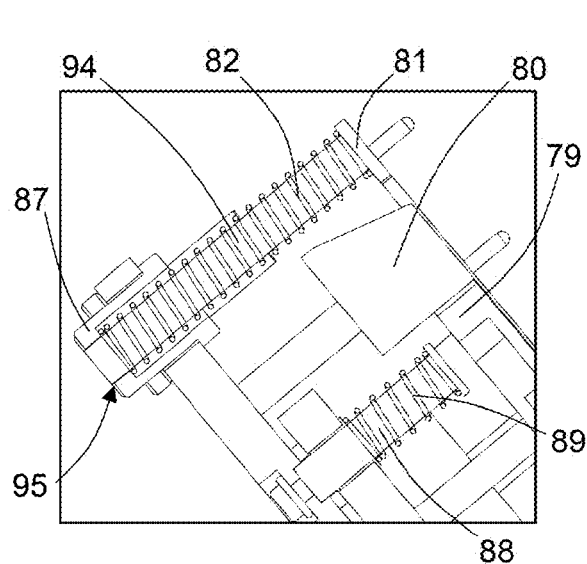
FIGS. 34 and 35 are enlarged views respectively of the detail XXXIV of FIG. 25 and the detail XXXV of FIG. 32.
Figure 35:
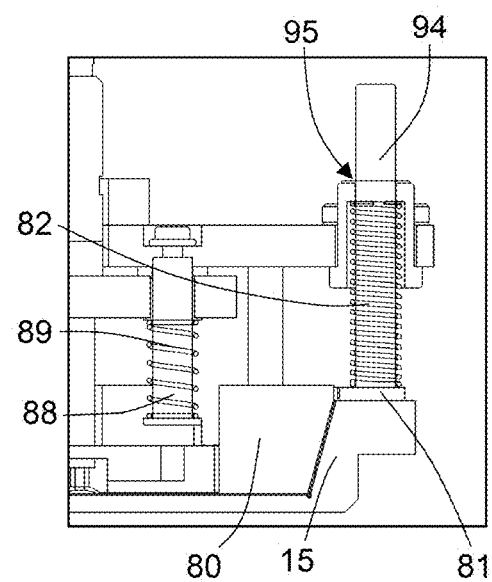
Figure 36:
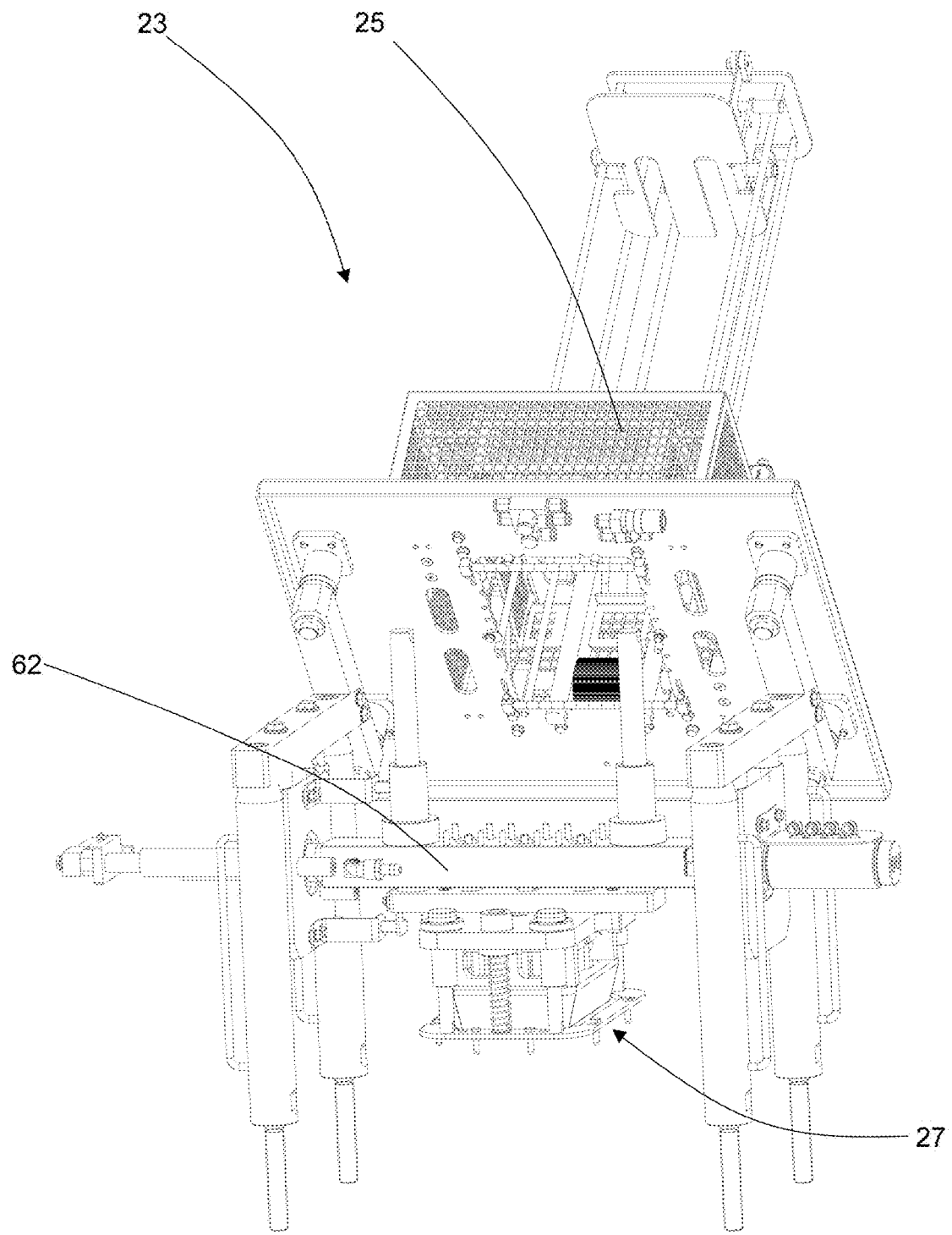
FIG. 36 is an axonometric view of an embodiment of a first feeding device.
Figure 37:
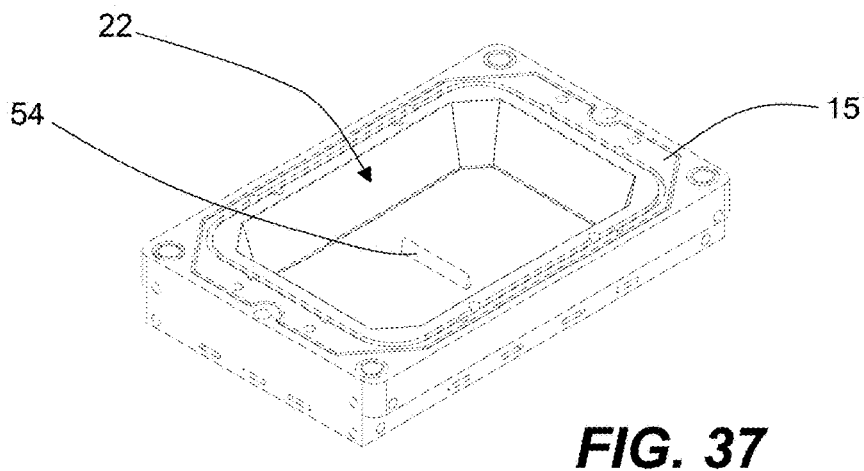
FIG. 37 is an axonometric view of an embodiment of a conveying element.

The shifting of the first gripping portion 60 from the first recessed position to the first projecting position is caused by a first secondary actuator 72 which is also fixed to the first shaft 62. As can be seen in FIG. 12, the rod 73 of the first secondary actuator 72 may interact with the first gripping portion 60 through a first hole 74 made in the first base 66; however, advantageously, the rod 73 is not constrained to the first gripping portion 60 and can act on it exclusively by pushing towards the first projecting position; in contrast, the return towards the first recessed position is guaranteed by the first springs 71 when the action of the first secondary actuator 72 ceases.

Moreover, in the embodiments illustrated, the first gripping portion 60 comprises both a first resting plate 75, and a plurality of first suction cups 76 connected to the suction means and fixed to the first resting plate 75 in such a way as to project slightly from it.

Figure 38:
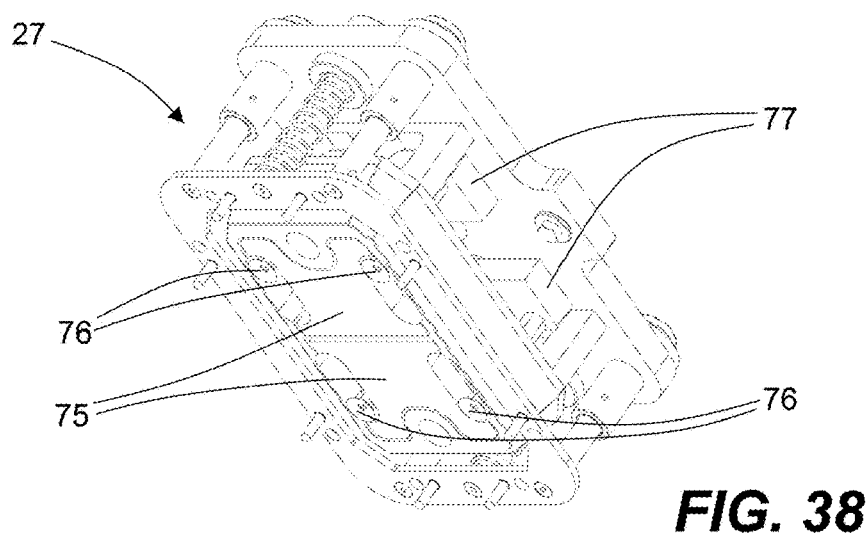
FIGS. 38 and 39 are axonometric views of a first transferring device respectively with first suction cups respectively in an apart position and in a near position.

In some embodiments, the first gripping portion 60 may also be configured either to deform the first sheet 8 after having picked it up and before releasing it into the housing 22, or to collect a first sheet 8 constituted of two or more detached parts (each of which would therefore in itself constitute a sheet) and to vary the position of those parts before releasing them into the housing 22. In this case, the first gripping portion 60 may comprise two or more first parts 77 movable relative to each other in the plane perpendicular to the direction dictated by the first guiding bars 65. Each first part 77 is equipped with retaining means for retaining the first sheet 8 or may be constituted of those retaining means (in this case the retaining means may be movable relative to the first resting plate 75). Advantageously the retaining means may be part of the suction means and may for example be constituted of suction cups or of suction holes. One example of this type is shown in FIGS. 38 and 39, in which the first gripping portion 60 comprises a fixed first resting plate 75, and the retaining means comprise first suction cups 76 movable between a near position (FIG. 39) and an apart position (FIG. 38).

In the embodiments illustrated, in which the second sheet 9 is intended to constitute the perimetric flange 5 and part of the lateral walls 4 of the outer skeleton 6, the second transferring element 28 has many similarities to the first transferring element 27 and what was described for the first transferring element 27 shall also be considered applicable to the second transferring element 28, with the appropriate adjustments (for example substituting "first" with "second" in the naming of the various parts).

Therefore the second transferring element 28 can be moved by a second main actuator 78, advantageously linear, which is switchable between a second retracted configuration and a second extended configuration, in the second pick-up position, and between the second retracted configuration and a further second extended configuration in the second unloading position.

Similarly to the stroke of the first main actuator 59, the stroke of the second main actuator 78 too may or may not be the same when the second main actuator 78 switches between the second retracted configuration and, respectively, the second extended configuration and the further second extended configuration.

In the preferred embodiments, the second transferring element 28 too may advantageously be at least partly shaped to match the housing 22 defined by the conveying element 15, at least in the zones in which, in use, the second sheet 9 must adopt a three-dimensional configuration as a result of the interaction between the second transferring element 28 and the housing 22. The second transferring element 28 too advantageously comprises a second gripping portion 79 and a second shaping portion 80 which are movable relative to each other, similarly to the first gripping portion 60 and to the first shaping portion 61, as well as suction means associated with the second gripping portion 79. However, the second gripping portion 79 can be distinguished from the first gripping portion 60 as regards the shape which will be dictated by the need to position the suction means at a portion of the sheet to be moved.

In the preferred embodiments, both during the movement of the second transferring element 28 between the second pick-up position and the second unloading position, and during the movement of the second transferring element 28 between the second retracted position and the second extended position and the further second extended position, the second gripping portion 79 and the second shaping portion 80 move together with each other and together they substantially define the outer surface of the second transferring element 28.

Advantageously, when the second transferring element 28 is in the second pick-up position and the second main actuator 78 is in the second extended configuration, the second gripping portion 79 is further movable, relative to the second shaping portion 80, towards the second magazine 26, in such a way that the second gripping portion 79 makes contact with one of the second sheets 9 contained in the second magazine 26, the one placed at the second releasing mouth 57. Advantageously, in use, the suction means are then activated for picking up the second sheet 9 in this way. After having picked up the second sheet 9, the second gripping portion 79 is moved away from the second magazine 26, retaining the second sheet 9, until it has returned to the starting configuration in which the second gripping portion 79 and the second shaping portion together define the surface described above. However, in other embodiments it may be the case that during the sheet pick-up step, the second gripping portion 79 and the second shaping portion 80 always move together with each other.

Then, retaining the second sheet 9 (and therefore keeping the suction means active), the second transferring element 28 is moved from the second pick-up position to the second unloading position. When the second transferring element 28 is in the second unloading position, the second main actuator 78 is switched from the second retracted configuration to the further second extended configuration.

In the embodiments in which the second sheet 9 defines the flange of the outer skeleton 6 and must also be three-dimensionally formed to at least partly make the lateral walls 4, the relative transferring device advantageously also comprises a clamping portion 81, which is configured to couple with the conveying element 15 to clamp, in use, the portion of the second sheet 9 which defines the flange of the container 2. In particular, the clamping portion 81 is activated to retain this portion of the second sheet 9, before the second gripping portion 79 and the second shaping portion 80 are inserted inside the housing 22.

In more detail, when the second transferring element 28 is in its releasing position, as a result of the movement of the second transferring element 28 from the second retracted position towards the further second extended position, the clamping portion 81 is movable between a home position, in which it is spaced apart from the conveying element 15 and, in use, does not interfere with the second sheet 9 retained by the second transferring element 28, and an operating position in which it clamps the second sheet 9 against the conveying element 15. In the preferred embodiment, the clamping portion 81 is slidably associated with the rest of the second transferring element 28 parallel to the second direction of switching of the second main actuator 78, and there are auxiliary elastic return means 82 which push it towards the home position.

In general, in the embodiment illustrated in the accompanying figures, the structure of the second feeding device 24 reproduces that of the first feeding device 23; without repeating what was described above, the second feeding device 24 comprises a second shaft 83, a second reduction unit 84, a second motor 85, second guiding bars 86, a second base 87, the second main actuator 78, a plurality of second supporting pins 88, second springs 89, a second secondary actuator 90, a second hole 91, a second resting plate 92 and a plurality of second suction cups 93.

Moreover, in the case of the second retaining element the clamping portion 81 is present which in the embodiments illustrated has an annular shape, and which comprises a plurality of rods 94 slidably associated with sliding seats 95 made in the second base 87. The auxiliary elastic return means 82 are mounted between the second base 87 and the clamping portion 81, around the rods 94, for pushing the clamping portion 81 outwards in the absence of stresses.

Finally, if the second sheet 9 has flaps which extend outwards from the portion intended to constitute the annular flange, the second feeding device 24 and/or the second magazine 26 may be equipped with a folding unit configured to fold the flaps on the flange after the second sheet 9 has been picked from the stack of second sheets 9.

When the second transferring element 28 is in the second unloading position and the second main actuator 78 is in the further second extended configuration, the second transferring element 28 is inserted inside the housing 22 defined by the conveying element 15. Therefore the second sheet 9 was deformed in such a way as to adopt the shape previously described, whilst its portion intended to constitute the flange remained clamped between the clamping portion 81 and the conveying element 15.

In the embodiments illustrated, the second shaping portion 80 is ring-shaped like the first shaping portion 61 and at the centre defines a zone in which the second gripping portion 79 is positioned.

In some embodiments the first transferring element 27 and/or the second transferring element 28 may be configured in such a way as to cause, at the same time as insertion of the first sheet 8 and/or respectively of the second sheet 9 into the housing 22, the non-simultaneous folding of different flaps of the first sheet 8 and/or respectively of the second sheet 9, in such a way as to cause flaps even of the same sheet to be superposed.

If the apparatus 1 is configured to fix two sheets to each other using glue, in accordance with some embodiments advantageously it also comprises a glue application unit which may be positioned at a gluing station, between the feeding stations of the two sheets involved, and which may be configured to apply the glue on the sheet already positioned inside the housing 22 before insertion of the other sheet.

In contrast, in other embodiments, the apparatus 1 may comprise a glue application unit associated with the feeding device placed downstream for applying the glue directly on the sheet moved by that feeding device before it is inserted into the housing 22.

The apparatus 1 also comprises a thermoforming device 31, which is positioned at the thermoforming station 21. The thermoforming device 31 is configured to thermoform, in use, the thermoplastic material 10 on the sheets inserted into and if necessary formed in the housing 22, when the conveying element 15 is placed at the thermoforming station 21, and in this way to make the layer of thermoplastic material 7 which is part of the container 2. The aspects strictly linked to the thermoforming device 31, like all of its possible variants, are in themselves known to an expert in the sector and therefore will not be described in detail below. For this reason, the accompanying figures do not show in detail all of the elements which are part of the thermoforming device 31.

In the preferred embodiments, when it is in the thermoforming station 21, the conveying element 15 is an integral part of the thermoforming device 31, constituting its mould. Coupling with it is a closing element which is also part of the thermoforming device 31. At least one of the conveying element 15 or the closing element is movable perpendicularly to the movement path 16, between a non-operating position in which the two are spaced apart, and an operating position in which they are clamped against each other in a gas-tight way.

The apparatus 1 also comprises positioning means for the thermoplastic material 10, which are configured to feed the thermoplastic material 10 to thermoforming device 31, above the housing 22 of the conveying element 15, between the conveying element 15 itself and the closing element.

In some embodiments the thermoplastic material 10 is supplied to the apparatus 1 in the form of a web 32 wound in a reel 34, and the positioning means comprise reel 34 unwinding means 33, which feed the web 32 to the thermoforming device 31.

Moreover, the apparatus 1 advantageously comprises cutting units 36 which are configured to cut the web 32. In some of these embodiments the cutting units 36 are configured to cut the web 32 before (or at the same time as) thermoforming of the thermoplastic material 10 on the first sheet 8 and on the second sheet 9, by the thermoforming device 31. In contrast, in other embodiments, the cutting units 36 are configured to cut the web 32 after thermoforming of the thermoplastic material 10 on the first sheet 8 and on the second sheet 9, by the thermoforming device 31.

Moreover, in some embodiments, the cutting units 36 cut the web 32 without interrupting the continuity of the web 32 itself. In this case, advantageously, the positioning means comprise a first supporting roller 35 for the reel 34 of web 32 being unwound, and a second motor-driven roller 38 on which the residual web 39 is wound in a new reel 34 after cutting. The second motor-driven roller 38 is also used for pulling the web 32 and unwinding the reel 34 in such a way as to gradually position the new web 32 necessary above the conveying element 15 (in contrast the first supporting roller 35 will advantageously be braked).

However other embodiments are possible in which, in contrast, the positioning means for the thermoplastic material 10 are configured to feed the thermoplastic material 10 to thermoforming device 31, already cut into sheets. For example, similarly to what was described for the first feeding device 23 and for the second feeding device 24 and the respective magazines, the sheets of thermoplastic material 10 may be picked up by the positioning means from a suitable magazine. Alternatively it is possible for the sheets to be obtained in turn by cutting into pieces, without or without scrap, a web 32 of thermoplastic material 10 and for them to be fed directly to the thermoforming device 31, therefore without being loaded inside a magazine.

In the embodiment shown in the figures, with the first supporting roller 35 and the second motor-driven roller 38, the web 32 is made to slide relative to the thermoforming device 31 along a direction perpendicular to the movement path 16. However, alternative embodiments are possible, in which the web 32 is made to slide differently relative to the thermoforming device 31, for example along a direction parallel to the movement path 16.

Figure 5:
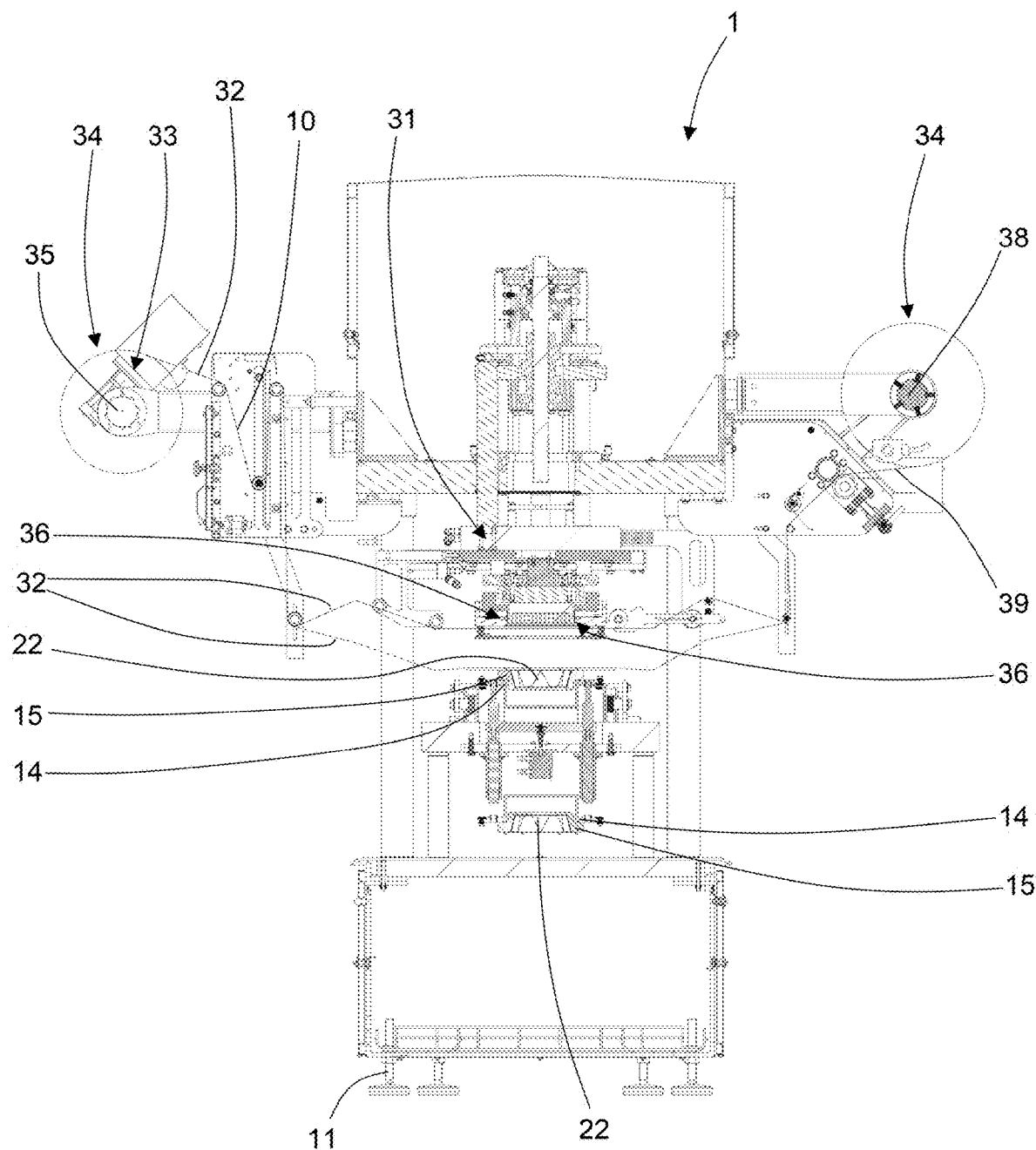
FIG. 5 is a vertical section of the apparatus of FIG. 1 sectioned according to the section line V-V of FIG. 2.
Figure 6:
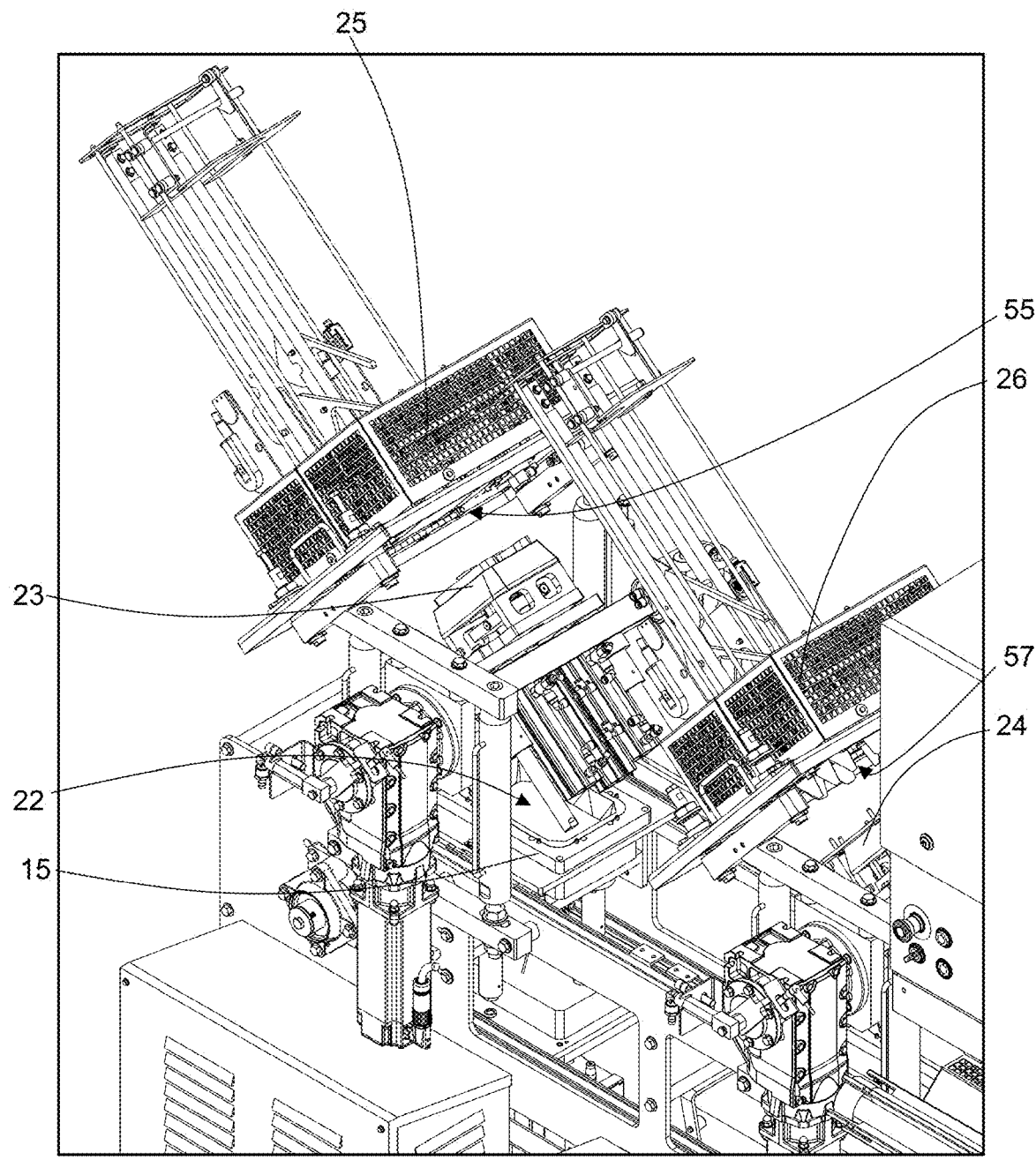
FIG. 6 is a further axonometric view of an enlarged detail of the apparatus of FIG. 1.

It should be emphasised that in FIG. 5, the web 32 is shown simultaneously in the position in which it is located before the thermoforming, that is to say, with the closing element in a non-operating position and spaced apart from the conveying element 15 (which is the configuration effectively adopted by the apparatus 1 in FIG. 5), and in the position in which it is located during the thermoforming, that is to say, with the closing element in an operating position and coupled with the conveying element 15; when the closing element is in the non-operating position, the web 32 is spaced apart from the conveying element 15.

In the preferred embodiments, the apparatus 1 also comprises an unloading device 40, which is placed at the outfeed station 18. The unloading device 40 is configured to pick up the container 2 made from the conveying element 15 at the outfeed station 18. For example, the unloading device 40 picks up the container 2 from the conveying element 15 by means of suction: for that purpose the unloading device 40 may comprise further suction means, not shown in the figures, for retaining the container 2. Advantageously, the unloading device 40 comprises a movable element 41 which is movable between a gripping position, in which it is associated with the conveying element 15 placed in the outfeed station 18 for picking up in use the container 2 from the conveying element 15, and a releasing position, in which it is associated with an unloading surface 43 for releasing, in use, the container 2 onto the unloading surface 43. In the embodiment illustrated, the unloading device 40 is capable of translating, relative to the supporting structure 11, both in a vertical direction, and in a horizontal direction. In particular, in the embodiment illustrated, the movable element 41 is capable of translating along a first vertical guide 13, which is in turn capable of translating along a second horizontal guide 12. In the accompanying figures the movable element 41 is constituted of the rod of an actuator, whose jacket constitutes the first guide 13.

The unloading surface 43 may be movable relative to the supporting structure 11 or is fixed relative to the supporting structure 11. In the embodiment illustrated, the unloading surface 43 is constituted of a conveyor belt 32 which allows the containers 2 previously positioned on it to be moved away from the outfeed station 18.

As can be seen in FIG. 7, it is also possible for the unloading device 40 to be configured to release a container 2 onto the unloading surface 43 when other containers 2 are already present on it, by varying its stroke, in this case, in particular, the unloading device 40 may stack a plurality of containers 2 inside each other.

However, an expert in the sector will be capable of selecting the unloading device 40 best suited to the features both of the other components of the apparatus 1 and of the containers 2 made.

Finally, a printing unit for printing on the container 2 may be associated with the unloading device 40 or with the unloading surface 43.

In some embodiments, the apparatus 1 also comprises a folding device 101 which is configured to fold, in use, the perimetric flange 5 of the container 2, relative to the lateral walls 4, at connecting zones between the perimetric flange 5 and the lateral walls 4. In particular, the folding device 101 is configured to fold the perimetric flange 5 in such a way as to fold it below a top plane in which the connecting zones lie.

Such embodiments are advantageously applied in the case of a container 2 in which at the outfeed of the thermoforming station 21 (without folding devices), the perimetric flange 5 tends to adopt an initial configuration (shown, for example, in FIGS. 46 and 52) in which it is angled upwards relative to the top plane, whilst in order to guarantee a better use of the container 2 during the sealing step it is preferable that the perimetric flange 5 lies substantially in the top plane. In general, the perimetric flange 5 tends to adopt that initial configuration when the material of which the outer skeleton 6 is constituted has sufficient elasticity at the connecting zones.

Therefore, thanks to the folding device 101, it is possible to make the perimetric flange 5 adopt a final configuration (shown, for example, in FIGS. 48 and 56) in which the perimetric flange 5 is positioned substantially in the top plane or nearer to it. In order to achieve that result, during folding the perimetric flange 5 is forced to adopt an intermediate configuration, in which it is folded below the top plane, as previously described: that is advantageous since, on one hand it eliminates part of the elasticity of the material at the connecting zones, whilst, on the other hand, the remaining elasticity tends to then make the perimetric flange 5 elastically return towards the final configuration.

Figure 46:
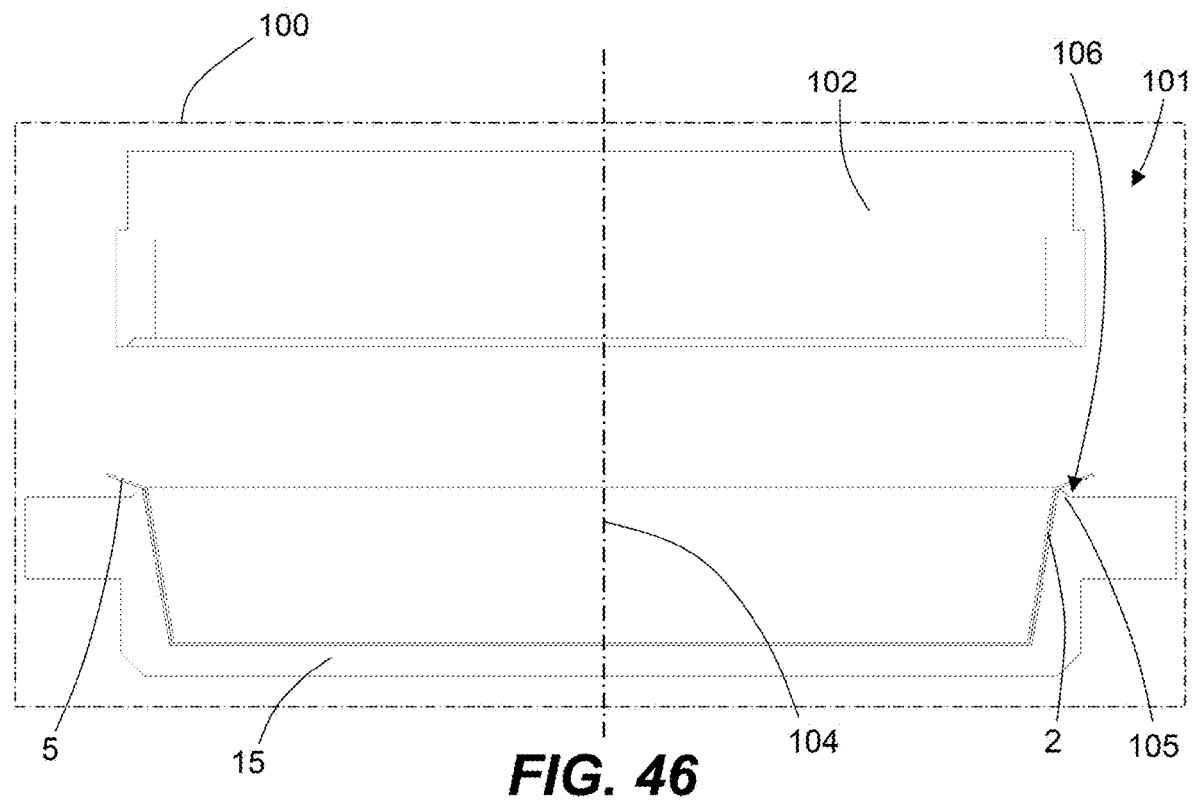
FIG. 46 is a side view vertical section of a first embodiment of a folding device with a folding element in an inactive position.
Figure 47:
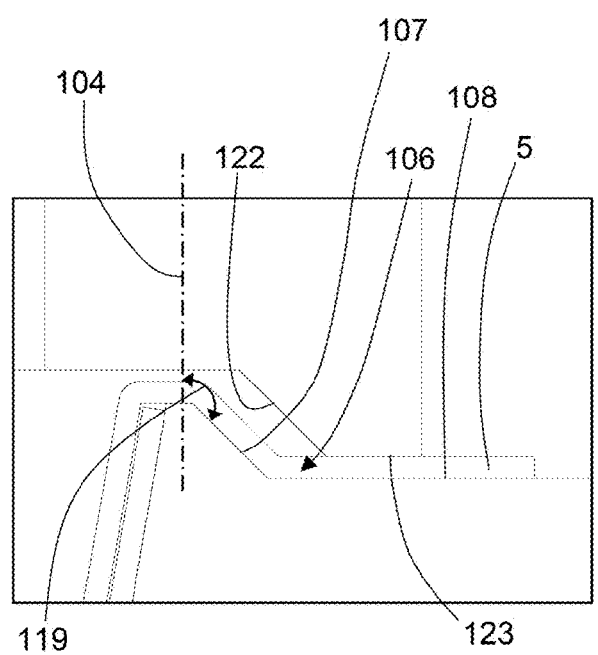
FIG. 47 shows a detail of FIG. 46 with the folding element in an active position.
Figure 48:
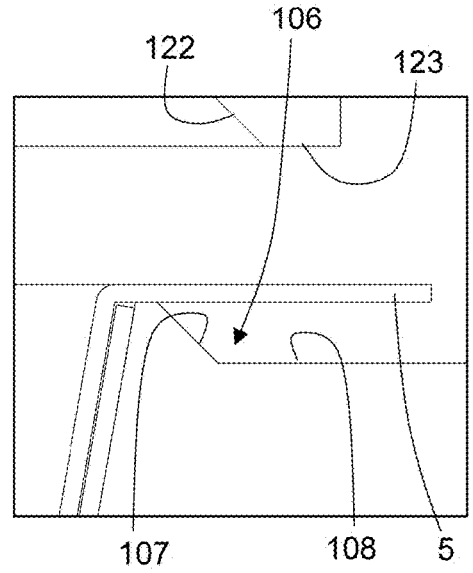
FIG. 48 shows the detail of FIG. 47 with the folding element in the inactive position and a folded perimetric flange.

In some embodiments, such as that shown in FIG. 46 to 48, the folding device 101 is configured to fold the perimetric flange 5 when the container 2 is in the housing 22 defined by the conveying element 15. In these embodiments, the folding device 101 comprises a folding element 102 which is movable, relative to the conveying element 15, between an inactive position and an active position. When the folding element 102 is in the inactive position, it is uncoupled from the conveying element 15. In contrast, when the folding element 102 is in the active position, it is coupled with the conveying element 15 for folding in use the perimetric flange 5 bringing it into the intermediate position. For that purpose, the folding element 102 is advantageously shaped in such a way as to fold the perimetric flange 5 at zones which are spaced apart from the angular zones of the perimetric flange 5 (advantageously that also applies for the other embodiments described below).

Preferably, the conveying element 15 has a first central axis 104, coming out of the housing 22. Advantageously, the conveying element 15 also has a first annular frame 105 which delimits the top of the housing 22. In the preferred embodiments, the first annular frame 105 defines a first operating surface 106 which is at least partly angled outwards relative to the first central axis 104. In particular, in those embodiments the first operating surface 106 preferably has a first angled portion 107 which forms a first angle 119 relative to the first central axis 104. This first angle 119 is between 100° and 170°, preferably between 115° and 155°, and even more preferably between 125° and 145°. In the embodiment illustrated, the first angle 119 is equal to 135°. It should be noticed that in the context of this invention, the first angle 119 is measured as the smallest angle of rotation necessary in order to position the first angled portion 107 parallel to the first central axis 104, by moving the first angle portion 107 according to a direction coming out of the same first angled portion 107. In the figures, the first angle 119 therefore lies in the plane of the drawing and is measured above the first angled portion 107. In particular, FIG. 47 shows the first central axis 104 at the first annular frame 105 to illustrate the first angle 119.

Advantageously, the first operating surface 106 has, in addition to the first angled portion 107, a first horizontal portion 108.

Moreover, preferably the folding element 102 defines a second angled portion 122 and a second horizontal portion 123.

In some embodiments, such as that illustrated in FIGS. 46 to 48, the folding device 101 described above is constituted of the thermoforming device 31. In this case, the presence of the first horizontal portion 108 and of the second horizontal portion 123 is advantageous since the coupling between these two horizontal portions 108, 123 allows the obtainment of an optimum coupling between the folding element 102 and the first annular frame 105 facilitating thermoforming of the thermoformable material 10 on the outer skeleton 6.

In these embodiments in which the folding element 102 is associated with the conveying element 15, the apparatus 1 has, along the movement path 16, a folding station 100 at which the folding device 101 is advantageously positioned. In particular, the folding station 100 may correspond to the thermoforming station 21.

Figure 51:
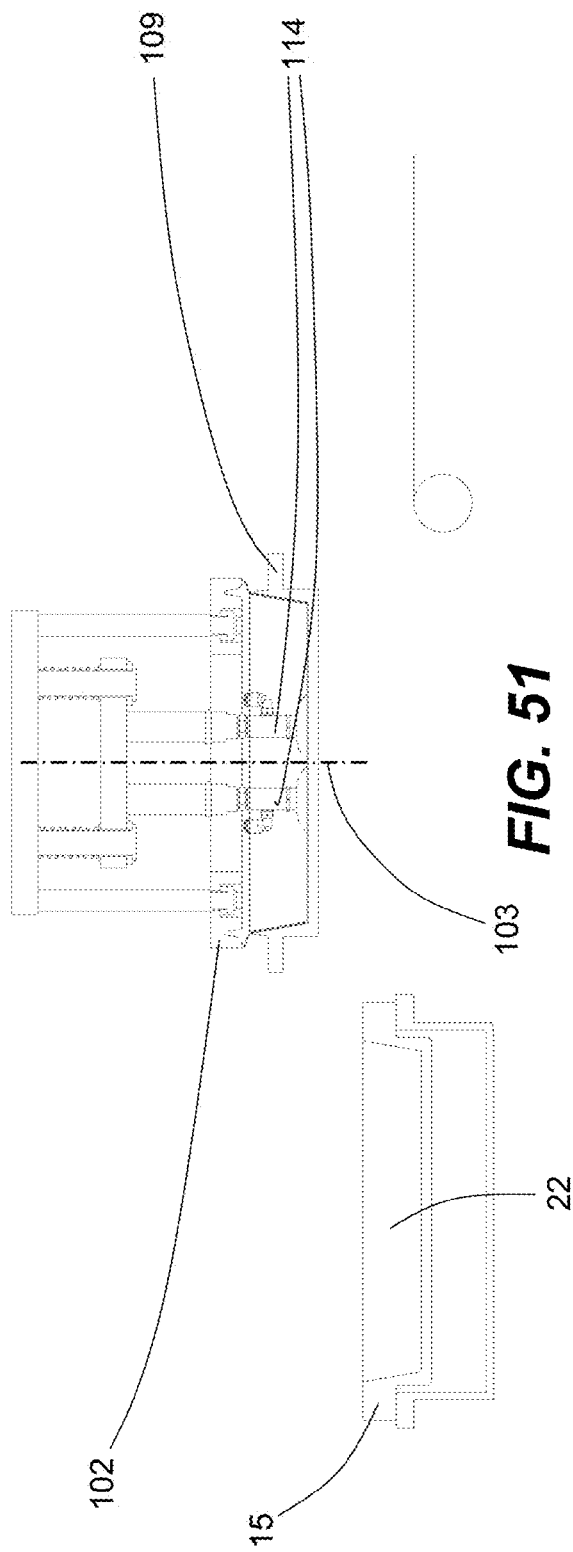
Figure 52:
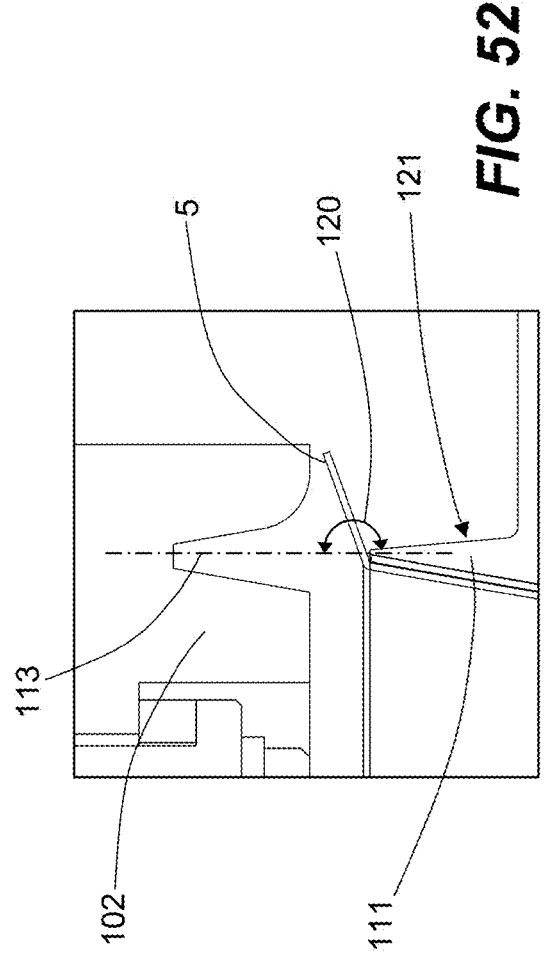

In other embodiments, such as that shown in FIGS. 49 to 60 and that shown in FIGS. 61 to 65, the folding device 101 is configured to fold the perimetric flange 5 when the container 2 is in a seat 110 defined by an intermediate element 109, after it has been extracted from the conveying element 15. In these embodiments the folding device 101 comprises that intermediate element 109, which defines the seat 110 for receiving in use the container 2. The seat 110 is advantageously delimited by a second annular frame 111. Moreover, the intermediate element 109 has a second central axis 113, coming out of the seat 110. In these embodiments, the second annular frame 111 defines a second operating surface 121 which is at least partly angled outwards relative to the second central axis 113. Advantageously, the second operating surface 121, relative to the second central axis 113, forms a second angle 120 which is between 110° and 180°, preferably between 135° and 180°, and even more preferably between 150° and 180°. For example, in the embodiments illustrated, the second angle 120 is equal to 175°. It should be noticed that in the context of this invention, the second angle 120 is measured as the smallest angle of rotation necessary in order to position the second operating surface 121 parallel to the second central axis 113, by moving the second operating surface 121 according to a direction coming out of the same second operating surface 121. In the figures, the second angle 120 therefore lies in the plane of the drawing and is measured above the second operating surface 121. In particular, FIG. 52 shows the second central axis 113 at the second annular frame 111 to illustrate the second angle 120.

Figure 53:
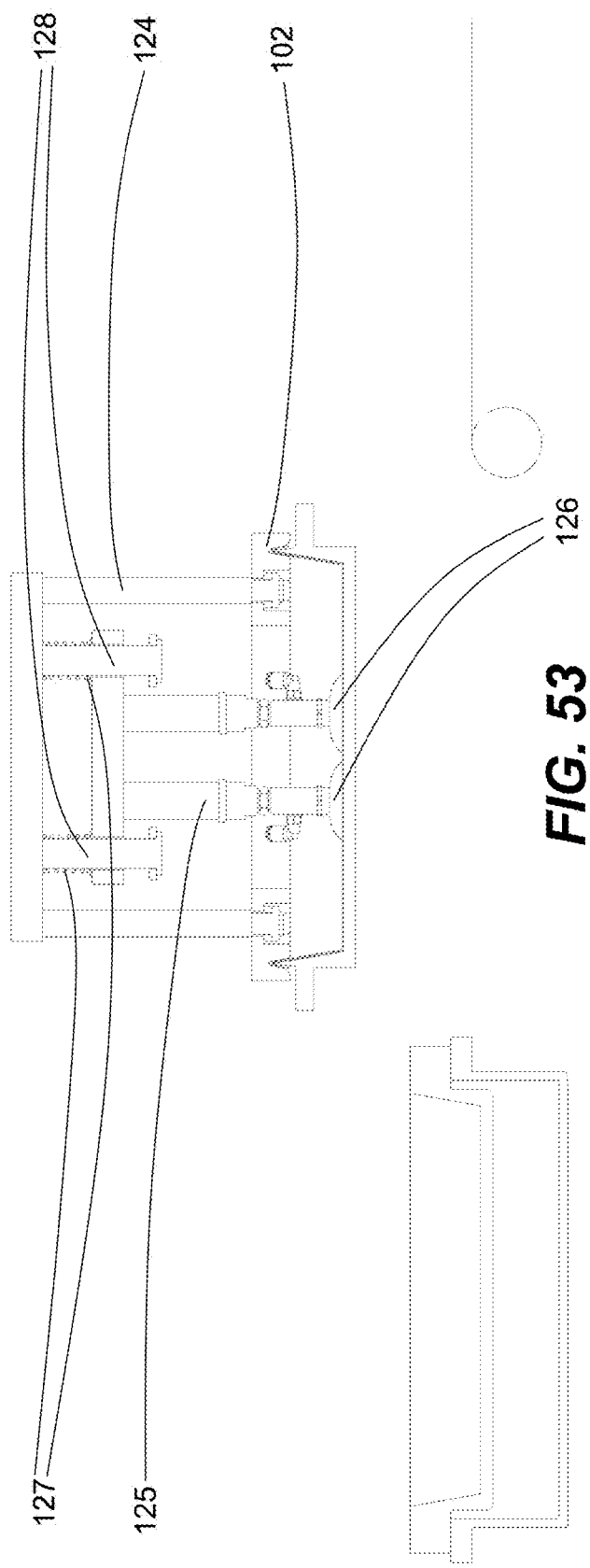
Figure 54:
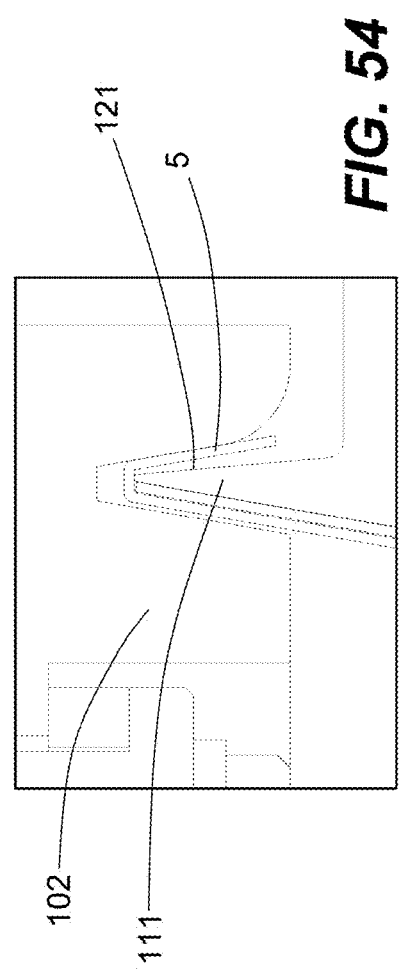
Figure 59:
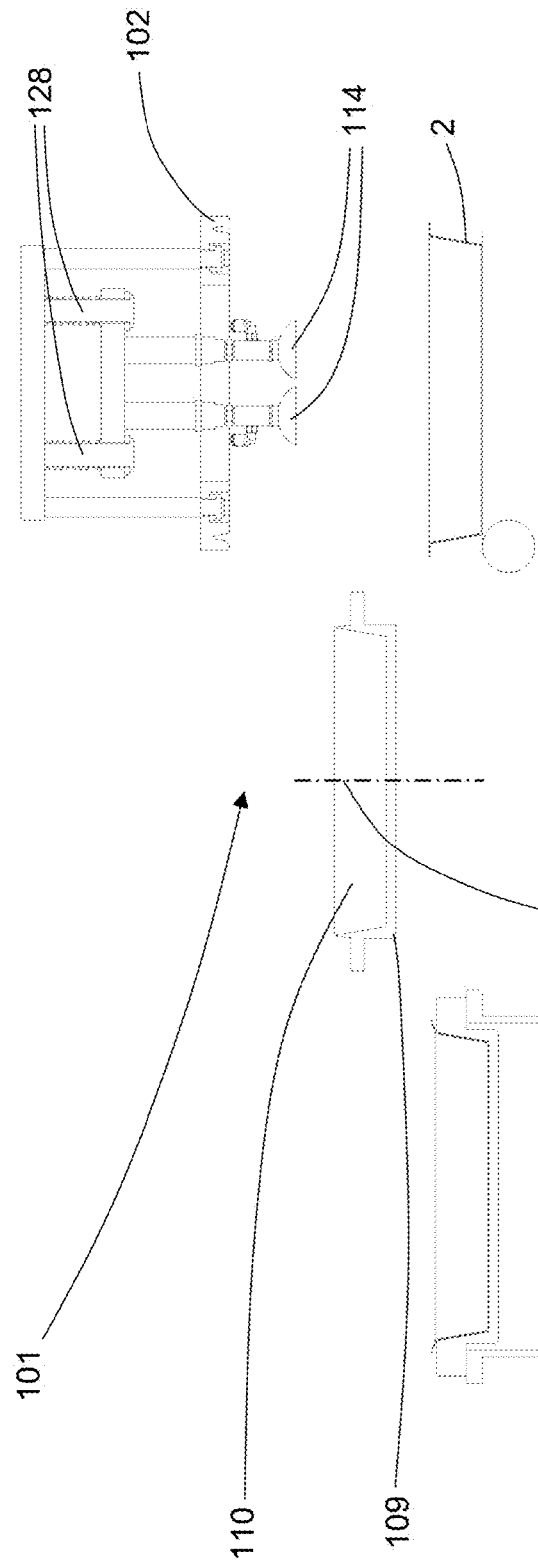

Preferably, in these embodiments the unloading device 40 comprises a first gripping element 114. Advantageously, that first gripping element 114 is movable between a first extracting position (FIG. 50) and an inserting position (FIGS. 51 and 52). When the first gripping element 114 is in the first extracting position, it is associated with the conveying element 15 at the outfeed station 18 for picking up, in use, the container 2 from the housing 22. In contrast, when the first gripping element 114 is in the inserting position, it is associated with the intermediate element 109 for inserting, in use, the container 2 into the seat 110 (depending on the embodiments the first gripping element 114 may or may not release the container into the seat 110). Moreover, the folding element 102 is preferably associated with the unloading device 40 and is movable relative to the intermediate element 109 between an inactive position (FIGS. 51 and 52) and an active position (FIGS. 53 and 54). When the folding element 102 is in the inactive position, it is uncoupled from the intermediate element 109. In contrast, when the folding element 102 is in the active position, it is coupled with the intermediate element 109 for folding in use the perimetric flange 5.

In the embodiments illustrated, the folding element 102 is associated with the first gripping element 114 and is advantageously movable relative to the first gripping element 114, according to a direction of movement 103 parallel to the second central axis 113, from the inactive position to the active position when the first gripping element 114 is in the inserting position (as can be seen in Figures from 51, 53 and 55).

Moreover, the first gripping element 114 comprises a first member 124 and a second member 125 which are movable relative to each other. In these embodiments, the folding element 102 is advantageously coupled together with the first member 124, whilst the second member 125 comprises gripping members 126. Advantageously, the gripping members 126 are suction cups connected to a pneumatic circuit for retaining the container 2 by suction (the pneumatic circuit is not shown in the accompanying figures). However the aspects linked to the gripping members 126 shall not be understood as limiting for this invention and, in any case, they are known to an expert in the sector.

Advantageously, the first gripping element 114 also comprises at least one elastic element 127 and at least one rigid element 128 which are at least partly interposed between the first member 124 and the second member 125 and which are configured to connect those two members 124, 125 to each other.

Figure 60:
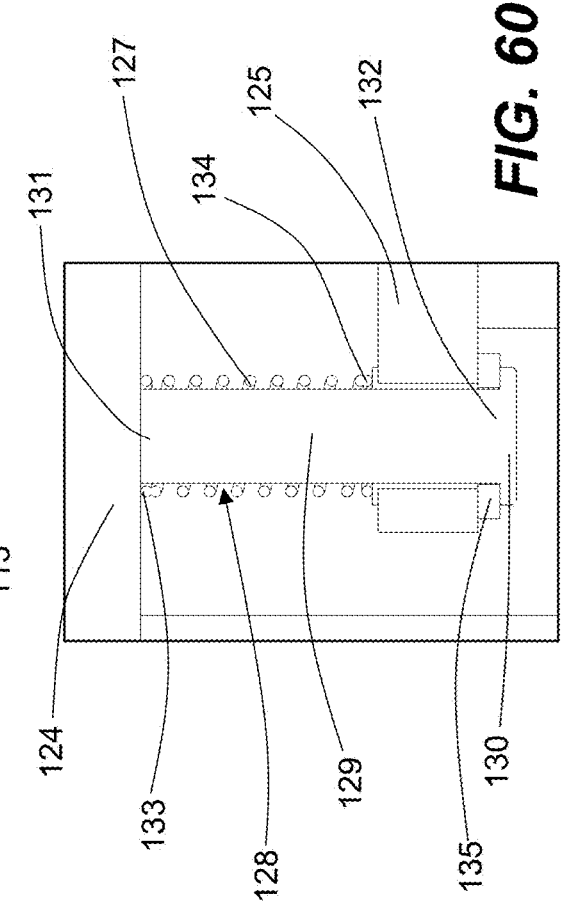
Figure 61:
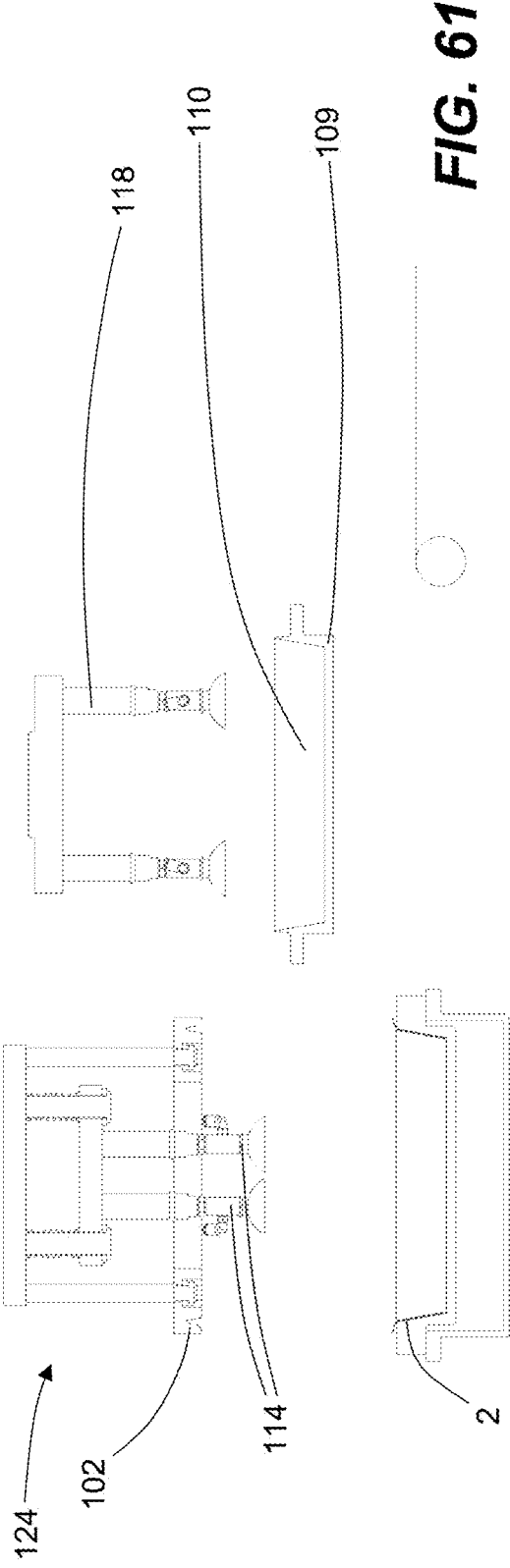
Figure 62:
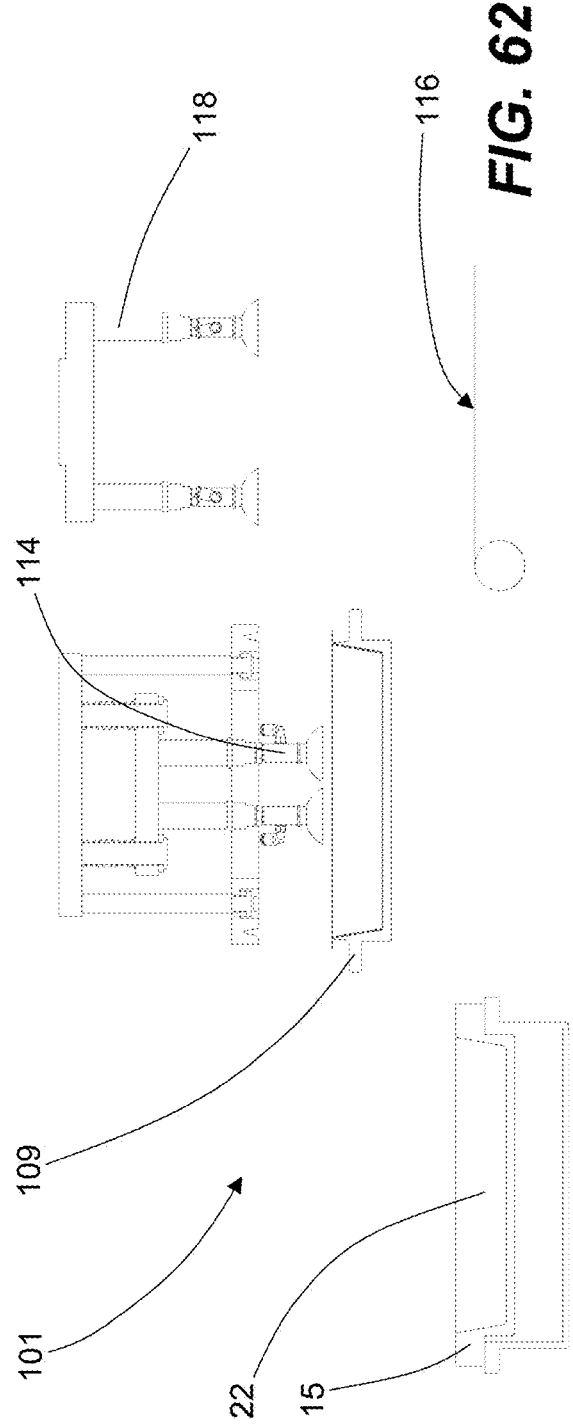

In particular, the rigid element 128 advantageously comprises a main body 129 and a locking portion 130 (FIG. 60). The main body 129 extends between a first end 131, which is fixed to the first member 124 in such a way that the rigid element 128 is movable together with the same first member 124, and a second end 132, which has the locking portion 130. In more detail, made in the second member 125 there is a through hole into which the rigid element 128 is slidably inserted with the locking portion 130 projecting outside the through hole in such a way as to prevent the rigid element 128 from slipping out of the second member 125 during the movement of the first member 124 and the second member 125 relative to each other. Advantageously, the first gripping element 114 comprises a plurality of rigid elements 128 and made in the second member 125 there is a plurality of through holes, with each of the rigid elements 128 being inserted into a respective through hole. Each rigid element 128 is advantageously a pin.

The elastic element 127 advantageously extends between a third end 133, which abuts against a surface of the first member 124 which is directed towards the second member 125, and a fourth end 134, which abuts against a surface of the second member 125 which is directed towards the first member 124. In the embodiments illustrated, the elastic element 127 is positioned around the rigid element 128. The elastic element 127 is configured to vary its configuration, between an extended configuration and a compressed configuration, during the movement of the first member 124 relative to the second member 125, as described in detail below.

Preferably, the first gripping element 114 comprises a plurality of elastic elements 127, advantageously one for each rigid element 128. Each elastic element 127 is advantageously a spring (for example, a compression spring). When the first gripping element 114 reaches the inserting position, the elastic element 127 is initially in the extended configuration and the second member 125 abuts against the locking portion 130 of the rigid element 128 (in the figures it abuts against an annular element 135 interposed between the locking portion 130 and the second member 125), as shown in FIGS. 51 and 52. Then, with the first gripping element 114 remaining in the inserting position, the first member 124 is moved towards the intermediate element 109: this movement of the first member 124 causes both the movement of the closing element 102 from the inactive position to the active position (since the closing element 102 is coupled together with the first member 124), and the variation of the configuration of the elastic element 127 from the extended configuration to the compressed configuration (FIGS. 53 and 54). After the folding, the first member 124 is moved away from the intermediate element 110: this movement of the first member 124 causes both the movement of the closing element 102 from the active position to the inactive position and the variation of the configuration of the elastic element 127 from the compressed configuration to the extended configuration (FIGS. 55 and 56).

The presence of the elastic element 127 (of the elastic elements 127) and of the rigid element 128 (of the rigid elements 128) therefore allows the movement of the first member 124 (and of the folding element 102) relative to the second member 125, as a whole keeping the first gripping element 114 in the inserting position with the gripping members 126 associated with the intermediate element 109.

In some embodiments, such as that shown in FIGS. 49 to 60, the first gripping element 114 is also movable between the inserting position (FIG. 55) and a first uncoupling position (FIG. 58). When the first gripping element 114 is in the inserting position, it is associated with the intermediate element 109 for picking up, in use, the container 2 from the seat 110 (it is also possible that it never released the container there). In contrast, when the first gripping element 114 is in the first uncoupling position, it is associated with a placing surface 116 for releasing, in use, the container 2 onto the same placing surface 116.

In other embodiments, like that shown in FIGS. 61 to 65, the unloading device 40 also comprises a second gripping element 118 which is movable between a second extracting position (FIG. 63) and a second uncoupling position (FIG. 64). When the second gripping element 118 is in the second extracting position, it is associated with the intermediate element 109 for picking up, in use, the container 2 from the seat 110. In contrast, when the second gripping element 118 is in the second uncoupling position, it is coupled with a placing surface 116 to release the container 2 onto the placing surface 116.

Preferably, the two gripping elements 114, 118 are movable in a coordinated way and advantageously rigidly connected to each other, in such a way that when the first gripping element 114 is in the first extracting position, the second gripping element 118 is in the second extracting position, and when the first gripping element 114 is in the inserting position the second gripping element 118 is in the second uncoupling position, as well as in such a way that the shifts between those positions occur simultaneously as illustrated in the accompanying figures.

In these embodiments which comprise the two gripping elements 114, 118, the folding element 102 is associated with the first gripping element 114 (as previously described for the other embodiments and as shown in the accompanying figures) or with the second gripping element 118 (embodiment not shown in the figures).

If the folding element 102 is associated with the first gripping element 114, the folding element 102 is advantageously movable relative to the first gripping element 114, according to a direction of movement 103 parallel to the second central axis 113, from the inactive position to the active position, for folding the perimetric flange 5, when the first gripping element 114 is in the inserting position.

In contrast, if the folding element 102 is associated with the second gripping element 118, the folding element 102 is advantageously movable relative to the second gripping element 118, according to the direction of movement 103 parallel to the second central axis 113, from the inactive position to the active position for folding the perimetric flange 5, when the second gripping element 118 is in the second extracting position. In this case it is possible that what was described for the first gripping element 114 may be applied for the second gripping element 118 (and not for the first gripping element 114). That means that the second gripping element 118 comprises the first member 124, the second member 125, the elastic elements 127 and the rigid elements 128. In other words, the structure of the gripping elements 114, 118 may be inverted compared with what is illustrated in the accompanying figures.

In these embodiments it is possible that the folding of the perimetric flange 5 occurs, when the container 2 is in the seat 110 of the intermediate element 109, either by means of the folding element 102 associated with the first gripping element 114 or by means of the folding element 102 associated with the second gripping element 118, with the folding element 102 preferably being movable along the direction of movement 103 parallel to the second central axis 113.

This embodiment, in which the folding element 102 is associated with one of either the first gripping element 114 or the second gripping element 118, allows an increase in the productivity of the apparatus 1 by separating the respective movements of the container 2 from the conveying element 15 to the intermediate element 110 and from the intermediate element 110 to the placing surface 116.

Figure 65:
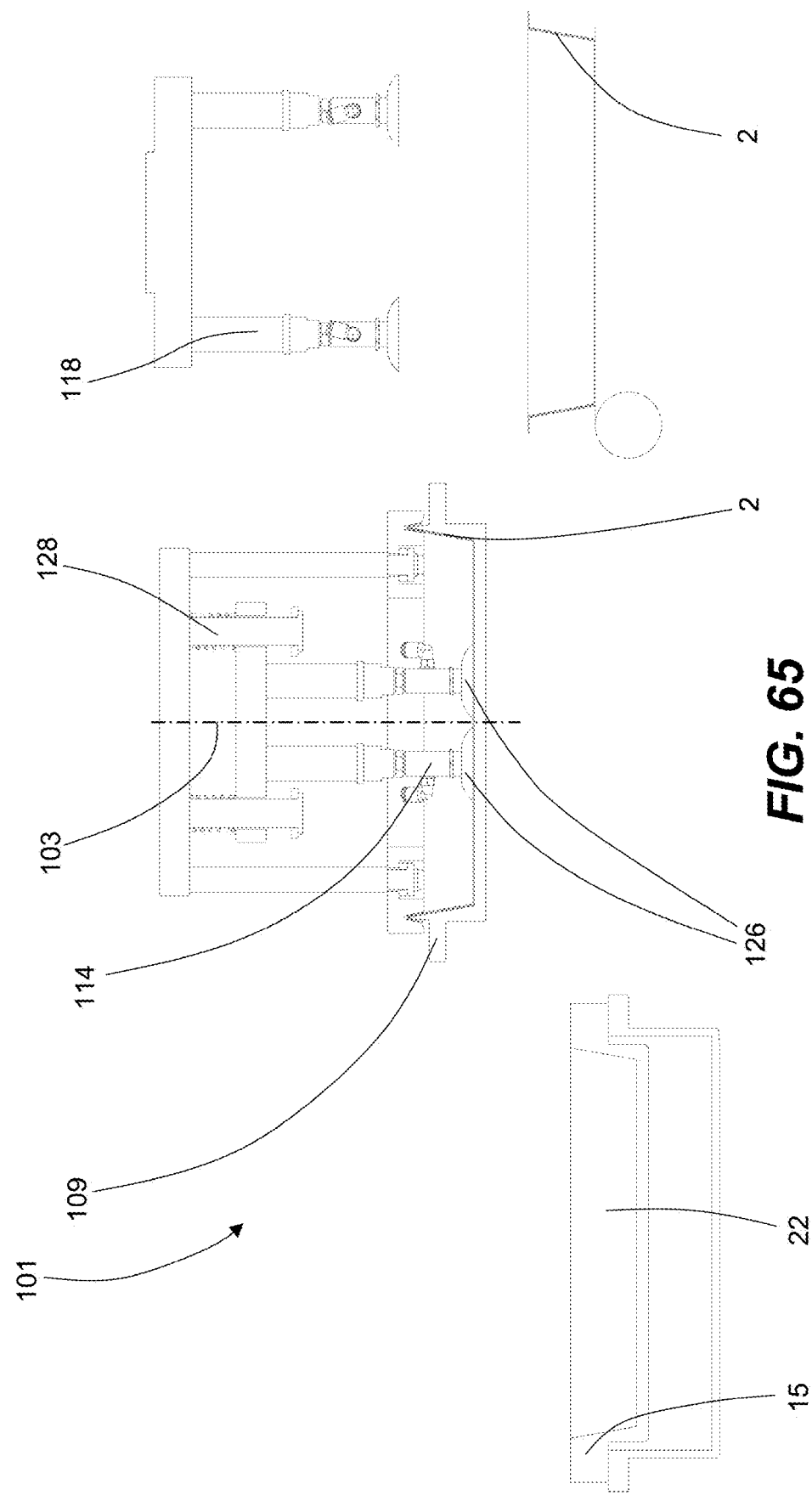

In fact, as can be clearly seen in FIGS. 64 and 65, during the movement of the container 2 from the conveying element 15 to the intermediate element 110, performed by the first gripping element 114, the second gripping element 118 moves the container from the intermediate element 110 to the unloading surface 116.

If required in order to make the finished container, it is also the case that one or more of the second transferring element 28, the thermoforming device 31 and the folding element 102 (if present) is equipped with one or more heating elements configured to heat localised zones of the various sheets which constitute the outer skeleton 6.

In some embodiments, downstream of the thermoforming device 31, the apparatus may also comprise a padding station at which a pad is applied to the bottom wall 3 (for example an absorbent pad if the container 2 is intended to contain meat). Since padding stations are in themselves known to experts in the sector it will not be described any further herein.

Below is a description of the apparatus 1 with reference to multi-lane embodiments, several examples of which are shown in FIGS. 40 to 43. It should be emphasised that what was previously described for the various components of the single-lane apparatus 1, and which may be applied to the multi-lane embodiments of the apparatus 1, will not be described again below. First, the multi-lane apparatus 1 comprises a group 44 of conveying elements 15, each of which defines a housing 22.

The conveying elements 15 of the group 44 are movable in a way coordinated with each other relative to the supporting structure 11, each along a respective movement path 16 which extends between a respective infeed station 17 and a respective outfeed station 18, and along which there are present, at least one respective first feeding station 19, one respective second feeding station 20 and one respective thermoforming station 21 (or multiple feeding stations if multiple sheets are used as previously described). In this case too, the movement of the conveying elements 15 may occur thanks to one or more movement devices 14 of the type described above. In the preferred embodiments, the movement paths 16 of all of the conveying elements 15 of the group 44 are parallel to each other, and the conveying elements 15 are side by side along a direction perpendicular to the movement paths 16. Moreover, advantageously, the movement paths 16 are straight, but that shall not be understood to be limiting for this invention, since the movement paths 16 may extend in a different way, for example, with a curved trajectory.

Figure 40:
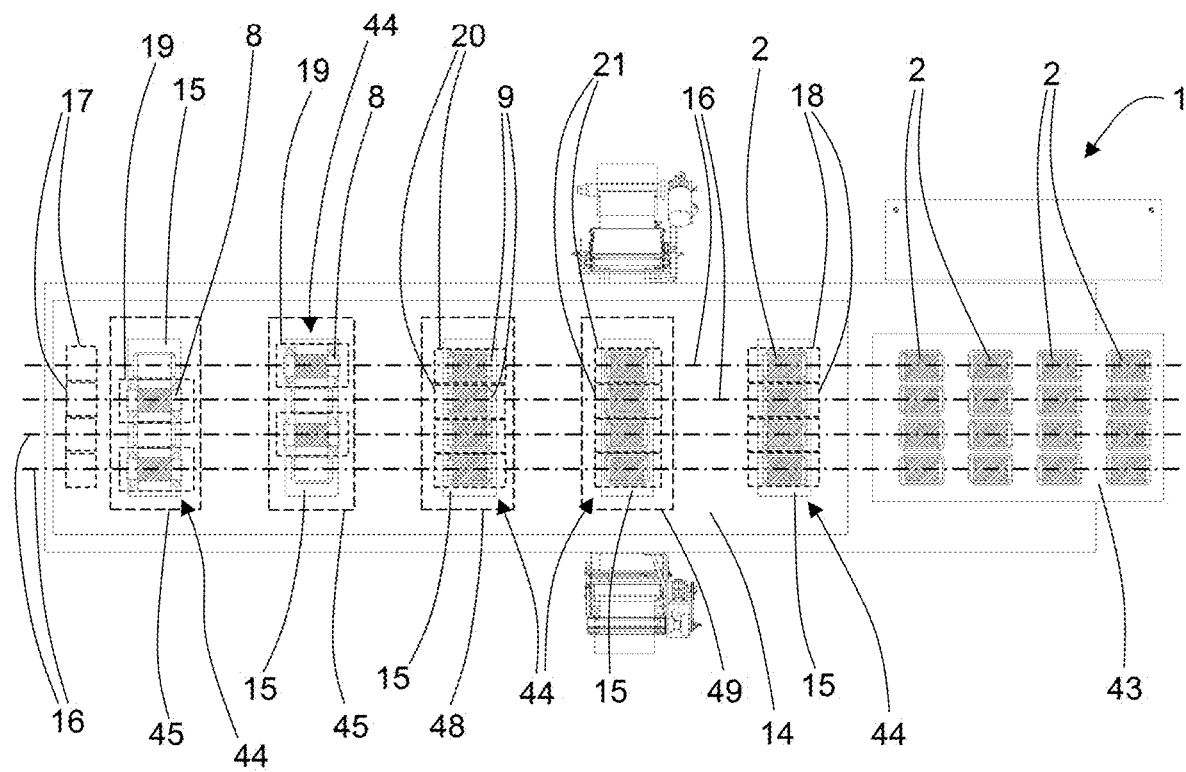
FIG. 40 is a schematic top view of a second embodiment of the apparatus of FIG. 1.
Figure 41:
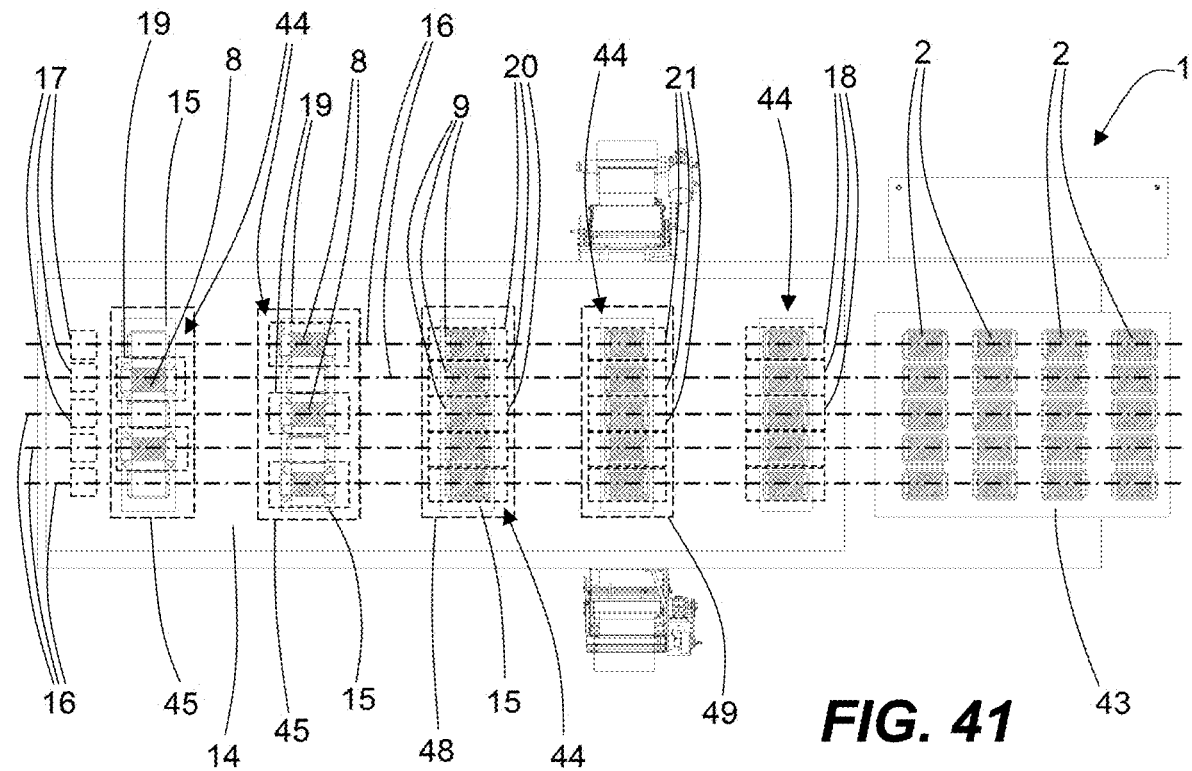
FIG. 41 is a schematic top view of a third embodiment of the apparatus of FIG. 1.
Figure 42:
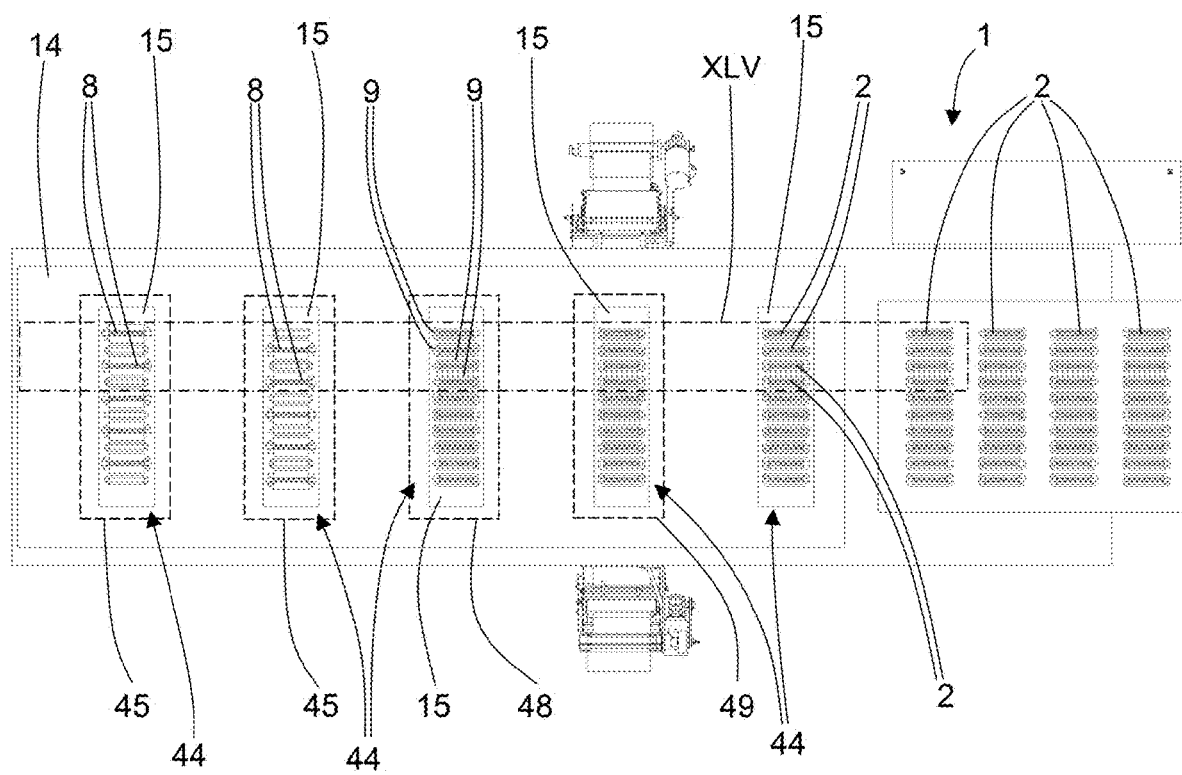
FIG. 42 is a schematic top view of a fourth embodiment of the apparatus of FIG. 1.

In the embodiments shown in FIGS. 40 to 42, the conveying elements 15 are part of a single body, are side by side and are movable together with each other. The respective housings 22 are made in the single body defined above. If the conveying elements 15 are part of a single body, their movement is advantageously caused by a single movement device 14.

Moreover, preferably, similarly to what was described for the single-lane version in which the apparatus 1 advantageously comprises a plurality of conveying elements 15, the multi-lane apparatus 1 advantageously comprises a plurality of groups 44 of conveying elements 15. The conveying elements 15 of each group 44 are side by side perpendicularly to the movement paths 16, whilst the different groups 44 are distributed along the movement paths 16 or, more generally, along the looped paths. In other words, whilst in the single-lane apparatus 1 a succession of conveying elements 15 moves along the movement path 16, in the multi-lane apparatus 1 a succession of groups 44 of conveying elements 15 moves along the movement paths 16. In the embodiments illustrated, the groups 44 of conveying elements 15 are advantageously movable simultaneously with each other.

Figure 43:
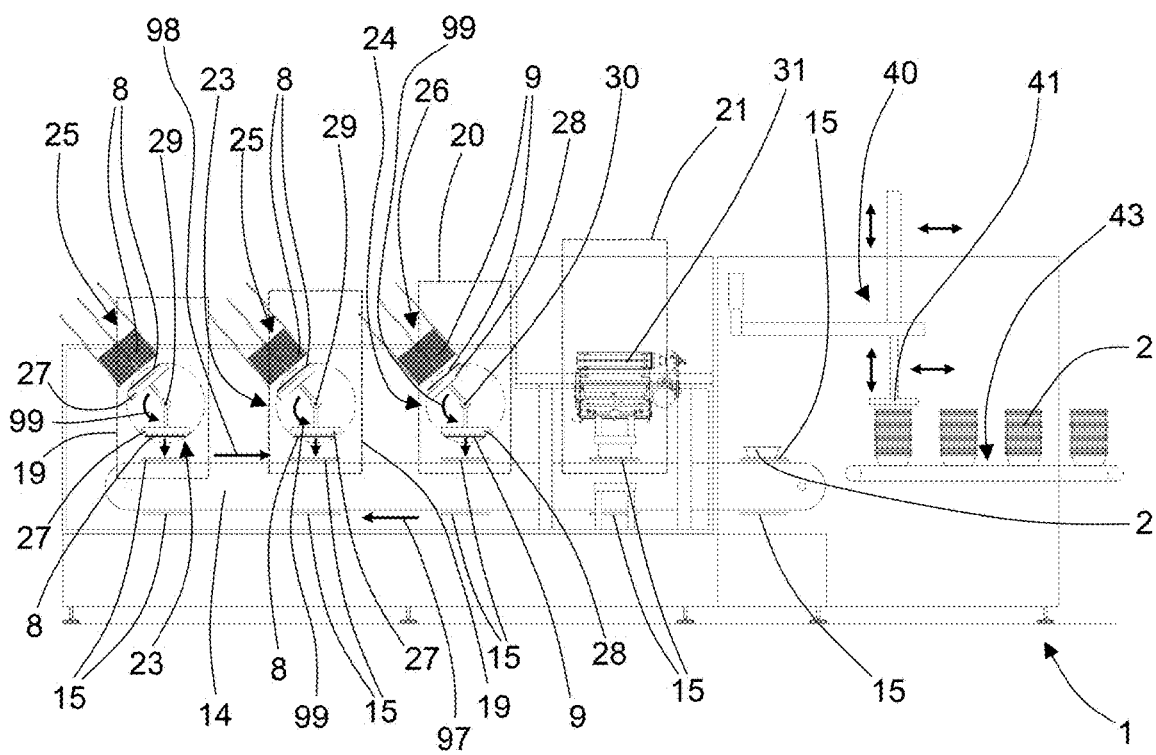
FIG. 43 is a schematic side view of the apparatuses of FIGS. 40 to 42.

In the embodiments illustrated, each group 44 of conveying elements 15 comprises conveying elements 15 which are part of a single body. That means that the conveying elements 15 of a same group 44 are movable in a way coordinated with each other and, in particular, are movable together with each other. The embodiment of FIG. 43 shows ten groups 44 of conveying elements 15: a first half of these groups 44 is located in the upper part of the respective looped paths (that is to say, in the movement path 16) and is moved in the direction indicated by the arrow 98 (towards the right in the figure), whilst the other half of these groups 44 is located on a lower part of the respective looped paths (that is to say, in the return path) and is moved in the direction indicated by the respective arrow 97 (towards the left in the figure).

The apparatus 1 also comprises a plurality of first feeding devices 23 and a plurality of second feeding devices 24.

Each of the first feeding devices 23 is positioned at a different first feeding station 19 and is configured to feed, in use, the first sheet 8 to a different conveying element 15 and to insert, in use, the first sheet 8 into the respective housing 22 when the conveying element 15 is placed at the respective first feeding station 19.

Similarly, each of the second feeding devices 24 is positioned at a different second feeding station 20 and is configured to feed, in use, the second sheet 9 to a different conveying element 15 and to insert, in use, the second sheet 9 over the first sheet 8, into the respective housing 22, when the conveying element 15 is placed at the respective second feeding station 20.

Both the first feeding devices 23, and the second feeding devices 24 are associated one with each movement path 16, in such a way that, along each movement path 16, only one first feeding device 23 and only one second feeding device 24 acts on each conveying element 15.

Therefore, as a whole, present along the movement paths 16 there is a plurality of first feeding stations 19, at each of which only one first feeding device 23 is positioned, and a plurality of second feeding stations 20, at each of which only one second feeding device 24 is positioned.

In some embodiments, the first feeding stations 19 are distributed, in terms of positioning, into a plurality of first feeding zones 45 which are separate from each other. The first feeding devices 23 of the first feeding stations 19 placed in a same first feeding zone 45 are side by side along a direction perpendicular to the movement paths 16 and are advantageously configured to operate in a synchronised way.

In particular, the first feeding stations 19, at each of which a different first feeding device 23 is positioned, are distributed into the first feeding zones 45 in such a way that two first feeding stations 19 which are present along two adjacent movement paths 16, are positioned, respectively, in two separate first feeding zones 45. As will become clear from the following description, the distribution of the first feeding stations 19 into separate feeding zones is particularly advantageous when the first sheet 8 has a width greater than the outer skeleton 6, as in the cases illustrated in the accompanying figures. In this case too, insertion of the first sheet 8 may occur either upstream, or downstream, of insertion of the second sheet 9 into the housing 22.

More specifically, in the preferred embodiments, as shown for example in FIGS. 40 to 42, there are preferably two separate first feeding zones 45. In these embodiments the first feeding stations 19 are grouped relative to each other in such a way that two first feeding stations 19 positioned along adjacent movement paths 16, are part, respectively, one of one of the two first feeding zones 45 and the other of the other of the two first feeding zones 45. That means that the first feeding stations 19 are grouped in such a way as to be positioned in a staggered arrangement on two rows.

More generally, given a number N of first feeding zones 45, it is advantageously the case that the first feeding stations 19 are distributed between them in a regular fashion, that is to say, in such a way that, when the group 44 of conveying elements 15 is located in one of the first feeding zones 45, interposed between each pair of conveying elements 15 which at that moment are located in respective adjacent first feeding stations 19 there are N−1 conveying elements 15 whose first feeding stations 19 are placed in other feeding zones.

If the first feeding stations 19 are grouped in two separate first feeding zones 45, in the ways indicated above, advantageously, as in the embodiments illustrated in the accompanying figures, two conveying elements 15 which are adjacent have a distance D1 between the respective centres, measured perpendicularly to the movement paths 16, such that double said distance D1 is less than the total of the widths of the first sheets 8 which the respective first feeding devices 23 are configured to feed to those conveying elements 15. When the respective first feeding devices 23 are configured to feed first sheets 8 which are identical to each other, that condition may be more simply expressed by saying that the distance D1 between the respective centres is less than the width of a first sheet 8.

In this way the conveying elements 15 of the group 44 may be transversally drawn near. Much more so than would be dictated by the dimensions of the first sheets 8 if simultaneously feeding all of the first sheets 8 to all of the conveying elements 15 of the group 44.

However, it is also possible to set a lower limit for drawing near, given that preferably there must not be any superposing of the first sheets 8 which are inserted into the respective housings 22 at the same first feeding zone 45. That limit may be expressed by saying that the distance D2 between the centres of two conveying elements 15 which, in a same first feeding zone 45 are located at respective adjacent first feeding stations 19, again measured perpendicularly to the movement paths 16, must be greater than or equal to half of the total of the widths of the first sheets 8 which the respective first feeding devices 23 are configured to feed to those conveying elements 15. In the context of this description, the definition "adjacent feeding stations" with reference to a feeding zone indicates two feeding stations which are both active in the feeding zone and between which no other feeding station is interposed.

Figure 44:
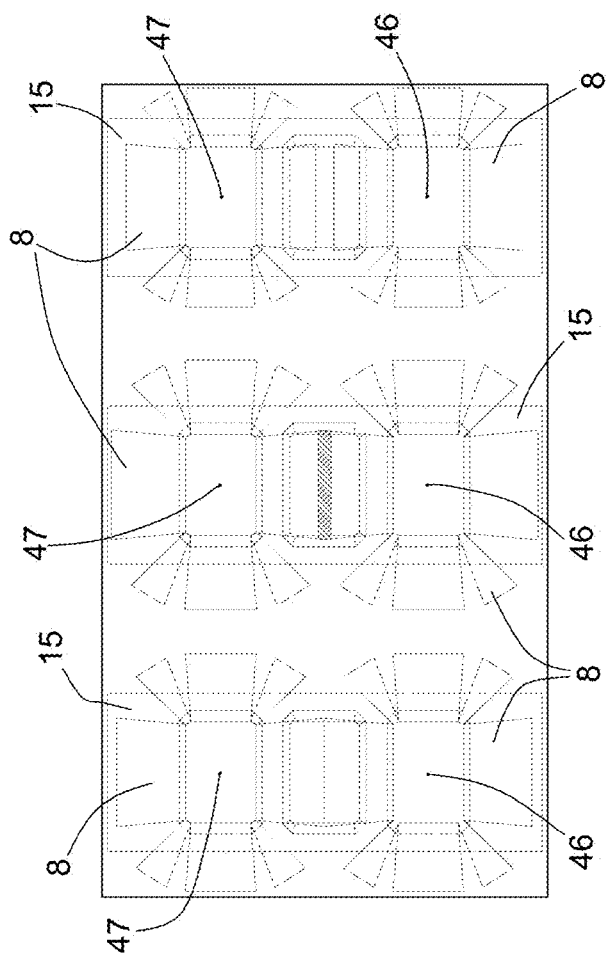
FIG. 44 is a top view of three different configurations of conveying elements and first sheets.
Figure 45:
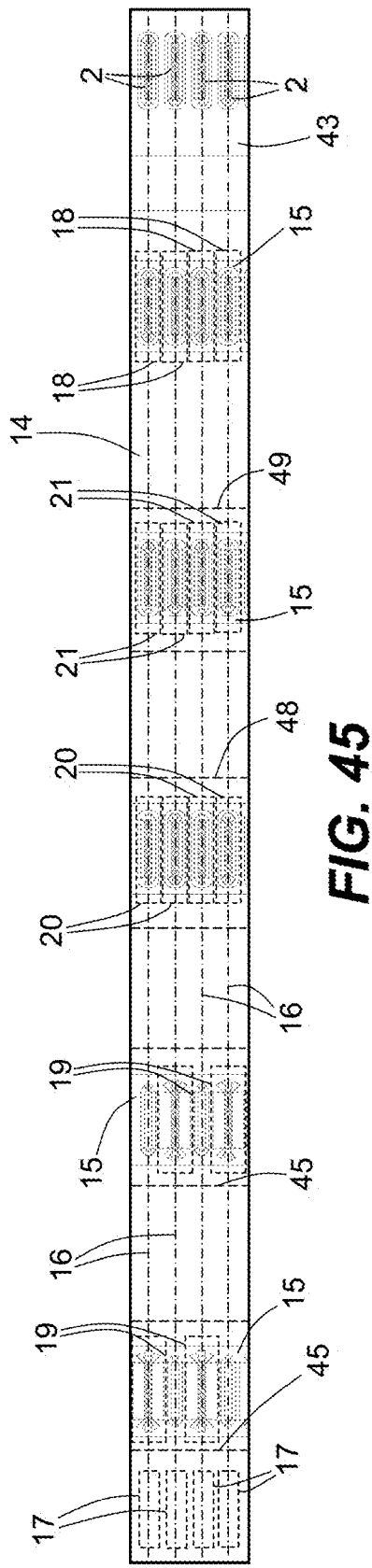
FIG. 45 is an enlarged view of the detail XLV of FIG. 42.

This aspect is shown both in the left-hand configuration of FIG. 44, in which double the distance is equal to the width of the first sheet 8 (the two first sheets 8 are identical), and in the right-hand configuration of FIG. 44, in which double the distance between the first centre 46 and the second centre 47 is greater than the width of the first sheet 8. In contrast, the central configuration of FIG. 44 shows the case in which the condition indicated above is not satisfied and the two first sheets 8 are partly superposed (the superposed area is highlighted with angled hatching).

Transversally drawing near the conveying elements 15 is advantageous since it allows a smaller quantity of thermoplastic material 10 to be used. In fact, if the first feeding devices 23 were grouped in a single first feeding zone 45, the adjacent conveying elements 15 would have to be spaced apart from each other in such a way as to make the distance between the centres of two adjacent conveying elements 15 greater than or equal to the width of the first sheet 8. In more detail, conveying elements 15 close to each other, as well as allowing a reduction in the transversal dimensions of the apparatus 1, allow a smaller quantity of thermoplastic material 10 to be used during thermoforming of the thermoplastic material 10 in the embodiments in which the thermoplastic material 10 is cut from a web 32 whose residual component is then recovered (it does not apply if the thermoplastic material 10 is fed to the apparatus 1 already in sheets pre-cut to size).

In any case, in other embodiments which are not illustrated in the figures, the first feeding stations 19 may be grouped relative to each other in a single first feeding zone 45. In this case, in the first feeding zone 45 the first feeding devices 23, each of which is positioned at a different first feeding station 19, are side by side perpendicularly to the movement paths 16.

Moreover, preferably, even the positioning of the second feeding stations 20 may occur in any of the ways described for the first feeding stations 19.

In the preferred embodiments shown in the figures, in which the second sheet 9 has a width equal to that of the container 2 and of the housing 22, the second feeding stations 20 are grouped relative to each other in a single second feeding zone 48, and the second feeding devices 24 in the second feeding zone 48 are side by side perpendicularly to the movement paths 16. That is advantageous since it allows a reduction in the space occupied by the second feeding devices 24 parallel to the movement paths 16 and makes the apparatus 1 more compact. This solution is applicable both if the first feeding stations 19 are grouped in a single first feeding zone 45, and if the first feeding stations 19 are grouped in separate first feeding zones 45. In particular, in the embodiments in which the first feeding stations 19 are grouped in more than one first feeding zone 45, the single second feeding zone 48 may be positioned downstream or upstream of all of the first feeding zones 45 (downstream in the accompanying figures) depending which sheet must be inserted into the housing 22 first.

In contrast, in other embodiments, the second feeding stations 20 may also be distributed relative to each other into a plurality of separate second feeding zones 48, similarly to what was described above for the first feeding zones 45.

Similar assessments about the distribution into different feeding zones also apply for any other type of feeding station present in the apparatus 1 (third feeding stations, fourth feeding stations, etc.).

Moreover, the apparatus 1 comprises a plurality of thermoforming devices 31, each positioned at a different thermoforming station 21, that is to say, at a thermoforming station 21 placed along a different movement path 16. Each of the thermoforming devices 31 is configured to thermoform, in use, the thermoplastic material 10 on the sheets which are inserted into the housing 22 of a respective different conveying element 15 placed at the respective thermoforming station 21, and in this way to make the layer of thermoplastic material 7 of the container 2. As shown in FIGS. 40 to 42, similarly to what was described for the first feeding devices 23 and for the second feeding devices 24, as a whole the movement paths 16 have a plurality of thermoforming stations 21, and positioned at each of these thermoforming stations 21 there is a single thermoforming device 31.

In the preferred embodiments, the thermoforming stations 21 are grouped relative to each other in a single thermoforming zone 49. In this way, the different thermoforming stations 21 are side by side perpendicularly to the movement paths 16. Moreover, advantageously, the thermoforming devices 31 are part of a single multi-chamber thermoforming unit, of which each thermoforming device 31 constitutes one chamber. The thermoforming devices 31 may share the system for creating the vacuum or for generating an overpressure.

However, in other embodiments, the thermoforming stations 21 may be distributed into a plurality of thermoforming zones 49 which are separate from each other.

In the preferred embodiments, the conveying elements 15 which are part of each of the groups 44, the first feeding devices 23, the second feeding devices 24, any nth feeding devices and the thermoforming devices 31 are present in equal numbers to each other. In particular, the conveying elements 15 which are part of a same group 44, the first feeding devices 23, the second feeding devices 24 and the thermoforming devices 31 are four in number in the embodiment of FIG. 40, five in the embodiment of FIG. 41 and ten in the embodiment of FIG. 42.

However, that shall not be understood as limiting for this invention, since it is possible that the number of conveying elements 15 which are part of a same conveying group 44, the number of first feeding devices 23, the number of second feeding devices 24 and the number of thermoforming devices 31 may differ from each other.

This invention brings important advantages.

In fact, thanks to this invention, it was possible to provide a new apparatus which allows a container to be made whose outer skeleton comprises at least two separate sheets, without the need to three-dimensionally form the sheets and constrain them to each other in advance.

Furthermore, thanks to this invention it is possible to make an apparatus which allows simplification of the operations for making a container whose outer skeleton comprises at least two separate sheets starting with the sheets which are in the spread out configuration and separate.

Not least, thanks to the different embodiments of this invention, it was possible to provide an apparatus which allows a container to be made whose outer skeleton comprises at least two sheets which are partly superposed. Additionally, thanks to the different embodiments of this invention, it was possible to provide an apparatus which allows a container to be made whose outer skeleton comprises at least two sheets which are fixed to each other either by means of glue or exclusively by the layer of thermoplastic material which adheres to both.

Finally, it should be noticed that this invention is relatively easy to produce and that even the cost linked to implementing the invention is not very high. The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for making a container (2) which has a bottom wall (3), a plurality of lateral walls (4) and a perimetric flange (5), the container (2) comprising an outer skeleton (6) and a layer of thermoplastic material (7) adhering to the inside of the outer skeleton (6), the outer skeleton (6) including at least one first sheet (8) and one second sheet (9), the apparatus (1) comprising:
a supporting structure (11);
a conveying element (15) which defines a housing (22), which is mounted on the supporting structure (11) and which is movable relative to the supporting structure (11) along a movement path (16) which extends from an infeed station (17) to an outfeed station (18), along the movement path (16) the apparatus (1) having a first feeding station (19), a second feeding station (20), and a thermoforming station (21) placed downstream of the feeding stations;
a first feeding device (23) positioned at the first feeding station (19), configured to insert, in use, the first sheet (8) into the housing (22) of the conveying element (15) placed at the first feeding station (19);

a second feeding device (24) positioned at the second feeding station (20), configured to insert, in use, the second sheet (9) into the housing (22) of the conveying element (15) placed at the second feeding station (20); and a thermoforming device (31) positioned at the thermoforming station (21), which is configured to thermoform, in use, a thermoplastic material (10) on the first sheet (8) and on the second sheet (9), when the conveying element (15) is placed at the thermoforming station (21), and thereby to make the layer of thermoplastic material (7).

2. The apparatus according to claim 1, also comprising at least one magazine (25), (26) configured to store respectively either a plurality of first sheets (8) or a plurality of second sheets (9), wherein respectively the first feeding device (23) or the second feeding device (24) is operatively associated with the magazine (25), (26) and configured to pick up, in use, the first sheet (8) or second sheet (9) from the magazine (25), (26).

3. The apparatus according to claim 2, wherein respectively the first feeding device (23) or the second feeding device (24) associated with the magazine (25), (26) comprises a transferring element (27), (28) which is movable between a pick-up position, in which it is associated with the magazine (25), (26) for picking up, in use, respectively the first sheet (8) or the second sheet (9) from the magazine (25), (26), and an unloading position, in which it is associated with the conveying element (15) placed respectively at the first feeding station (19) or at the second feeding station (20) for feeding, in use, respectively the first sheet (8) or the second sheet (9) to the conveying element (15) and which is configured to retain respectively the first sheet (8) or the second sheet (9) during the movement between the pick-up position and the unloading position.

4. The apparatus according to claim 3, wherein the transferring element (27), (28) is at least partly shaped to match the housing (22) defined by the conveying element (15) and is configured to be inserted into the housing (22) so as to insert into it, in use, respectively the first sheet (8) or the second sheet (9), at the same time causing three-dimensional forming respectively of the first sheet (8) or of the second sheet (9) by acting together with the conveying element (15).

5. The apparatus according to claim 4, wherein the transferring element (27), (28) comprises a gripping portion (60), (79) configured to pick up, in use, respectively the first sheet (8) or the second sheet (9) from the magazine (25), (26) when the transferring element (27), (28) is in the pick-up position and to retain, in use, respectively the first sheet (8) or the second sheet (9) during the movement of the transferring element (27), (28) from the pick-up position to the unloading position.

6. The apparatus according to claim 5, wherein the transferring element (27), (28) also comprises a shaping portion (61), (80) configured to three-dimensionally form respectively the first sheet (8) or the second sheet (9) inside the housing (22), associated with the gripping portion (60), (79).

7. The apparatus according to claim 6, wherein at least one of the gripping portion (60), (79) or the shaping portion (61), (80) is movable relative to the other according to an axial translating movement.

8. The apparatus according to claim 5, wherein the gripping portion (60), (79) comprises two or more first parts (77) which are movable relative to each other between a near position and an apart position, each first part (77) being equipped with retaining means for respectively the first sheet (8) or the second sheet (9).

9. The apparatus according to claim 3, wherein, both in the pick-up position and in the releasing position, the transferring element (27), (28) is axially movable between a retracted position and one or more extended positions.

10. The apparatus according to claim 3, wherein the transferring element (27), (28) is movable, between the pick-up position and the unloading position according to a rotary movement around an axis of rotation.

11. The apparatus according to claim 3, wherein the transferring element (27), (28) also comprises a clamping portion (81) which, when the transferring element (27), (28) is in the releasing position, is configured to couple with the conveying element (15) to clamp, in use, a portion of respectively the first sheet (8) or the second sheet (9) and to retain this portion of respectively the first sheet (8) or the second sheet (9), before respectively the first sheet (8) or the second sheet (9) is inserted inside the housing (22).

12. The apparatus according to claim 3, wherein respectively the first sheet (8) or the second sheet (9) has flaps which extend outwards from a portion intended to constitute the annular flange of the outer skeleton (6), and wherein respectively the first feeding device (23) or the second feeding device (24), and/or the magazine (25), (26) are equipped with a folding unit configured to fold the flaps on that portion after respectively the first sheet (8) or the second sheet (9) has been picked up by respectively the first feeding device (23) or the second feeding device (24).

13. The apparatus according to claim 1, comprising two of said magazines, a first magazine (25) and a second magazine (26), the first magazine (25) being configured to store a plurality of first sheets (8) and the second magazine (26) being configured to store a plurality of second sheets (9), and wherein the first feeding device (23) is operatively associated with the first magazine (25) and configured to pick up, in use, the first sheet (8) from the first magazine (25) and the second feeding device (24) is operatively associated with the second magazine (26) and configured to pick up, in use, the second sheet (9) from the second magazine (26).

14. The apparatus according to claim 1, comprising a plurality of conveying elements (15) mounted one after another along the movement path (16).

15. The apparatus according to claim 1 for simultaneously making a group of said containers (2), comprising:

a group (44) of conveying elements (15) mounted on the supporting structure (11), each of which defines a housing (22), said conveying elements (15) being movable in a way coordinated with each other relative to the supporting structure (11), each along a respective movement path (16) which extends between a respective infeed station (17) and a respective outfeed station (18), and along which there are present, in order, a respective first feeding station (19), a respective second feeding station (20) and a respective thermoforming station (21);

a plurality of first feeding devices (23) each positioned at a different first feeding station (19), each of said first feeding devices (23) being configured to insert, in use, the first sheet (8) into the housing (22) of a different conveying element (15), when that conveying element (15) is placed at the respective first feeding station (19);

a plurality of second feeding devices (24) each positioned at a different second feeding station (20), each of said second feeding devices (24) being configured to insert, in use, the second sheet (9) into the housing (22) of a different conveying element (15), when that conveying element (15) is placed at the respective second feeding station (20); and a plurality of thermoforming devices (31) each positioned at a different thermoforming station (21), each of which is configured to thermoform, in use, the thermoplastic material (10) on the first sheet (8) and on the second sheet (9) inserted into the housing (22) of a respective conveying element (15) placed at the respective thermoforming station (21), and thereby to make the layer of thermoplastic material (7).

16. The apparatus according to claim 15, wherein the movement paths (16) are parallel to each other and the conveying elements (15) of said group (44) of conveying elements (15) are side by side along a direction perpendicular to the movement paths (16) and they move in a synchronised way along the respective movement paths (16).

17. The apparatus according to claim 16, wherein said group (44) of conveying elements (15) is defined by a single body, wherein all of the conveying elements (159 of the group (44) of conveying elements (15) are movable together with each other.

18. The apparatus according to claim 15, wherein the first feeding stations (19) of the plurality of first feeding stations (19) are distributed into a plurality of first feeding zones (45) which are separate from each other, in such a way that two first feeding stations (19) present along two movement paths (16) adjacent to each other, are distributed into two separate first feeding zones (45) of said plurality of first feeding zones (45), and wherein the first feeding devices (23) of the first feeding stations (19) placed in a same first feeding zone (45) are side by side along a direction perpendicular to the movement paths (16) and are configured to operate in a synchronised way.

19. The apparatus according to claim 18, wherein the plurality of first feeding zones (45) is constituted of two first feeding zones (45), and wherein the first feeding stations (19) are distributed between the two first feeding zones (45) in such a way that two first feeding stations (19) positioned on two movement paths (16) adjacent to each other, are positioned respectively in separate first feeding zones (45).

20. The apparatus according to claim 18, wherein two conveying elements (15) of the group (44) of conveying elements (15), which are placed on two adjacent movements paths (16), have a distance D1 between their centres, measured perpendicularly to the respective movement paths (16), such that double said distance D1 is less than the total width of the first sheets (8), measured perpendicularly to the respective movement paths (16), which the respective first feeding devices (23) are configured to feed to those conveying elements (15).

21. The apparatus according to claim 15, wherein the plurality of first feeding stations (19) is entirely positioned at a single first feeding zone (45), in such a way that when the conveying elements (15) are in the respective first feeding stations (19), the conveying elements (15) are aligned with each other perpendicularly to the movement paths (16).

22. The apparatus according to claim 15, wherein the plurality of second feeding stations (20) is entirely positioned at a single second feeding zone (48), in such a way that when the second feeding devices (24) are in the respective second feeding stations (20), the second feeding devices (24) are aligned with each other perpendicularly to the movement paths (16).

23. The apparatus according to claim 15, comprising a plurality of groups (44) of conveying elements (15) distributed along the movement paths (16) and simultaneously movable.

24. The apparatus according to claim 23, wherein the number of conveying elements (15) of each group (44) of conveying elements (15), is equal to the number of first feeding devices (23), to the number of second feeding devices (24) and to the number of thermoforming devices (31).

25. The apparatus according to claim 1, wherein along each movement path (16) the first feeding device (23) is positioned either upstream or downstream of the second feeding device (24).

26. The apparatus according to claim 1, wherein along each movement path (16) there are three or more feeding devices present placed one after another, for making a container (2) which comprises an outer skeleton (6) which includes three or more sheets.

27. The apparatus according to claim 1, also comprising at least one glue application unit positioned at a gluing station, between two feeding stations, the glue application unit being configured to apply glue on either the first sheet or the second sheet positioned inside the housing (22) of a conveying element (15) placed at the gluing station.

28. The apparatus according to claim 1, also comprising a glue application unit associated with respectively the first feeding device or the second feeding device for, in use, applying glue on respectively the first sheet or the second sheet moved by respectively the first feeding device or the second feeding device before respectively the first sheet or the second sheet is inserted into the housing (22).

29. The apparatus according to claim 1, also comprising positioning means for the thermoplastic material (10), which are configured to feed said thermoplastic material (10) to each thermoforming device (31), above the conveying element (15), when the conveying element (15) is placed in the thermoforming station (21).

30. The apparatus according to claim 1, also comprising an unloading device (40) placed at the outfeed station (18), the unloading device (40) being configured to remove the container (2) from the conveying element (15) at the outfeed station (18).

31. The apparatus according to claim 1, also comprising a folding device (101) configured to fold, in use, the perimetric flange (5) of the container (2) relative to the lateral walls (4) at connecting zones between the perimetric flange (5) and the lateral walls (4), in such a way as to fold the perimetric flange (5) below a top plane in which those connecting zones lie.

32. The apparatus according to claim 31, wherein the folding device (101) comprises a folding element (102) which is movable relative to the conveying element (15) between an inactive position, in which the folding element (102) is uncoupled from the conveying element (15), and an active position, in which the folding element (102) is coupled with the conveying element (15) for folding in use the perimetric flange (5), wherein the conveying element (15) has a first central axis (104), coming out of the housing (22), and wherein the conveying element (15) has a first annular frame (105) which delimits the top of the housing (22) and which defines a first operating surface (106) at least partly angled outwards relative to the first central axis (104).

33. The apparatus according to claim 32, wherein the first operating surface (106) has a first angled portion (107)

which, relative to the first central axis (104), forms a first angle (119) which is between 100° and 170°, preferably between 115° and 155°, and even more preferably between 125° and 145°.

34. The apparatus according to claim 31, wherein the folding device (101) is constituted of the thermoforming device (31).

35. The apparatus according to claim 30, also comprising a folding device (101) configured to fold, in use, the perimetric flange (5) of the container (2) relative to the lateral walls (4) at connecting zones between the perimetric flange (5) and the lateral walls (4), in such a way as to fold the perimetric flange (5) below a top plane in which those connecting zones lie, wherein the folding device (101) also comprises an intermediate element (109), which defines a seat (110) for receiving in use the container (2), and the unloading device (40) comprises a first gripping element (114), wherein:
- the seat (110) is delimited by a second annular frame (111) and the intermediate element (109) has a second central axis (113), coming out of the seat (110);
- the second annular frame (111) defines a second operating surface (121) at least partly angled outwards relative to the second central axis (113);
- the first gripping element (114) is movable between a first extracting position, in which it is associated with the conveying element (15) at the outfeed station (18) for picking up, in use, the container (2) from the housing (22), and an inserting position, in which the first gripping element (114) is associated with the intermediate element (109) for inserting, in use, the container (2) into the seat (110); and
- the folding element (102) is associated with the unloading device (40) and is movable relative to the intermediate element (109) between an inactive position, in which the folding element (102) is uncoupled from the intermediate element (109), and an active position, in which the folding element (102) is coupled with the intermediate element (109) for folding in use the perimetric flange (5).

36. The apparatus according to claim 35, wherein the second operating surface (121), relative to the second central axis (113), forms a second angle (120) which is between 110° and 180°, preferably between 135° and 180°, and even more preferably between 150° and 180°.

37. The apparatus according to claim 35, wherein the first gripping element (114) is also movable between the inserting position, in which the first gripping element (114) is associated with the intermediate element (109) for picking up, in use, the container (2) from the seat (110), and a first uncoupling position, in which the first gripping element (114) is associated with a placing surface (116) for releasing, in use, the container (2) onto the placing surface (116).

38. The apparatus according to claim 35, wherein the unloading device (40) also comprises a second gripping element (118) which is movable between a second extracting position, in which the second gripping element (118) is associated with the intermediate element (109) for picking up, in use, the container (2) from the seat (110), and a second uncoupling position, in which the second gripping element (118) is coupled with a placing surface (116) for releasing, in use, the container (2) onto the placing surface (116).

39. The apparatus according to claim 35, wherein the folding element (102) is associated with the first gripping element (114) and, when the first gripping element (114) is in the inserting position, the folding element (102) is movable relative to the first gripping element (114), between the inactive position and the active position according to a direction of movement (103) parallel to the second central axis (113).

40. The apparatus according to claim 4, wherein the transferring element (27), (28) is configured to cause, at the same time as insertion of respectively the first sheet (8) or the second sheet (9) into the housing (22), the non-simultaneous folding of different flaps of respectively the first sheet (8) or the second sheet (9), in such a way as to cause flaps to be superposed.

41. The apparatus according to claim 1, also comprising one or more heating elements configured to heat localised zones of the first sheet (8) and/or of the second sheet (9) placed in the housing (22).

42. The apparatus according to claim 38, wherein the folding element (102) is associated with the second gripping element (118) and, when the second gripping element (118) is in the second extracting position, the folding element (102) is movable relative to the second gripping element (118), between the inactive position and the active position according to a direction of movement (103) parallel to the second central axis (113).

* * * * *